US010050675B2

(12) United States Patent
Stuckman et al.

(10) Patent No.: US 10,050,675 B2
(45) Date of Patent: Aug. 14, 2018

(54) GUIDED-WAVE TRANSMISSION DEVICE WITH DIVERSITY AND METHODS FOR USE THEREWITH

(71) Applicant: AT&T INTELLECTUAL PROPERTY I, L.P., Atlanta, GA (US)

(72) Inventors: Bruce Stuckman, Austin, TX (US); Paul Shala Henry, Holmdel, NJ (US); Robert Bennett, Southold, NY (US); Irwin Gerszberg, Kendall Park, NJ (US); Farhad Barzegar, Branchburg, NJ (US); Donald J. Barnickel, Flemington, NJ (US); Thomas M. Willis, III, Tinton Falls, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/369,997

(22) Filed: Dec. 6, 2016

(65) Prior Publication Data
US 2017/0085295 A1     Mar. 23, 2017

Related U.S. Application Data

(63) Continuation of application No. 14/519,799, filed on Oct. 21, 2014, now Pat. No. 9,564,947.

(51) Int. Cl.
| | | |
|---|---|---|
| *H04B 3/00* | (2006.01) | |
| *H04L 25/00* | (2006.01) | |
| *H04B 3/56* | (2006.01) | |
| *H04B 7/155* | (2006.01) | |
| *H01P 5/12* | (2006.01) | |
| *H01P 5/18* | (2006.01) | |

(52) U.S. Cl.
CPC ............. *H04B 3/56* (2013.01); *H01P 5/12* (2013.01); *H01P 5/18* (2013.01); *H01P 5/188* (2013.01); *H04B 7/15528* (2013.01); *H04B 2203/5441* (2013.01); *H04B 2203/5479* (2013.01); *H04B 2203/5483* (2013.01)

(58) Field of Classification Search
CPC ...................................................... H04B 3/54
See application file for complete search history.

(56) References Cited

U.S. PATENT DOCUMENTS

| | | | |
|---|---|---|---|
| 2,852,753 A | 9/1958 | Gent et al. | |
| 2006/0051022 A1* | 3/2006 | Levner | G02B 5/1828 385/37 |
| 2014/0363127 A1* | 12/2014 | Baets | G02B 6/124 385/37 |

OTHER PUBLICATIONS

International Preliminary Report on Patentability, PCT/US2015/051194, dated May 4, 2017, 1-7.

(Continued)

*Primary Examiner* — Shuwang Liu
*Assistant Examiner* — Gina McKie
(74) *Attorney, Agent, or Firm* — Ed Guntin; Bruce E. Stuckman

(57) ABSTRACT

Aspects of the subject disclosure may include, for example, a transmission device that includes a first coupler that guides a first electromagnetic wave to a first junction to form a second electromagnetic wave that is guided to propagate along the outer surface of the transmission medium via one or more guided-wave modes. These mode(s) have an envelope that varies as a function of angular deviation and/or longitudinal displacement. Other embodiments are disclosed.

20 Claims, 30 Drawing Sheets

(56) References Cited

OTHER PUBLICATIONS

Akalin, Tahsin et al., "Single-Wire Transmission Lines at Terahertz Frequencies", IEEE Transactions on Microwave Theory and Techniques, vol. 54, No. 6, 2006, 2762-2767.

Wang, Kanglin, "Dispersion of Surface Plasmon Polaritons on Metal Wires in the Terahertz Frequency Range", Physical Review Letters, PRL 96, 157401, 2006, 4 pages.

* cited by examiner

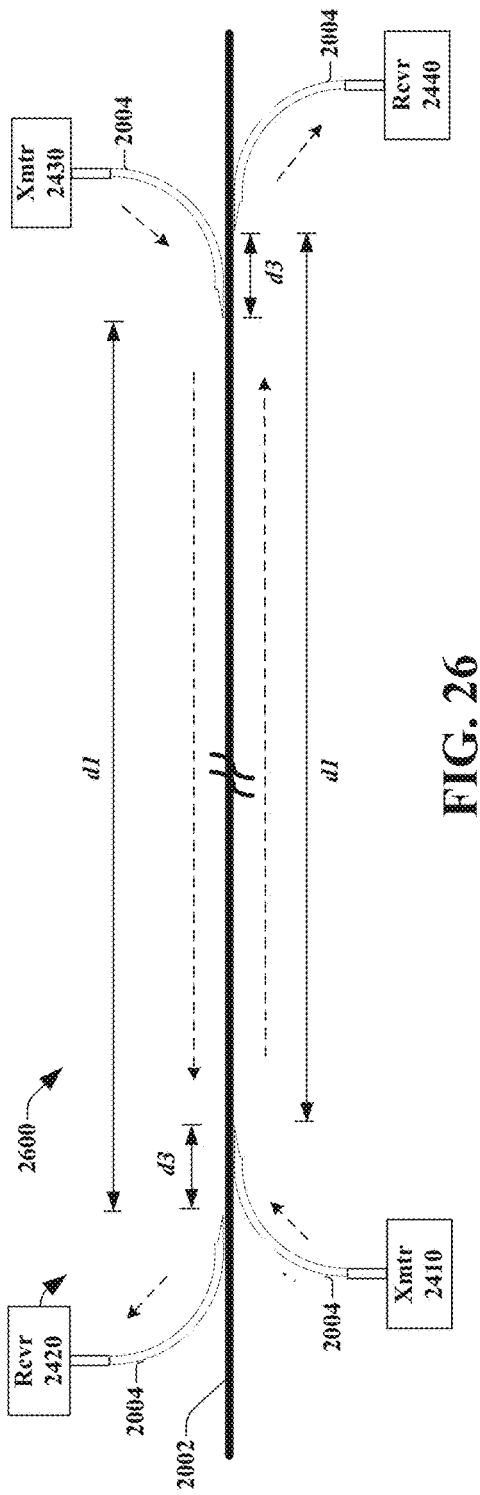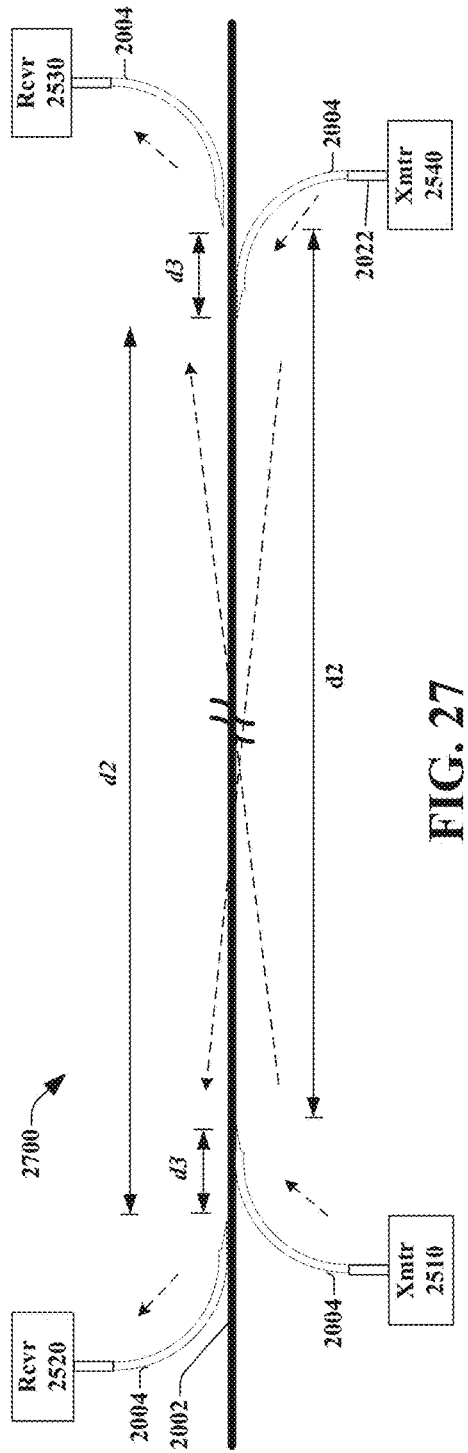
FIG. 26
FIG. 27

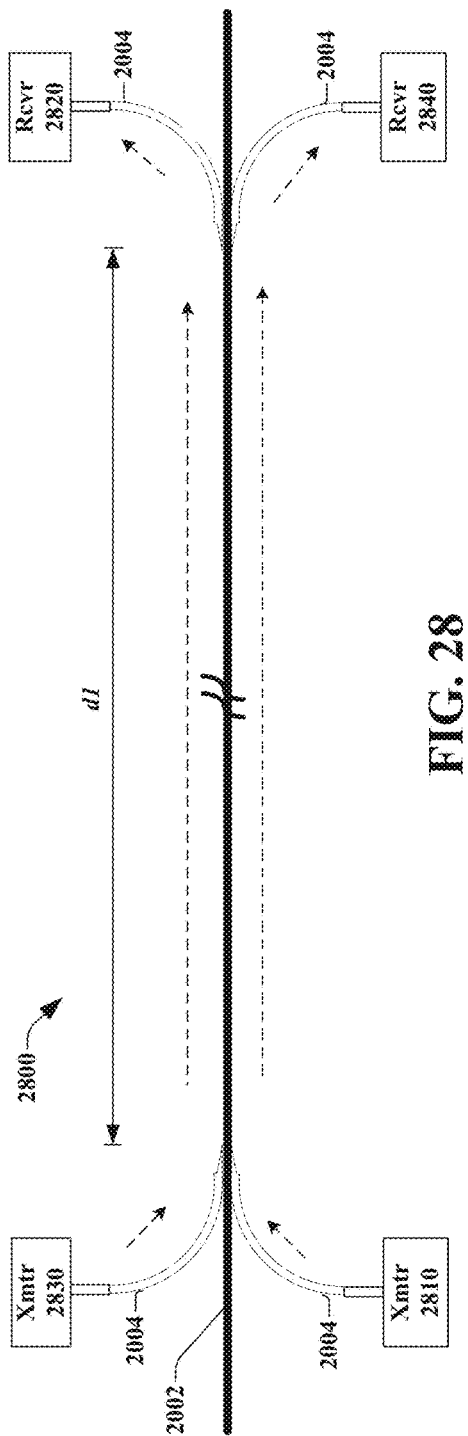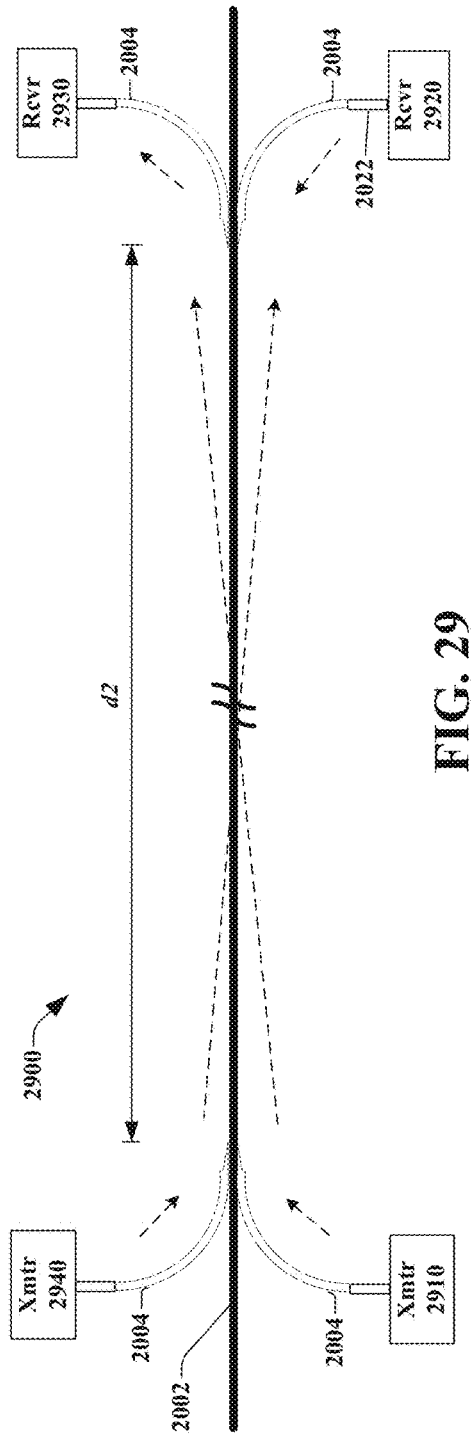

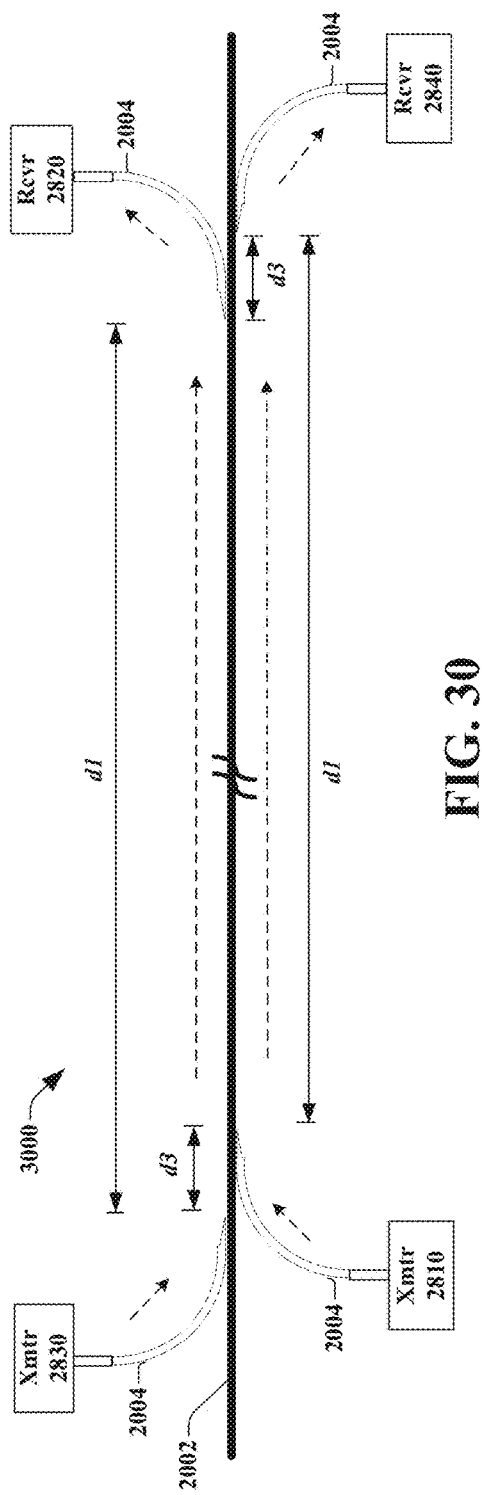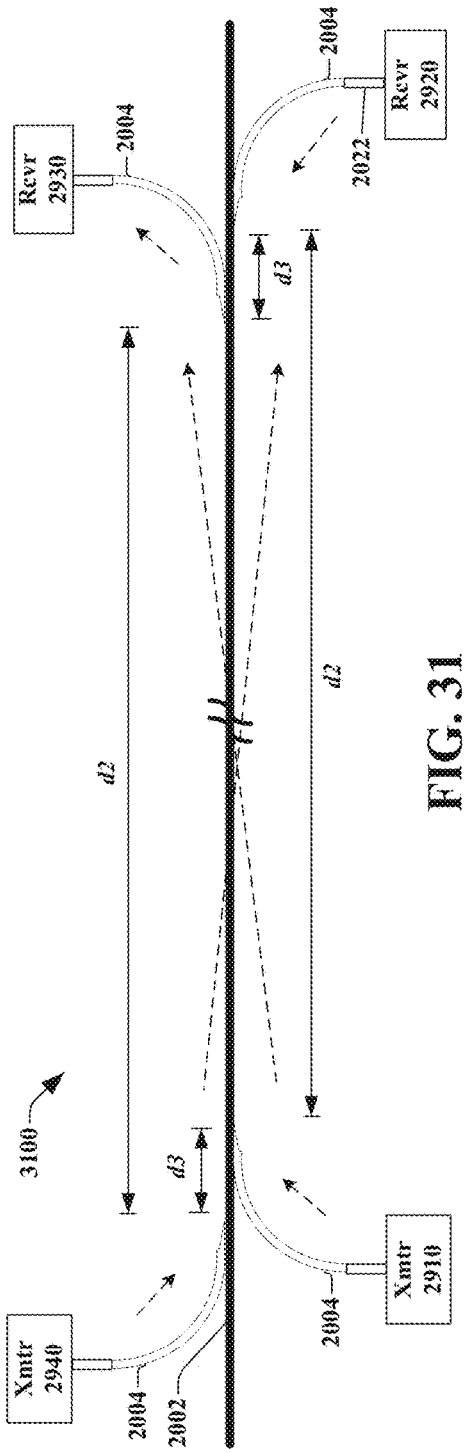

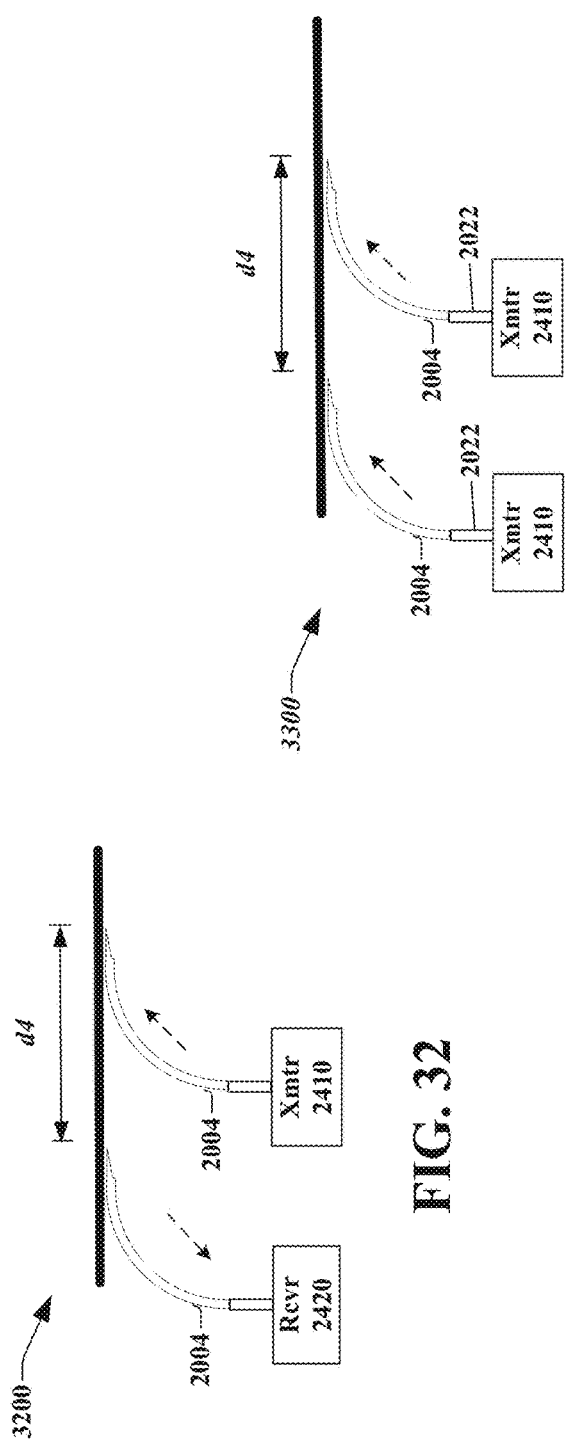

_US 10,050,675 B2_

GUIDED-WAVE TRANSMISSION DEVICE WITH DIVERSITY AND METHODS FOR USE THEREWITH

CROSS-REFERENCE TO RELATED APPLICATIONS

This application is a continuation of and claims priority to U.S. patent application Ser. No. 14/519,799 filed Oct. 21, 2014. The contents of the foregoing are hereby incorporated by reference into this application as if set forth herein in full.

FIELD OF THE DISCLOSURE

The subject disclosure relates to communications via microwave transmission in a communication network.

BACKGROUND

As smart phones and other portable devices increasingly become ubiquitous, and data usage increases, macrocell base station devices and existing wireless infrastructure in turn require higher bandwidth capability in order to address the increased demand. To provide additional mobile bandwidth, small cell deployment is being pursued, with microcells and picocells providing coverage for much smaller areas than traditional macrocells.

BRIEF DESCRIPTION OF THE DRAWINGS

FIG. 26 is a block diagram of an example, non-limiting embodiment of a transmission system in accordance with various aspects described herein.

FIG. 27 is a block diagram of an example, non-limiting embodiment of a transmission system in accordance with various aspects described herein.

FIG. 28 is a block diagram of an example, non-limiting embodiment of a transmission system in accordance with various aspects described herein.

FIG. 29 is a block diagram of an example, non-limiting embodiment of a transmission system in accordance with various aspects described herein.

FIG. 30 is a block diagram of an example, non-limiting embodiment of a transmission system in accordance with various aspects described herein.

FIG. 31 is a block diagram of an example, non-limiting embodiment of a transmission system in accordance with various aspects described herein.

FIG. 32 is a block diagram of an example, non-limiting embodiment of a transmission system in accordance with various aspects described herein.

FIG. 33 is a block diagram of an example, non-limiting embodiment of a transmission system in accordance with various aspects described herein.

FIG. 34 is a block diagram of an example, non-limiting embodiment of a transmission system in accordance with various aspects described herein.

DETAILED DESCRIPTION

Figure 1:
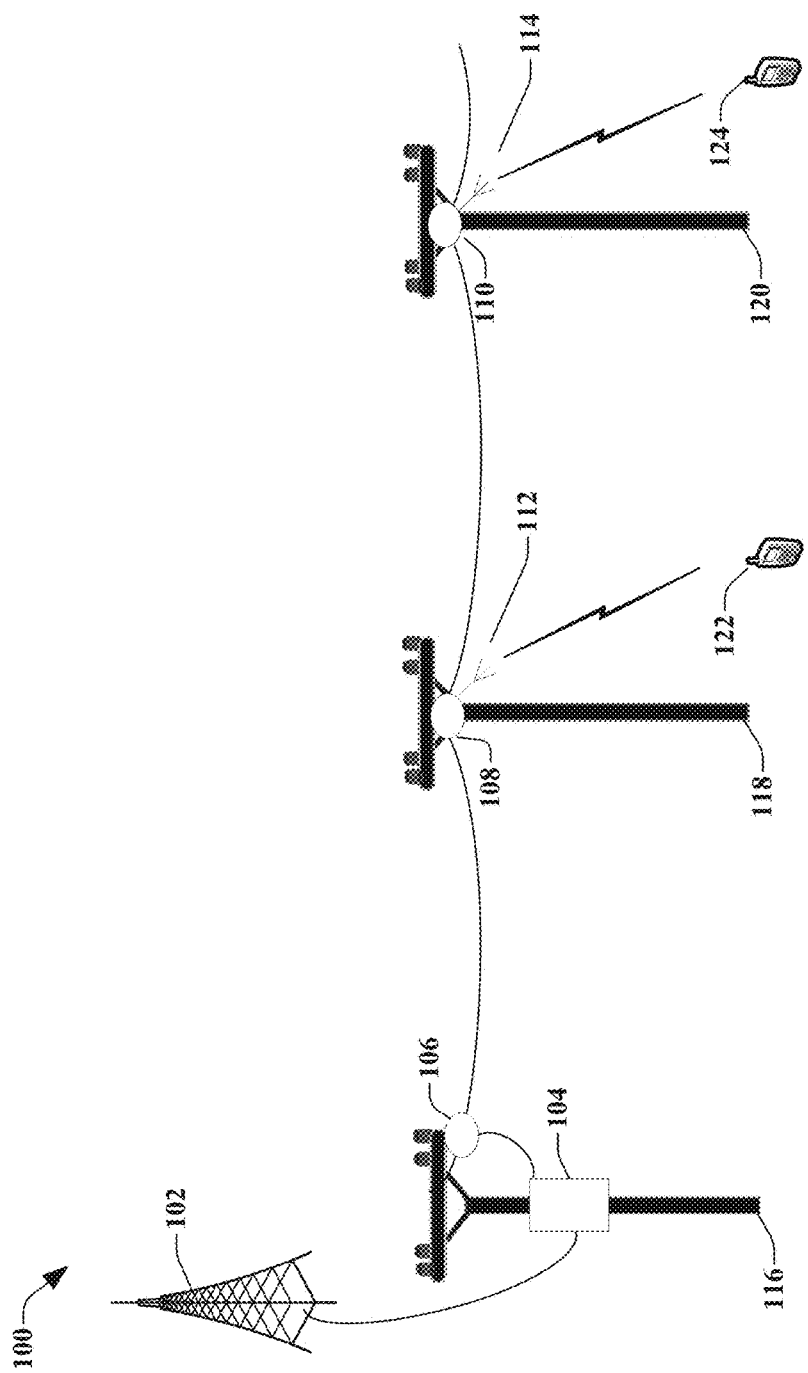
FIG. 1 is a block diagram illustrating an example, non-limiting embodiment of a guided-wave communications system in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced in different combinations and without these details (and without applying to any particular networked environment or standard).

To provide network connectivity to additional base station devices, the backhaul network that links the communication cells (e.g., macrocells and macrocells) to network devices of the core network correspondingly expands. Similarly, to provide network connectivity to a distributed antenna system, an extended communication system that links base station devices and their distributed antennas is desirable. A guided-wave communication system can be provided to enable alternative, increased or additional network connectivity and a waveguide coupling system can be provided to transmit and/or receive guided-wave (e.g., surface wave) communications on a transmission medium, such as a wire or other conductor that operates as a single-wire transmission line or a dielectric material that operates as a waveguide and/or another transmission medium that otherwise operates to guide the transmission of an electromagnetic wave.

In an example embodiment, a waveguide coupler that is utilized in a waveguide coupling system can be made of a dielectric material, or other low-loss insulator (e.g., Teflon, polyethylene, etc.), or can be made of a conducting (e.g., metallic, non-metallic, etc.) material, or any combination of the foregoing materials. Reference throughout the detailed description to "dielectric waveguide" is for illustration purposes and does not limit embodiments to being constructed solely of dielectric materials. In other embodiments, other dielectric or insulating materials are possible. It will be appreciated that a variety of transmission media such as: wires, whether insulated or not, and whether single-stranded or multi-stranded; conductors of other shapes or configurations including wire bundles, cables, rods, rails, pipes; non-conductors such as dielectric pipes, rods, rails, or other dielectric members; combinations of conductors and dielectric materials; or other guided-wave transmission media can be utilized with guided-wave communications without departing from example embodiments.

For these and/or other considerations, in one or more embodiments, a transmission device includes a communications interface that receives a first communication signal that includes first data. A transceiver generates a first electromagnetic wave based on the first communication signal to convey the first data, the first electromagnetic wave having at least one carrier frequency and at least one corresponding wavelength. A coupler couples the first electromagnetic wave to a transmission medium having at least one inner portion surrounded by a dielectric material, the dielectric material having an outer surface and a corresponding circumference, wherein the coupling of the first electromagnetic wave to the transmission medium forms a second electromagnetic wave that is guided to propagate along the outer surface of the dielectric material via at least one guided-wave mode that includes an asymmetric mode, wherein the carrier frequency is within a millimeter wave frequency band and wherein the corresponding wavelength is less than the circumference of the transmission medium.

In one or more embodiments, a transmission device includes a transmitter that generates a first electromagnetic wave based on a communication signal to convey data, the first electromagnetic wave having at least one carrier frequency and at least one corresponding wavelength. A coupler couples the first electromagnetic wave to a single wire transmission medium having an outer surface and a corresponding circumference, wherein the coupling of the first electromagnetic wave to the single wire transmission medium forms a second electromagnetic wave that is guided to propagate along the outer surface of the single wire transmission medium via at least one guided-wave mode that includes an asymmetric mode, wherein the carrier frequency in within a millimeter wave frequency band and wherein the corresponding wavelength is less than the circumference of the single wire transmission medium.

In one or more embodiments, a method includes generating a first electromagnetic wave based on a communication signal to convey data, the first electromagnetic wave having at least one carrier frequency and at least one corresponding wavelength. A coupler couples the first electromagnetic wave to a single wire transmission medium having an outer dielectric surface and a corresponding circumference, wherein the coupling of the first electromagnetic wave to the single wire transmission medium forms a second electromagnetic wave that is guided to propagate along the outer dielectric surface of the single wire transmission medium via at least one guided-wave mode, wherein the carrier frequency is within a millimeter wave frequency band and wherein the corresponding wavelength is less than the circumference of the single wire transmission medium.

In one or more embodiments, a transmission device includes a communications interface that receives a first communication signal that includes first data. A transceiver generates a first electromagnetic wave based on the first communication signal to convey the first data, the first electromagnetic wave having at least one carrier frequency. A coupler couples the first electromagnetic wave to a transmission medium having at least one inner portion surrounded by a dielectric material, the dielectric material having an outer surface and a corresponding circumference, wherein the coupling of the first electromagnetic wave to the transmission medium forms a second electromagnetic wave that is guided to propagate along the outer surface of the dielectric material via at least one guided-wave mode that includes an asymmetric mode having a lower cutoff frequency, and wherein the carrier frequency is selected to be within a limited range of the lower cutoff frequency.

In one or more embodiments, a transmission device includes a transmitter that generates a first electromagnetic wave based on a communication signal to convey data, the first electromagnetic wave having at least one carrier frequency. A coupler, coupled to the transmitter, couples the first electromagnetic wave to a single wire transmission medium having an outer surface, wherein the coupling of the first electromagnetic wave to the single wire transmission medium forms a second electromagnetic wave that is guided to propagate along the outer surface of the single wire transmission medium via at least one guided-wave mode that includes an asymmetric mode having a lower cutoff frequency, and wherein the carrier frequency is selected to be within a limited range of the lower cutoff frequency.

In one or more embodiments, a method includes generating a first electromagnetic wave based on a communication signal to convey data, the first electromagnetic wave having at least one carrier frequency. A coupler couples the first electromagnetic wave to a single wire transmission medium having an outer surface, wherein the coupling of the first electromagnetic wave to the single wire transmission medium forms a second electromagnetic wave that is guided to propagate along the outer surface of the single wire transmission medium via at least one guided-wave mode that includes an asymmetric mode having a lower cutoff frequency, and wherein the carrier frequency is selected to be within a limited range of the lower cutoff frequency.

In one or more embodiments, a method includes generating a first electromagnetic wave based on a communication signal to convey data, the first electromagnetic wave having at least one carrier frequency. The first electromagnetic wave is coupled to a single wire transmission medium having an outer surface, wherein the coupling of the first electromagnetic wave to the single wire transmission medium forms a second electromagnetic wave that is guided to propagate along the outer surface of the single wire transmission medium via at least one guided-wave mode that includes an asymmetric mode having a lower cutoff frequency, and wherein the carrier frequency is selected to be within a limited range of the lower cutoff frequency.

Various embodiments described herein relate to a transmission system for launching and extracting guided-wave (e.g., surface wave communications that are electromagnetic waves) transmissions from a wire. At millimeter-wave frequencies, wherein the wavelength is small compared to the size of the equipment, transmissions can propagate as waves guided by a waveguide, such as a strip or length of dielectric material or other coupler. The electromagnetic field structure of the guided-wave can be inside and/or outside of the coupler. When this coupler is brought into close proximity to a transmission medium (e.g., a wire, utility line or other transmission medium), at least a portion of the guided-wave decouples from the waveguide and couples to the transmission medium, and continues to propagate as guided-waves, such as surface waves about the surface of the wire.

In one or more embodiments, a coupler includes a receiving portion that receives a first electromagnetic wave conveying first data from a transmitting device. A guiding portion guides the first electromagnetic wave to a junction for coupling the first electromagnetic wave to a transmission medium. The first electromagnetic wave propagates via at least one first guided-wave mode. The coupling of the first electromagnetic wave to the transmission medium forms a second electromagnetic wave that is guided to propagate along the outer surface of the transmission medium via at least one second guided-wave mode that differs from the first guided-wave mode.

In one or more embodiments, a coupling module includes a plurality of receiving portions that receive a corresponding plurality of first electromagnetic waves conveying first data. A plurality of guiding portions guide the plurality of first electromagnetic waves to a corresponding plurality of junctions for coupling the plurality of first electromagnetic waves to a transmission medium. The plurality of first electromagnetic waves propagate via at least one first guided-wave mode and the coupling of the plurality of first electromagnetic waves to the transmission medium forms a plurality of second electromagnetic waves that are guided to propagate along the outer surface of the transmission medium via at least one second guided-wave mode that differs from the first guided-wave mode.

In one or more embodiments, a method includes receiving a first electromagnetic wave conveying first data from a transmitting device. The first electromagnetic wave is guided to a junction for coupling the first electromagnetic wave to a transmission medium. The first electromagnetic wave propagates via at least one first guided-wave mode and the coupling of the first electromagnetic wave to the transmission medium forms a second electromagnetic wave that is guided to propagate along the outer surface of the transmission medium via at least one second guided-wave mode that differs from the first guided-wave mode.

In one or more embodiments, a transmission device includes a first coupler that guides a first electromagnetic wave to a first junction to form a second electromagnetic wave that is guided to propagate along the outer surface of the transmission medium via one or more guided-wave modes. This mode or modes have an envelope that varies as a function of angular deviation and/or longitudinal displacement. A second coupler guides a third electromagnetic wave from a second junction coupling the third electromagnetic wave from the transmission medium. The second junction is arranged in angular deviation and/or longitudinal displacement to correspond to a local minimum of the envelope.

In one or more embodiments, a method includes generating a first electromagnetic wave conveying first data from a transmitting device. The first electromagnetic wave is guided to a first junction for coupling the first electromagnetic wave to a transmission medium at a first azimuthal angle to form a second electromagnetic wave that is guided to propagate along the outer surface of the transmission medium via at least one guided-wave mode. The second electromagnetic wave has an envelope that varies as a function of angular deviation from the first azimuthal angle and/or longitudinal displacement from the first junction. The function has a local minimum at a first angular deviation from the first azimuthal angle and/or first longitudinal displacement from the first junction. A third electromagnetic wave is guided from a second junction coupling the third electromagnetic wave from the transmission medium at the first angular deviation from the first azimuthal angle and/or the first longitudinal displacement from the first junction to form a fourth electromagnetic wave that is guided to a first receiver.

According to an example embodiment, a surface wave is a type of guided-wave that is guided by a surface of the transmission medium, which can include an exterior or outer surface of the wire, exterior or outer surface of dielectric coating or insulating jacket, or another surface of a transmission medium that is adjacent to or exposed to another type of medium having different properties (e.g., dielectric properties). Indeed, in an example embodiment, a surface of the transmission medium that guides a surface wave can represent a transitional surface between two different types of media. For example, in the case of a bare or uninsulated wire, the surface of the wire can be the outer or exterior conductive surface of the bare or uninsulated wire that is exposed to air or free space. As another example, in the case of insulated wire, the surface of the wire can be the conductive portion of the wire that meets the insulator portion of the wire, or can otherwise be the insulated surface of the wire that is exposed to air or free space, or can otherwise be any material region between the insulated surface of the wire and the conductive portion of the wire that meets the insulator portion of the wire, depending upon the relative differences in the properties (e.g., dielectric properties) of the insulator, air, and/or the conductor and further dependent on the frequency and propagation mode or modes of the guided-wave.

According to an example embodiment, guided-waves such as surface waves can be contrasted with radio transmissions over free space/air or conventional propagation of electrical power or signals through the conductor of the wire. Indeed, with surface wave or guided-wave systems described herein, conventional electrical power or signals can still propagate or be transmitted through the conductor of the wire, while guided-waves (including surface waves and other electromagnetic waves) can surround all or part of the surface of the wire and propagate along the wire with low loss, according to an example embodiment. In an example embodiment, a surface wave can have a field structure (e.g., an electromagnetic field structure) that lies primarily or substantially outside of the transmission medium that serves to guide the surface wave.

In an example embodiment, the guided-waves employed herein can be contrasted with Sommerfeld waves used as a means of propagation along a wire which are limited to waves having a wavelength greater than, not less than, the circumference of the wire. In an example embodiment, the guided-waves employed herein can be contrasted with G-Wave and E-Wave systems that operate via the propagation of the fundamental mode and not based on the propagation of at least one asymmetric mode. In an example embodiment, the guided-waves employed herein can be contrasted with surface plasmon wave propagation along single metal wire premised on the electron bunches that form in conductors at frequencies such as optical frequencies, well above, and not less than y, the mean collision frequency of electrons of the conducting material. These prior art systems have failed to address guided-wave propagation for a transmission medium, where the guided-wave includes an asymmetric mode that propagates at low loss frequencies, such as in the microwave or millimeter-wave band, that are less than the mean collision frequency of electrons of the conducting material. These prior art systems have failed to address guided-wave propagation for a transmission medium that includes an outer dielectric, where the guided-wave includes an asymmetric mode that propagates with low loss with fields concentrated about the outer surface of the dielectric.

According to an example embodiment, the electromagnetic waves traveling along a wire are induced by other electromagnetic waves traveling along a waveguide in proximity to the wire. The inducement of the electromagnetic waves can be independent of any electrical potential, charge or current that is injected or otherwise transmitted through the wires as part of an electrical circuit. It is to be appreciated that while a small current in the wire may be formed in response to the propagation of the electromagnetic wave through the wire, this can be due to the propagation of the electromagnetic wave along the wire surface, and is not formed in response to electrical potential, charge or current that is injected into the wire as part of an electrical circuit. The electromagnetic waves traveling on the wire therefore do not require a circuit to propagate along the wire surface. The wire therefore is a single wire transmission line that does not require a circuit. Also, in some embodiments, a wire is not necessary, and the electromagnetic waves can propagate along a single line transmission medium that is not a wire.

According to an example embodiment, the term "single wire transmission medium" is used in conjunction with transmission via electromagnetic waves that are guided by a wire, but do not require the wire to be part of a circuit to support such propagation. A transmission system may include multiple single wire transmission media that act to transmit such guided-waves, with different waves being guided by differing ones of the single wire transmission media.

According to an example embodiment, the term "about" a wire used in conjunction with a guided-wave (e.g., surface wave) can include fundamental wave propagation modes and other guided-waves. Assuming the wire has a circular or otherwise substantially circular cross section, the fundamental mode is a symmetric mode having a circular or substantially circular field distribution (e.g., electric field, magnetic field, electromagnetic field, etc.) at least partially around a wire. In addition, when a guided-wave propagates "about" a circular, stranded or other wire with a circular or substantially circular cross section, it propagates longitudinally along the wire via a wave propagation mode (at least one guided-wave mode) that can include not only the fundamental wave propagation modes (e.g., zero order modes), but additionally or alternatively other non-fundamental wave propagation modes such as higher-order guided-wave modes (e.g., $1^{st}$ order modes, $2^{nd}$ order modes, etc.), asymmetrical modes and/or other guided (e.g., surface) waves that have non-circular field distributions around a wire. As used herein, the term "substantially circular" means a shape that varies by less that (+/−15%) from a perfect circle. As used herein, the term "non-circular", means a shape that is not substantially circular.

For example, such non-circular field distributions can be unilateral or multi-lateral with one or more axial lobes characterized by relatively higher field strength and/or one or more nulls or null regions characterized by relatively low-field strength, zero-field strength or substantially zero field strength. Further, the field distribution can otherwise vary as a function of a longitudinal axial orientation around the wire such that one or more regions of axial orientation around the wire have an electric or magnetic field strength (or combination thereof) that is higher than one or more other regions of axial orientation, according to an example embodiment. It will be appreciated that the relative positions of the higher order modes or asymmetrical modes can vary as the guided-wave travels along the wire.

Considering other wires, conductors or dielectrics that have non-circular cross sections (i.e. not substantially circular cross sections), the terms symmetric and asymmetric modes may not apply in the same fashion. For example a fundamental mode of a rectangular waveguide may not have a circular or substantially circular field distribution. So the terms fundamental mode and non-fundamental modes can be used in this more general sense.

Referring now to FIG. 1, a block diagram illustrating an example, non-limiting embodiment of a guided-wave communication system 100 is shown. Guided-wave communication system 100 depicts an exemplary environment in which a transmission device, coupler or coupling module can be used.

Guided-wave communication system 100 can be a distributed antenna system that includes one or more base station devices (e.g., base station device 104) that are communicably coupled to a macrocell site 102 or other network connection. Base station device 104 can be connected by a wired (e.g., fiber and/or cable), or by a wireless (e.g., microwave wireless) connection to macrocell site 102. Macrocells such as macrocell site 102 can have dedicated connections to the mobile network and base station device 104 can share and/or otherwise use macrocell site 102's connection. Base station device 104 can be mounted on, or attached to, utility pole 116. In other embodiments, base station device 104 can be near transformers and/or other locations situated nearby a power line.

Base station device 104 can facilitate connectivity to a mobile network for mobile devices 122 and 124. Antennas 112 and 114, mounted on or near utility poles 118 and 120, respectively, can receive signals from base station device 104 and transmit those signals to mobile devices 122 and 124 over a much wider area than if the antennas 112 and 114 were located at or near base station device 104.

It is noted that FIG. 1 displays three utility poles, with one base station device, for purposes of simplicity. In other embodiments, utility pole 116 can have more base station devices, and one or more utility poles with distributed antennas are possible.

A transmission device, such as dielectric waveguide coupling device 106 can transmit the signal from base station device 104 to antennas 112 and 114 via utility or power line(s) that connect the utility poles 116, 118, and 120. To transmit the signal, radio source and/or coupler 106 up converts the signal (e.g., via frequency mixing) from base station device 104 or otherwise converts the signal from the base station device 104 to a microwave or millimeter-wave band signal having at least one carrier frequency in the microwave or millimeter-wave frequency band. The dielectric waveguide coupling device 106 launches a millimeter-wave band wave that propagates as a guided-wave (e.g., surface wave or other electromagnetic wave) traveling along the utility line or other wire. At utility pole 118, another transmission device, such as dielectric waveguide coupling device 108 that receives the guided-wave (and optionally can amplify it as needed or desired or operate as a digital repeater to receive it and regenerate it) and sends it forward as a guided-wave (e.g., surface wave or other electromagnetic wave) on the utility line or other wire. The dielectric waveguide coupling device 108 can also extract a signal from the millimeter-wave band guided-wave and shift it down in frequency or otherwise convert it to its original cellular band frequency (e.g., 1.9 GHz or other defined cellular frequency) or another cellular (or non-cellular) band frequency. An antenna 112 can transmit (e.g., wirelessly transmit) the downshifted signal to mobile device 122. The process can be repeated by another transmission device, such as dielectric waveguide coupling device 110, antenna 114 and mobile device 124, as necessary or desirable.

Transmissions from mobile devices 122 and 124 can also be received by antennas 112 and 114 respectively. Repeaters on dielectric waveguide coupling devices 108 and 110 can upshift or otherwise convert the cellular band signals to microwave or millimeter-wave band and transmit the signals as guided-wave (e.g., surface wave or other electromagnetic wave) transmissions over the power line(s) to base station device 104.

In an example embodiment, system 100 can employ diversity paths, where two or more utility lines or other wires are strung between the utility poles 116, 118, and 120 (e.g., for example, two or more wires between poles 116 and 120) and redundant transmissions from base station 104 are transmitted as guided-waves down the surface of the utility lines or other wires. The utility lines or other wires can be either insulated or uninsulated, and depending on the environmental conditions that cause transmission losses, the coupling devices can selectively receive signals from the insulated or uninsulated utility lines or other wires. The selection can be based on measurements of the signal-to-noise ratio of the wires, or based on determined weather/environmental conditions (e.g., moisture detectors, weather forecasts, etc.). The use of diversity paths with system 100 can enable alternate routing capabilities, load balancing, increased load handling, concurrent bi-directional or synchronous communications, spread spectrum communications, etc. (See FIG. 8 for more illustrative details).

It is noted that the use of the dielectric waveguide coupling devices 106, 108, and 110 in FIG. 1 are by way of example only, and that in other embodiments, other uses are possible. For instance, dielectric waveguide coupling devices can be used in a backhaul communication system, providing network connectivity to base station devices. Dielectric waveguide coupling devices can be used in many circumstances where it is desirable to transmit guided-wave communications over a wire, whether insulated or not insulated. Dielectric waveguide coupling devices are improvements over other coupling devices due to no contact or limited physical and/or electrical contact with the wires that may carry high voltages. With dielectric waveguide coupling devices, the apparatus can be located away from the wire (e.g., spaced apart from the wire) and/or located on the wire so long as it is not electrically in contact with the wire, as the dielectric acts as an insulator, allowing for cheap, easy, and/or less complex installation. However, as previously noted conducting or non-dielectric couplers can be employed, particularly in configurations where the wires correspond to a telephone network, cable television network, broadband data service, fiber optic communications system or other network employing low voltages or having insulated transmission lines.

It is further noted, that while base station device 104 and macrocell site 102 are illustrated in an example embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as a 802.11 protocol, WIMAX protocol, Ultra Wideband protocol, Bluetooth protocol, Zigbee protocol or other wireless protocol.

Figure 2:
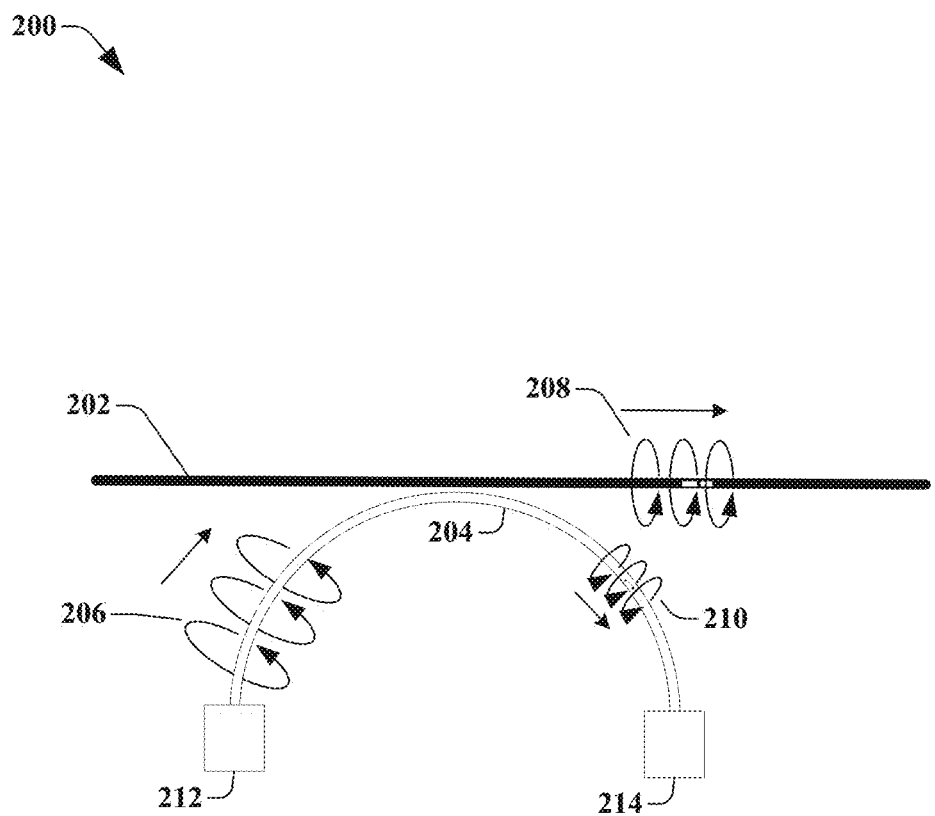
FIG. 2 is a block diagram illustrating an example, non-limiting embodiment of a dielectric waveguide coupler in accordance with various aspects described herein.

Turning now to FIG. 2, illustrated is a block diagram of an example, non-limiting embodiment of a dielectric waveguide coupling system 200 in accordance with various aspects described herein. System 200 comprises a dielectric waveguide 204 that has a wave 206 propagating as a guided-wave about a waveguide surface of the dielectric waveguide 204. In an example embodiment, the dielectric waveguide 204 is curved, and at least a portion of the waveguide 204 can be placed near a wire 202 in order to facilitate coupling between the waveguide 204 and the wire 202, as described herein. The dielectric waveguide 204 can be placed such that a portion of the curved dielectric waveguide 204 is parallel or substantially parallel to the wire 202. The portion of the dielectric waveguide 204 that is parallel to the wire can be an apex of the curve, or any point where a tangent of the curve is parallel to the wire 202. When the dielectric waveguide 204 is positioned or placed thusly, the wave 206 travelling along the dielectric waveguide 204 couples, at least in part, to the wire 202, and propagates as guided-wave 208 around or about the wire surface of the wire 202 and longitudinally along the wire 202. The guided-wave 208 can be characterized as a surface wave or other electromagnetic wave, although other types of guided-waves 208 can supported as well without departing from example embodiments. A portion of the wave 206 that does not couple to the wire 202 propagates as wave 210 along the dielectric waveguide 204. It will be appreciated that the dielectric waveguide 204 can be configured and arranged in a variety of positions in relation to the wire 202 to achieve a desired level of coupling or non-coupling of the wave 206 to the wire 202. For example, the curvature and/or length of the dielectric waveguide 204 that is parallel or substantially parallel, as well as its separation distance (which can include zero separation distance in an example embodiment), to the wire 202 can be varied without departing from example embodiments. Likewise, the arrangement of the dielectric waveguide 204 in relation to the wire 202 may be varied based upon considerations of the respective intrinsic characteristics (e.g., thickness, composition, electromagnetic properties, etc.) of the wire 202 and the dielectric waveguide 204, as well as the characteristics (e.g., frequency, energy level, etc.) of the waves 206 and 208.

The guided-wave 208 propagates in a direction parallel or substantially parallel to the wire 202, even as the wire 202 bends and flexes. Bends in the wire 202 can increase transmission losses, which are also dependent on wire diameters, frequency, and materials. If the dimensions of the dielectric waveguide 204 are chosen for efficient power transfer, most of the power in the wave 206 is transferred to the wire 202, with little power remaining in wave 210. It will be appreciated that the guided-wave 208 can still be multi-modal in nature (discussed herein), including having modes that are non-fundamental or asymmetric, while traveling along a path that is parallel or substantially parallel to the wire 202, with or without a fundamental transmission mode. In an example embodiment, non-fundamental or asymmetric modes can be utilized to minimize transmission losses and/or obtain increased propagation distances.

It is noted that the term parallel is generally a geometric construct which often is not exactly achievable in real systems. Accordingly, the term parallel as utilized in the subject disclosure represents an approximation rather than an exact configuration when used to describe embodiments disclosed in the subject disclosure. In an example embodiment, substantially parallel can include approximations that are within 30 degrees of true parallel in all dimensions.

In an example embodiment, the wave 206 can exhibit one or more wave propagation modes. The dielectric waveguide modes can be dependent on the shape and/or design of the waveguide 204. The one or more dielectric waveguide modes of wave 206 can generate, influence, or impact one or more wave propagation modes of the guided-wave 208 propagating along wire 202. In an example embodiment, the wave propagation modes on the wire 202 can be similar to the dielectric waveguide modes since both waves 206 and 208 propagate about the outside of the dielectric waveguide 204 and wire 202 respectively. In some embodiments, as the wave 206 couples to the wire 202, the modes can change form due to the coupling between the dielectric waveguide 204 and the wire 202. For example, differences in size, material, and/or impedances of the dielectric waveguide 204 and the wire 202 may create additional modes not present in the dielectric waveguide modes and/or suppress some of the dielectric waveguide modes. The wave propagation modes can comprise the fundamental transverse electromagnetic mode (Quasi-TEM$_{00}$), where only small electric and/or magnetic fields extend in the direction of propagation, and the electric and magnetic fields extend radially outwards while the guided-wave propagates along the wire. This guided-wave mode can be donut shaped, where few of the electromagnetic fields exist within the dielectric waveguide 204 or wire 202. Waves 206 and 208 can comprise a fundamental TEM mode where the fields extend radially outwards, and also comprise other, non-fundamental (e.g., asymmetric, higher-level, etc.) modes. While particular wave propagation modes are discussed above, other wave propagation modes are likewise possible such as transverse electric (TE) and transverse magnetic (TM) modes, based on the frequencies employed, the design of the dielectric waveguide 204, the dimensions and composition of the wire 202, as well as its surface characteristics, its optional insulation, the electromagnetic properties of the surrounding environment, etc. It should be noted that, depending on the frequency, the electrical and physical characteristics of the wire 202 and the particular wave propagation modes that are generated, the guided-wave 208 can travel along the conductive surface of an oxidized uninsulated wire, an unoxidized uninsulated wire, an insulated wire and/or along the insulating surface of an insulated wire.

In an example embodiment, a diameter of the dielectric waveguide 204 is smaller than the diameter of the wire 202. For the microwave or millimeter-band wavelength being used, the dielectric waveguide 204 supports a single waveguide mode that makes up wave 206. This single waveguide mode can change as it couples to the wire 202 as surface wave 208. If the dielectric waveguide 204 were larger, more than one waveguide mode can be supported, but these additional waveguide modes may not couple to the wire 202 as efficiently, and higher coupling losses can result. However, in some alternative embodiments, the diameter of the dielectric waveguide 204 can be equal to or larger than the diameter of the wire 202, for example, where higher coupling losses are desirable or when used in conjunction with other techniques to otherwise reduce coupling losses (e.g., impedance matching with tapering, etc.).

In an example embodiment, the wavelength of the waves 206 and 208 are comparable in size, or smaller than a circumference of the dielectric waveguide 204 and the wire 202. In an example, if the wire 202 has a diameter of 0.5 cm, and a corresponding circumference of around 1.5 cm, the wavelength of the transmission is around 1.5 cm or less, corresponding to a frequency of 20 GHz or greater. In another embodiment, a suitable frequency of the transmission and the carrier-wave signal is in the range of 30-100 GHz, perhaps around 30-60 GHz, and around 38 GHz in one example. In an example embodiment, when the circumference of the dielectric waveguide 204 and wire 202 is comparable in size to, or greater, than a wavelength of the transmission, the waves 206 and 208 can exhibit multiple wave propagation modes including fundamental and/or non-fundamental (symmetric and/or asymmetric) modes that propagate over sufficient distances to support various communication systems described herein. The waves 206 and 208 can therefore comprise more than one type of electric and magnetic field configuration. In an example embodiment, as the guided-wave 208 propagates down the wire 202, the electrical and magnetic field configurations will remain the same from end to end of the wire 202. In other embodiments, as the guided-wave 208 encounters interference or loses energy due to transmission losses, the electric and magnetic field configurations can change as the guided-wave 208 propagates down wire 202.

In an example embodiment, the dielectric waveguide 204 can be composed of nylon, Teflon, polyethylene, a polyamide, or other plastics. In other embodiments, other dielectric materials are possible. The wire surface of wire 202 can be metallic with either a bare metallic surface, or can be insulated using plastic, dielectric, insulator or other sheathing. In an example embodiment, a dielectric or otherwise non-conducting/insulated waveguide can be paired with either a bare/metallic wire or insulated wire. In other embodiments, a metallic and/or conductive waveguide can be paired with a bare/metallic wire or insulated wire. In an example embodiment, an oxidation layer on the bare metallic surface of the wire 202 (e.g., resulting from exposure of the bare metallic surface to oxygen/air) can also provide insulating or dielectric properties similar to those provided by some insulators or sheathings.

It is noted that the graphical representations of waves 206, 208 and 210 are presented merely to illustrate the principles that wave 206 induces or otherwise launches a guided-wave 208 on a wire 202 that operates, for example, as a single wire transmission line. Wave 210 represents the portion of wave 206 that remains on the dielectric waveguide 204 after the generation of guided-wave 208. The actual electric and magnetic fields generated as a result of such wave propagation may vary depending on the frequencies employed, the particular wave propagation mode or modes, the design of the dielectric waveguide 204, the dimensions and composition of the wire 202, as well as its surface characteristics, its optional insulation, the electromagnetic properties of the surrounding environment, etc.

It is noted that dielectric waveguide 204 can include a termination circuit or damper 214 at the end of the dielectric waveguide 204 that can absorb leftover radiation or energy from wave 210. The termination circuit or damper 214 can prevent and/or minimize the leftover radiation from wave 210 reflecting back toward transmitter circuit 212. In an example embodiment, the termination circuit or damper 214 can include termination resistors, and/or other components that perform impedance matching to attenuate reflection. In some embodiments, if the coupling efficiencies are high enough, and/or wave 210 is sufficiently small, it may not be necessary to use a termination circuit or damper 214. For the sake of simplicity, these transmitter and termination circuits or dampers 212 and 214 are not depicted in the other figures, but in those embodiments, transmitter and termination circuits or dampers may possibly be used.

Further, while a single dielectric waveguide 204 is presented that generates a single guided-wave 208, multiple dielectric waveguides 204 placed at different points along the wire 202 and/or at different axial orientations about the wire can be employed to generate and receive multiple guided-waves 208 at the same or different frequencies, at the same or different phases, and/or at the same or different wave propagation modes. The guided-wave or waves 208 can be modulated to convey data via a modulation technique such as phase shift keying, frequency shift keying, quadrature amplitude modulation, amplitude modulation, multi-carrier modulation and via multiple access techniques such as frequency division multiplexing, time division multiplexing, code division multiplexing, multiplexing via differing wave propagation modes and via other modulation and access strategies.

Figure 3:
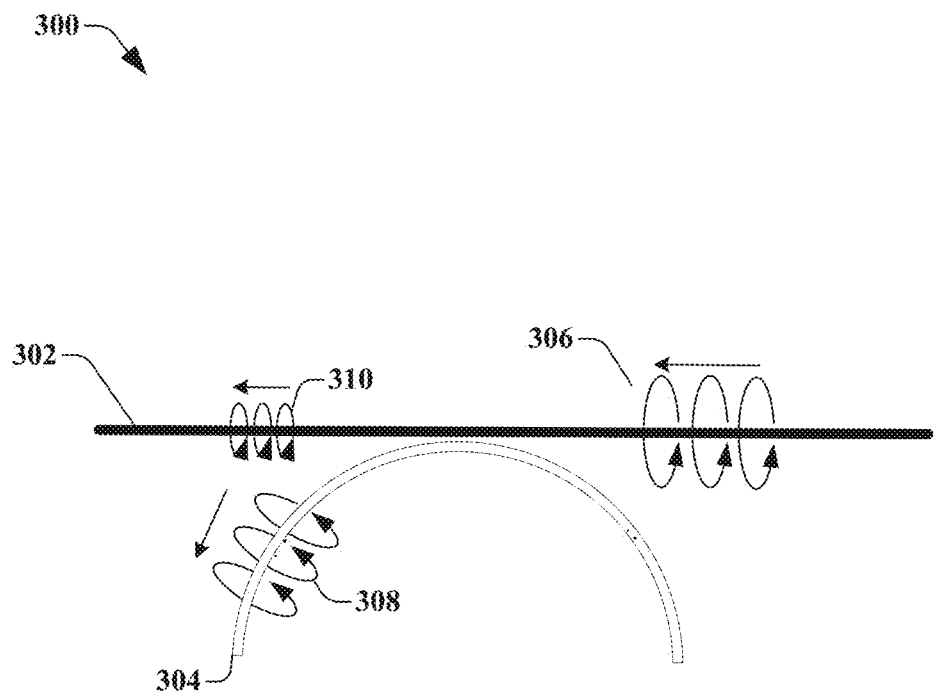
FIG. 3 is a block diagram illustrating an example, non-limiting embodiment of a dielectric waveguide coupler in accordance with various aspects described herein.

Turning now to FIG. 3, illustrated is a block diagram of an example, non-limiting embodiment of a dielectric waveguide coupling system 300 in accordance with various aspects described herein. System 300 implements a coupler that comprises a dielectric waveguide 304 and a wire 302 that has a wave 306 propagating as a guided-wave about a wire surface of the wire 302. In an example embodiment, the wave 306 can be characterized as a surface wave or other electromagnetic wave.

In an example embodiment, the dielectric waveguide 304 is curved or otherwise has a curvature, and can be placed near a wire 302 such that a portion of the curved dielectric waveguide 304 is parallel or substantially parallel to the wire 302. The portion of the dielectric waveguide 304 that is parallel to the wire can be an apex of the curve, or any point where a tangent of the curve is parallel to the wire 302. When the dielectric waveguide 304 is near the wire, the guided-wave 306 travelling along the wire 302 can couple to the dielectric waveguide 304 and propagate as guided-wave 308 about the dielectric waveguide 304. A portion of the guided-wave 306 that does not couple to the dielectric waveguide 304 propagates as guided-wave 310 (e.g., surface wave or other electromagnetic wave) along the wire 302.

The guided-waves 306 and 308 stay parallel to the wire 302 and dielectric waveguide 304, respectively, even as the wire 302 and dielectric waveguide 304 bend and flex. Bends can increase transmission losses, which are also dependent on wire diameters, frequency, and materials. If the dimensions of the dielectric waveguide 304 are chosen for efficient power transfer, most of the energy in the guided-wave 306 is coupled to the dielectric waveguide 304 and little remains in guided-wave 310.

In an example embodiment, a receiver circuit can be placed on the end of waveguide 304 in order to receive wave 308. A termination circuit can be placed on the opposite end of the waveguide 304 in order to receive guided-waves traveling in the opposite direction to guided-wave 306 that couple to the waveguide 304. The termination circuit would thus prevent and/or minimize reflections being received by the receiver circuit. If the reflections are small, the termination circuit may not be necessary.

It is noted that the dielectric waveguide 304 can be configured such that selected polarizations of the surface wave 306 are coupled to the dielectric waveguide 304 as guided-wave 308. For instance, if guided-wave 306 is made up of guided-waves or wave propagation modes with respective polarizations, dielectric waveguide 304 can be configured to receive one or more guided-waves of selected polarization(s). Guided-wave 308 that couples to the dielectric waveguide 304 is thus the set of guided-waves that correspond to one or more of the selected polarization(s), and further guided-wave 310 can comprise the guided-waves that do not match the selected polarization(s).

The dielectric waveguide 304 can be configured to receive guided-waves of a particular polarization based on an angle/rotation around the wire 302 that the dielectric waveguide 304 is placed (the axial orientation of the coupler) and the axial pattern of the field structure of the guided-waves. For instance, if the coupler is oriented to feed the guided-waves along the horizontal access and if the guided-wave 306 is polarized horizontally (i.e. the filed structure of the guided-waves are concentrated on the horizontal axis), most of the guided-wave 306 transfers to the dielectric waveguide as wave 308. In another instance, if the dielectric waveguide 304 is rotated 90 degrees around the wire 302, most of the energy from guided-wave 306 would remain coupled to the wire as guided-wave 310, and only a small portion would couple to the wire 302 as wave 308.

It is noted that waves 306, 308, and 310 are shown using three circular symbols in FIG. 3 and in other figures in the specification. These symbols are used to represent a general guided-wave, but do not imply that the waves 306, 308, and 310 are necessarily circularly polarized or otherwise circularly oriented. In fact, waves 306, 308, and 310 can comprise a fundamental TEM mode where the fields extend radially outwards, and also comprise other, non-fundamental (e.g. higher-level, etc.) modes. These modes can be asymmetric (e.g., radial, bilateral, trilateral, quadrilateral, etc) in nature as well.

It is noted also that guided-wave communications over wires can be full duplex, allowing simultaneous communications in both directions. Waves traveling one direction can pass through waves traveling in an opposite direction. Electromagnetic fields may cancel out at certain points and for short times due to the superposition principle as applied to waves. The waves traveling in opposite directions propagate as if the other waves weren't there, but the composite effect to an observer may be a stationary standing wave pattern. As the guided-waves pass through each other and are no longer in a state of superposition, the interference subsides. As a guided-wave (e.g., surface wave or other electromagnetic wave) couples to a waveguide and moves away from the wire, any interference due to other guided-waves (e.g., surface waves or other electromagnetic waves) decreases. In an example embodiment, as guided-wave 306 (e.g., surface wave or other electromagnetic wave) approaches dielectric waveguide 304, another guided-wave (e.g., surface wave or other electromagnetic wave) (not shown) traveling from left to right on the wire 302 passes by causing local interference. As guided-wave 306 couples to dielectric waveguide 304 as wave 308, and moves away from the wire 302, any interference due to the passing guided-wave subsides.

It is noted that the graphical representations of electromagnetic waves 306, 308 and 310 are presented merely to illustrate the principles that guided-wave 306 induces or otherwise launches a wave 308 on a dielectric waveguide 304. Guided-wave 310 represents the portion of guided-wave 306 that remains on the wire 302 after the generation of wave 308. The actual electric and magnetic fields generated as a result of such guided-wave propagation may vary depending on one or more of the shape and/or design of the dielectric waveguide, the relative position of the dielectric waveguide to the wire, the frequencies employed, the design of the dielectric waveguide 304, the dimensions and composition of the wire 302, as well as its surface characteristics, its optional insulation, the electromagnetic properties of the surrounding environment, etc.

Figure 4:
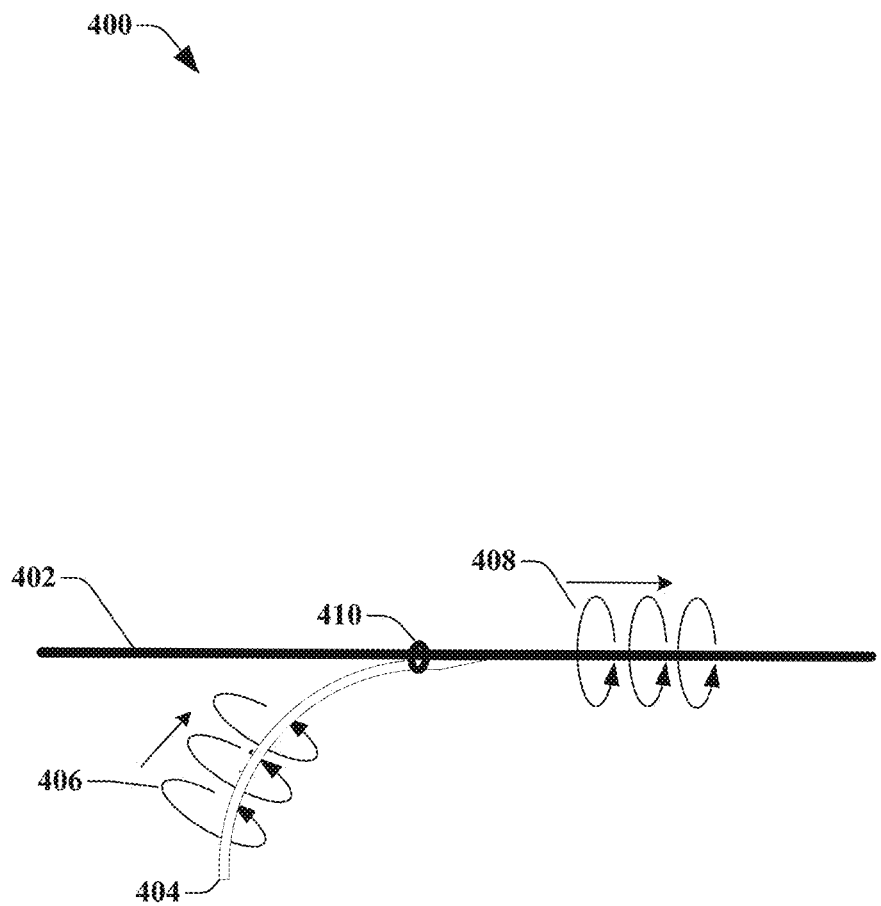
FIG. 4 is a block diagram illustrating an example, non-limiting embodiment of a dielectric waveguide coupler in accordance with various aspects described herein.

Turning now to FIG. 4, illustrated is a block diagram of an example, non-limiting embodiment of a dielectric waveguide coupling system 400 in accordance with various aspects described herein. System 400 implements a coupler that comprises a dielectric waveguide 404 that has a wave 406 propagating as a guided-wave about a waveguide surface of the dielectric waveguide 404. In an example embodiment, the dielectric waveguide 404 is curved, and an end of the dielectric waveguide 404 can be tied, fastened, or otherwise mechanically coupled to a wire 402. When the end of the dielectric waveguide 404 is fastened to the wire 402, the end of the dielectric waveguide 404 is parallel or substantially parallel to the wire 402. Alternatively, another portion of the dielectric waveguide beyond an end can be fastened or coupled to wire 402 such that the fastened or coupled portion is parallel or substantially parallel to the wire 402. The coupling device 410 can be a nylon cable tie or other type of non-conducting/dielectric material that is either separate from the dielectric waveguide 404 or constructed as an integrated component of the dielectric waveguide 404. In other embodiments, the dielectric waveguide 404 can be mechanically uncoupled from the wire 402 leaving an air gap between the coupler and the wire 402. The dielectric waveguide 404 can be adjacent to the wire 402 without surrounding the wire 402.

When the dielectric waveguide 404 is placed with the end parallel to the wire 402, the guided-wave 406 travelling along the dielectric waveguide 404 couples to the wire 402, and propagates as guided-wave 408 about the wire surface of the wire 402. In an example embodiment, the guided-wave 408 can be characterized as a surface wave or other electromagnetic wave.

It is noted that the graphical representations of waves 406 and 408 are presented merely to illustrate the principles that wave 406 induces or otherwise launches a guided-wave 408 on a wire 402 that operates, for example, as a single wire transmission line. The actual electric and magnetic fields generated as a result of such wave propagation may vary depending on one or more of the shape and/or design of the dielectric waveguide, the relative position of the dielectric waveguide to the wire, the frequencies employed, the design of the dielectric waveguide 404, the dimensions and composition of the wire 402, as well as its surface characteristics, its optional insulation, the electromagnetic properties of the surrounding environment, etc.

In an example embodiment, an end of dielectric waveguide 404 can taper towards the wire 402 in order to increase coupling efficiencies. Indeed, the tapering of the end of the dielectric waveguide 404 can provide impedance matching to the wire 402, according to an example embodiment of the subject disclosure. For example, an end of the dielectric waveguide 404 can be gradually tapered in order to obtain a desired level of coupling between waves 406 and 408 as illustrated in FIG. 4.

In an example embodiment, the coupling device 410 can be placed such that there is a short length of the dielectric waveguide 404 between the coupling device 410 and an end of the dielectric waveguide 404. Maximum coupling efficiencies are realized when the length of the end of the dielectric waveguide 404 that is beyond the coupling device 410 is at least several wavelengths long for whatever frequency is being transmitted, however shorter lengths are also possible.

Figure 5:
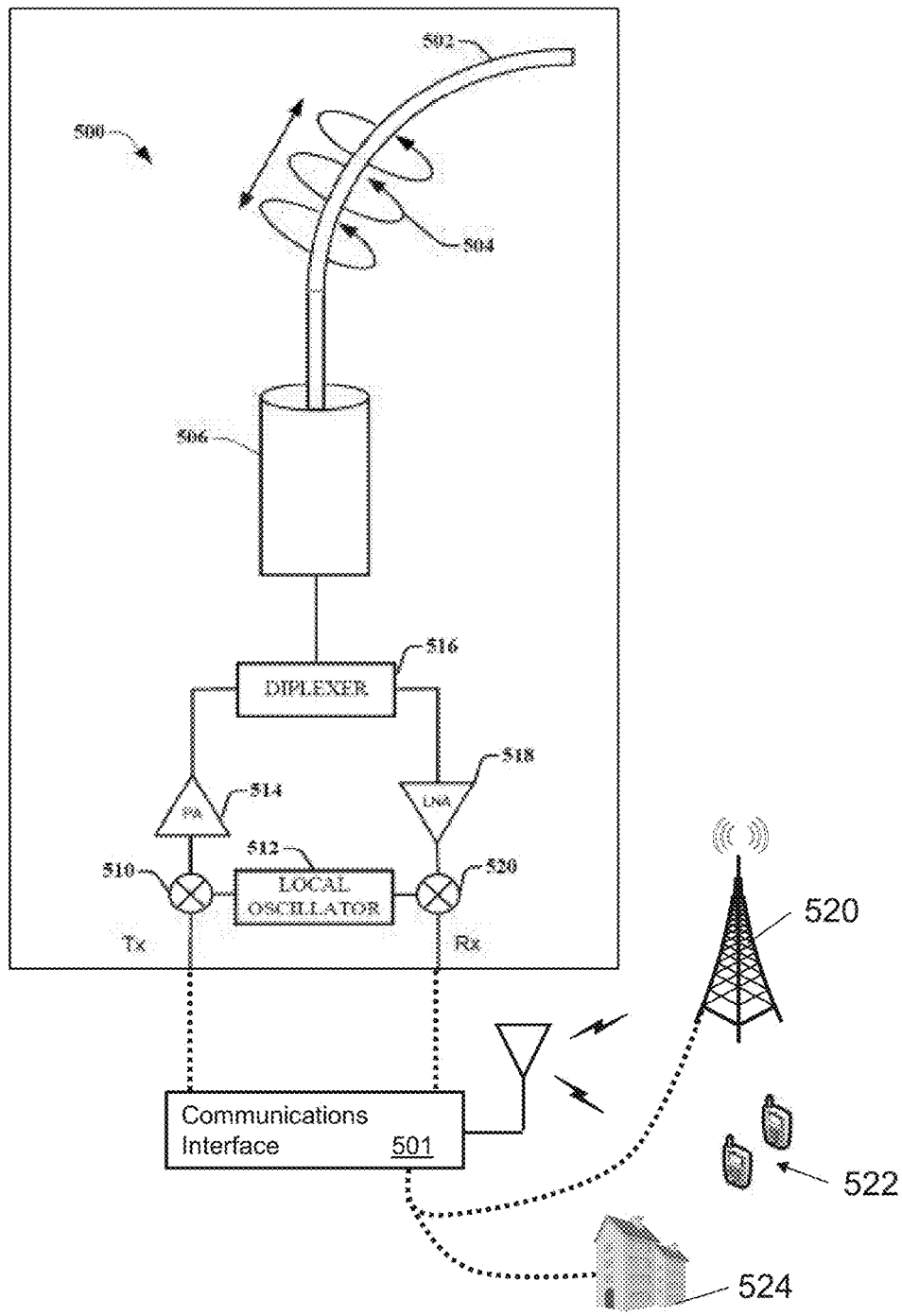
FIG. 5 is a block diagram illustrating an example, non-limiting embodiment of a dielectric waveguide coupler and transceiver in accordance with various aspects described herein.

Turning now to FIG. 5, illustrated is a block diagram of an example, non-limiting embodiment of a dielectric waveguide coupler and transceiver system 500 (referred to herein collectively as system 500) in accordance with various aspects described herein. System 500 implements a transmission device with a coupler that comprises a transmitter/receiver device 506 that launches and receives waves (e.g., guided-wave 504 onto dielectric waveguide 502). The guided-waves 504 can be used to transport signals received from and sent to a base station device 508, mobile devices 522, or a building 524 by way of a communications interface 501. The communications interface 501 can be an integral part of system 500. Alternatively, the communications interface 501 can be tethered to system 500. The communications interface 501 can comprise a wireless interface for interfacing to the base station 508, the mobile devices 522, or building 524 utilizing any of various wireless signaling protocols (e.g., LTE, WiFi, WiMAX, etc.). The communications interface 501 can also comprise a wired interface such as a fiber optic line, coaxial cable, twisted pair, or other suitable wired mediums for transmitting signals to the base station 508 or building 524. For embodiments where system 500 functions as a repeater, the communications interface 501 may not be necessary.

The output signals (e.g., Tx) of the communications interface 501 can be combined with a millimeter-wave carrier wave generated by a local oscillator 512 at frequency mixer 510. Frequency mixer 510 can use heterodyning techniques or other frequency shifting techniques to frequency shift the output signals from communications interface 501. For example, signals sent to and from the communications interface 501 can be modulated signals such as orthogonal frequency division multiplexed (OFDM) signals formatted in accordance with a Long-Term Evolution (LTE) wireless protocol or other wireless 3G, 4G, 5G or higher voice and data protocol, a Zigbee, WIMAX, Ultra Wideband or IEEE 802.11 wireless protocol or other wireless protocol. In an example embodiment, this frequency conversion can be done in the analog domain, and as a result, the frequency shifting can be done without regard to the type of communications protocol that the base station 508, mobile devices 522, or in-building devices 524 use. As new communications technologies are developed, the communications interface 501 can be upgraded or replaced and the frequency shifting and transmission apparatus can remain, simplifying upgrades. The carrier wave can then be sent to a power amplifier ("PA") 514 and can be transmitted via the transmitter receiver device 506 via the diplexer 516.

Signals received from the transmitter/receiver device 506 that are directed towards the communications interface 501 can be separated from other signals via diplexer 516. The transmission can then be sent to low noise amplifier ("LNA") 518 for amplification. A frequency mixer 520, with help from local oscillator 512 can downshift the transmission (which is in the millimeter-wave band or around 38 GHz in some embodiments) to the native frequency. The communications interface 501 can then receive the transmission at an input port (Rx).

In an example embodiment, transmitter/receiver device 506 can include a cylindrical or non-cylindrical metal (which, for example, can be hollow in an example embodiment) or other conducting or non-conducting waveguide and an end of the dielectric waveguide 502 can be placed in or in proximity to the waveguide or the transmitter/receiver device 506 such that when the transmitter/receiver device 506 generates a transmission, the guided-wave couples to dielectric waveguide 502 and propagates as a guided-wave 504 about the waveguide surface of the dielectric waveguide 502. Similarly, if guided-wave 504 is incoming (coupled to the dielectric waveguide 502 from a wire), guided-wave 504 then enters the transmitter/receiver device 506 and couples to the cylindrical waveguide or conducting waveguide. While transmitter/receiver device 506 is shown to include a separate waveguide—an antenna, cavity resonator, klystron, magnetron, travelling wave tube or other radiating element can be employed to induce a guided-wave on the waveguide 502, without the separate waveguide.

In an example embodiment, dielectric waveguide 502 can be wholly constructed of a dielectric material (or another suitable insulating material), without any metallic or otherwise conducting materials therein. Dielectric waveguide 502 can be composed of nylon, Teflon, polyethylene, a polyamide, other plastics, or other materials that are non-conducting and suitable for facilitating transmission of electromagnetic waves on an outer surface of such materials. In another embodiment, dielectric waveguide 502 can include a core that is conducting/metallic, and have an exterior dielectric surface. Similarly, a transmission medium that couples to the dielectric waveguide 502 for propagating electromagnetic waves induced by the dielectric waveguide 502 or for supplying electromagnetic waves to the dielectric waveguide 502 can be wholly constructed of a dielectric material (or another suitable insulating material), without any metallic or otherwise conducting materials therein.

It is noted that although FIG. 5 shows that the opening of transmitter receiver device 506 is much wider than the dielectric waveguide 502, this is not to scale, and that in other embodiments the width of the dielectric waveguide 502 is comparable or slightly smaller than the opening of the hollow waveguide. It is also not shown, but in an example embodiment, an end of the waveguide 502 that is inserted into the transmitter/receiver device 506 tapers down in order to reduce reflection and increase coupling efficiencies.

The transceiver system 500 can be communicably coupled to a communications interface 501, and alternatively, transceiver system 500 can also be communicably coupled via the communications interface 501 to the one or more distributed antennas 112 and 114 shown in FIG. 1. In other embodiments, transceiver system 500 can comprise part of a repeater system for a backhaul network.

Before coupling to the dielectric waveguide 502, the one or more waveguide modes of the guided-wave generated by the transmitter/receiver device 506 can couple to one or more wave propagation modes of the guided-wave 504. The wave propagation modes can be different than the hollow metal waveguide modes due to the different characteristics of the hollow metal waveguide and the dielectric waveguide. For instance, wave propagation modes can comprise the fundamental transverse electromagnetic mode (Quasi-TE-Moo), where only small electrical and/or magnetic fields extend in the direction of propagation, and the electric and magnetic fields extend radially outwards from the wire while the guided-waves propagate along the wire. The fundamental transverse electromagnetic mode wave propagation mode does not exist inside a waveguide that is hollow. Therefore, the hollow metal waveguide modes that are used by the transmitter/receiver device 506 are waveguide modes that can couple effectively and efficiently to wave propagation modes of the dielectric waveguide 502.

Figure 6:
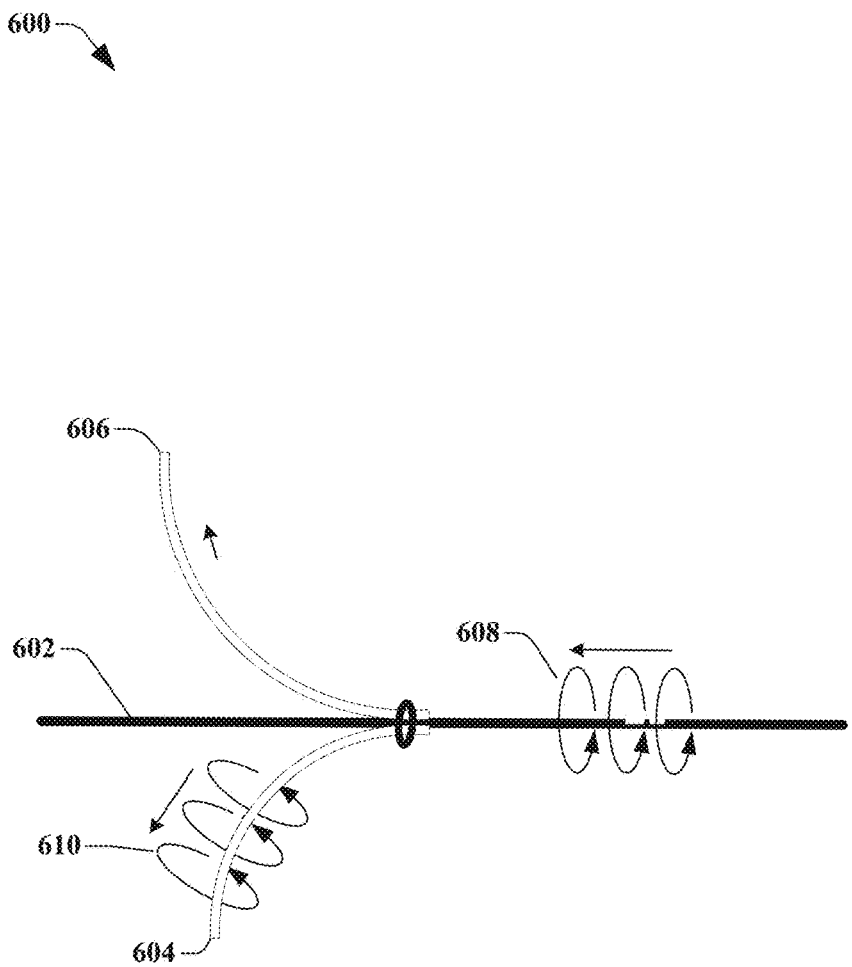
FIG. 6 is a block diagram illustrating an example, non-limiting embodiment of a dual dielectric waveguide coupler in accordance with various aspects described herein.

Turning now to FIG. 6, illustrated is a block diagram illustrating an example, non-limiting embodiment of a dual dielectric waveguide coupling system 600 in accordance with various aspects described herein. In an example embodiment, a coupling module is shown with two or more dielectric waveguides (e.g., 604 and 606) positioned around a wire 602 in order to receive guided-wave 608. In an example embodiment, the guided-wave 608 can be characterized as a surface wave or other electromagnetic wave. In an example embodiment, one dielectric waveguide is enough to receive the guided-wave 608. In that case, guided-wave 608 couples to dielectric waveguide 604 and propagates as guided-wave 610. If the field structure of the guided-wave 608 oscillates or undulates around the wire 602 due to various outside factors, then dielectric waveguide 606 can be placed such that guided-wave 608 couples to dielectric waveguide 606. In some embodiments, four or more dielectric waveguides can be placed around a portion of the wire 602, e.g., at 90 degrees or another spacing with respect to each other, in order to receive guided-waves that may oscillate or rotate around the wire 602, that have been induced at different axial orientations or that have non-fundamental or higher order modes that, for example, have lobes and/or nulls or other asymmetries that are orientation dependent. However, it will be appreciated that there may be less than or more than four dielectric waveguides placed around a portion of the wire 602 without departing from example embodiments. It will also be appreciated that while some example embodiments have presented a plurality of dielectric waveguides around at least a portion of a wire 602, this plurality of dielectric waveguides can also be considered as part of a single dielectric waveguide system having multiple dielectric waveguide subcomponents. For example, two or more dielectric waveguides can be manufactured as single system that can be installed around a wire in a single installation such that the dielectric waveguides are either pre-positioned or adjustable relative to each other (either manually or automatically) in accordance with the single system. Receivers coupled to dielectric waveguides 606 and 604 can use diversity combining to combine signals received from both dielectric waveguides 606 and 604 in order to maximize the signal quality. In other embodiments, if one or the other of a dielectric waveguide 604 and 606 receives a transmission that is above a predetermined threshold, receivers can use selection diversity when deciding which signal to use.

It is noted that the graphical representations of waves 608 and 610 are presented merely to illustrate the principles that guided-wave 608 induces or otherwise launches a wave 610 on a dielectric waveguide 604. The actual electric and magnetic fields generated as a result of such wave propagation may vary depending on the frequencies employed, the design of the dielectric waveguide 604, the dimensions and composition of the wire 602, as well as its surface characteristics, its optional insulation, the electromagnetic properties of the surrounding environment, etc.

Figure 7:
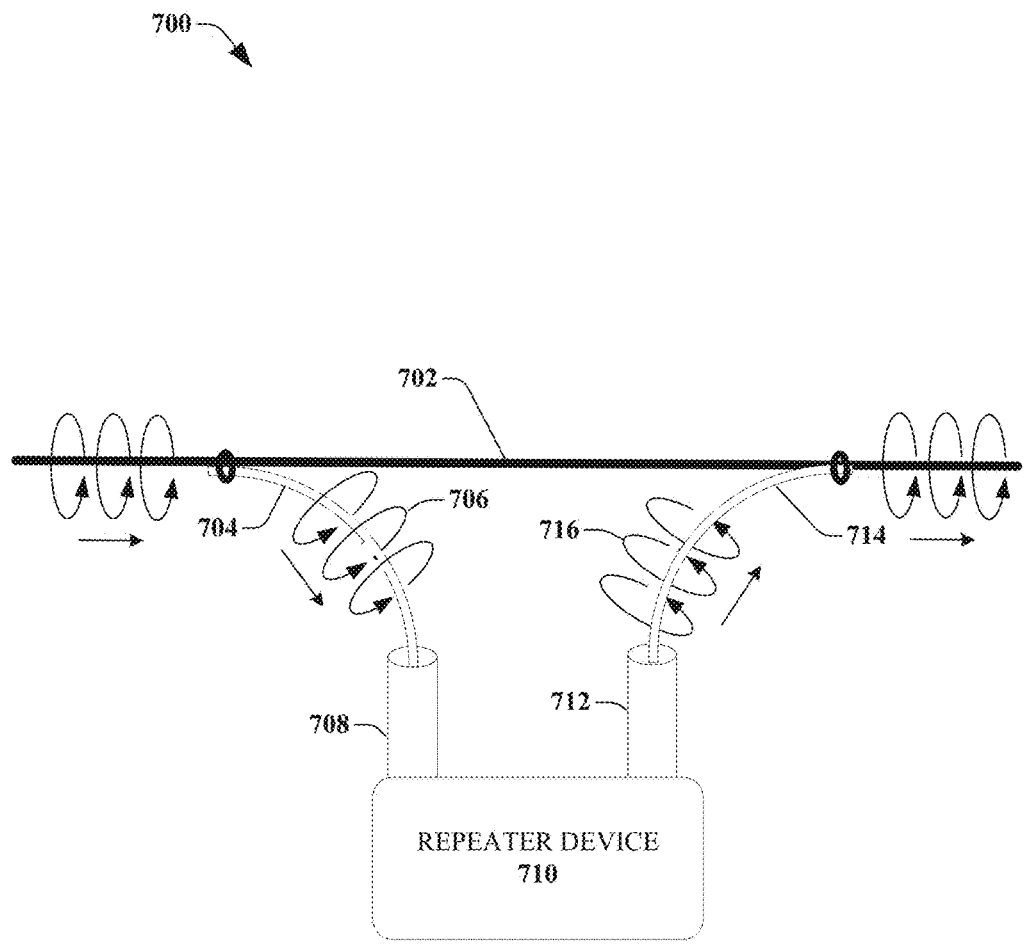
FIG. 7 is a block diagram illustrating an example, non-limiting embodiment of a bidirectional dielectric waveguide coupler in accordance with various aspects described herein.

Turning now to FIG. 7, illustrated is a block diagram of an example, non-limiting embodiment of a bidirectional dielectric waveguide coupling system 700 in accordance with various aspects described herein. Such a system 700 implements a transmission device with a coupling module that includes two dielectric waveguides 704 and 714 can be placed near a wire 702 such that guided-waves (e.g., surface waves or other electromagnetic waves) propagating along the wire 702 are coupled to dielectric waveguide 704 as wave 706, and then are boosted or repeated by repeater device 710 and launched as a guided-wave 716 onto dielectric waveguide 714. The guided-wave 716 can then couple to wire 702 and continue to propagate along the wire 702. In an example embodiment, the repeater device 710 can receive at least a portion of the power utilized for boosting or repeating through magnetic coupling with the wire 702, which can be a power line.

In some embodiments, repeater device 710 can repeat the transmission associated with wave 706, and in other embodiments, repeater device 710 can be associated with a distributed antenna system and/or base station device located near the repeater device 710. Receiver waveguide 708 can receive the wave 706 from the dielectric waveguide 704 and transmitter waveguide 712 can launch guided-wave 716 onto dielectric waveguide 714. Between receiver waveguide 708 and transmitter waveguide 712, the signal can be amplified to correct for signal loss and other inefficiencies associated with guided-wave communications or the signal can be received and processed to extract the data contained therein and regenerated for transmission. In an example embodiment, a signal can be extracted from the transmission and processed and otherwise emitted to mobile devices nearby via distributed antennas communicably coupled to the repeater device 710. Similarly, signals and/or communications received by the distributed antennas can be inserted into the transmission that is generated and launched onto dielectric waveguide 714 by transmitter waveguide 712. Accordingly, the repeater system 700 depicted in FIG. 7 can be comparable in function to the dielectric waveguide coupling device 108 and 110 in FIG. 1.

It is noted that although FIG. 7 shows guided-wave transmissions 706 and 716 entering from the left and exiting to the right respectively, this is merely a simplification and is not intended to be limiting. In other embodiments, receiver waveguide 708 and transmitter waveguide 712 can also function as transmitters and receivers respectively, allowing the repeater device 710 to be bi-directional.

In an example embodiment, repeater device 710 can be placed at locations where there are discontinuities or obstacles on the wire 702. These obstacles can include transformers, connections, utility poles, and other such power line devices. The repeater device 710 can help the guided (e.g., surface) waves jump over these obstacles on the line and boost the transmission power at the same time. In other embodiments, a dielectric waveguide can be used to jump over the obstacle without the use of a repeater device. In that embodiment, both ends of the dielectric waveguide can be tied or fastened to the wire, thus providing a path for the guided-wave to travel without being blocked by the obstacle.

Figure 8:
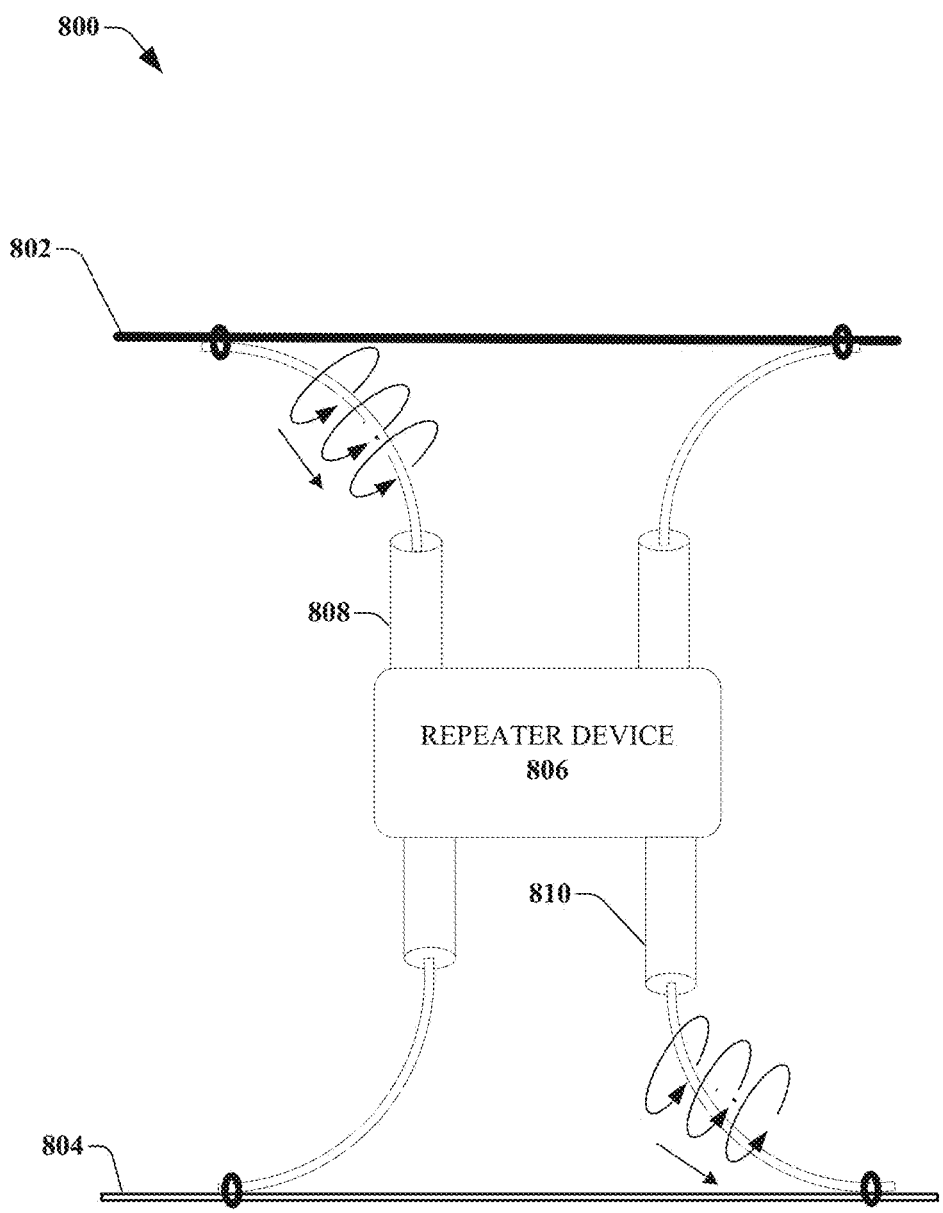
FIG. 8 illustrates a block diagram illustrating an example, non-limiting embodiment of a bidirectional dielectric waveguide coupler in accordance with various aspects described herein.

Turning now to FIG. 8, illustrated is a block diagram of an example, non-limiting embodiment of a bidirectional dielectric waveguide coupler 800 in accordance with various aspects described herein. The bidirectional dielectric waveguide coupler 800 implements a transmission device with a coupling module that can employ diversity paths in the case of when two or more wires are strung between utility poles. Since guided-wave transmissions have different transmission efficiencies and coupling efficiencies for insulated wires and un-insulated wires based on weather, precipitation and atmospheric conditions, it can be advantageous to selectively transmit on either an insulated wire or un-insulated wire at certain times.

In the embodiment shown in FIG. 8, the repeater device uses a receiver waveguide 808 to receive a guided-wave traveling along uninsulated wire 802 and repeats the transmission using transmitter waveguide 810 as a guided-wave along insulated wire 804. In other embodiments, repeater device can switch from the insulated wire 804 to the un-insulated wire 802, or can repeat the transmissions along the same paths. Repeater device 806 can include sensors, or be in communication with sensors that indicate conditions that can affect the transmission. Based on the feedback received from the sensors, the repeater device 806 can make the determination about whether to keep the transmission along the same wire, or transfer the transmission to the other wire.

Figure 9:
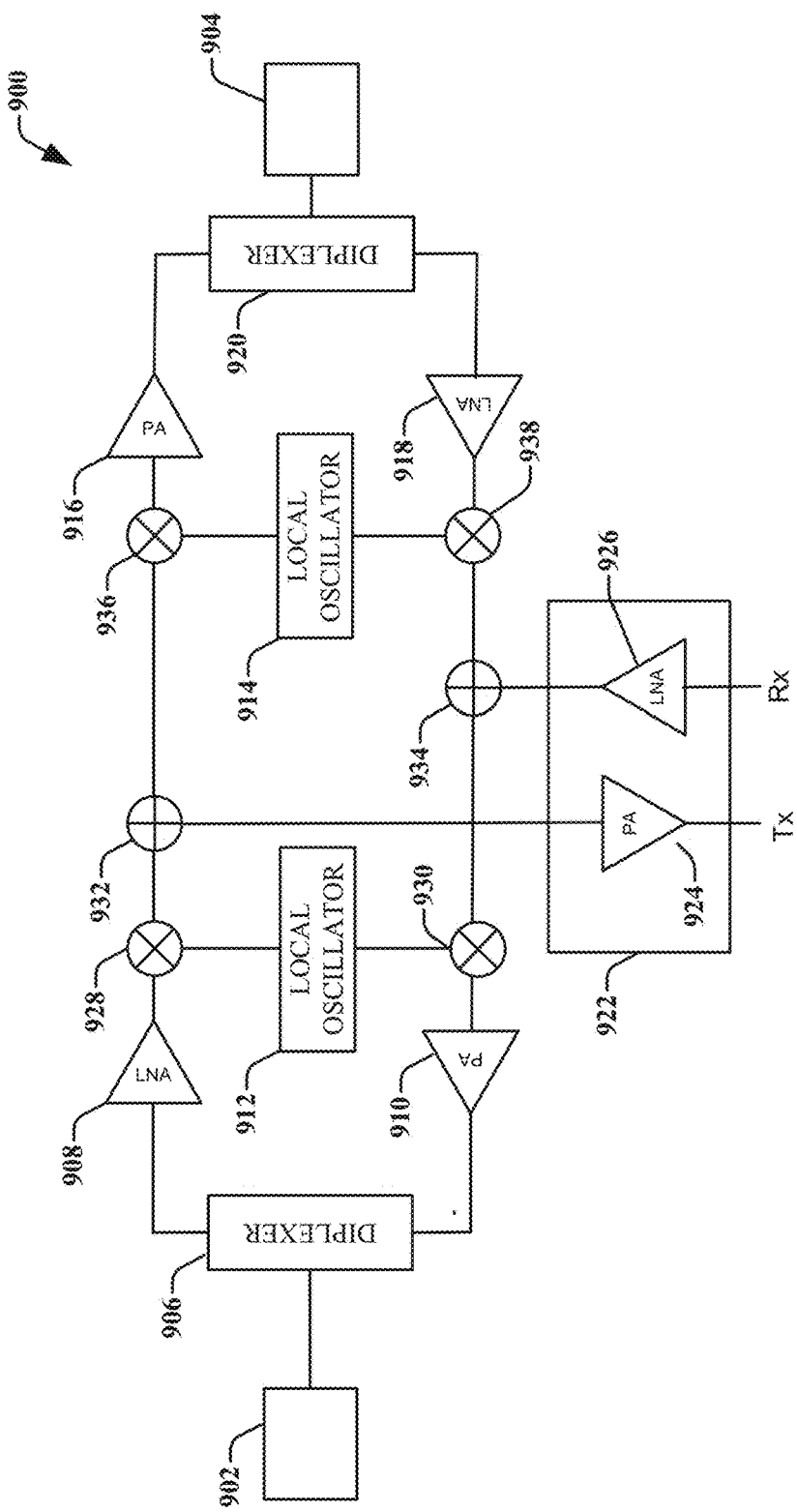
FIG. 9 illustrates a block diagram illustrating an example, non-limiting embodiment of a bidirectional repeater system in accordance with various aspects described herein.

Turning now to FIG. 9, illustrated is a block diagram illustrating an example, non-limiting embodiment of a bidirectional repeater system 900. Bidirectional repeater system 900 implements a transmission device with a coupling module that includes waveguide coupling devices 902 and 904 that receive and transmit transmissions from other coupling devices located in a distributed antenna system or backhaul system.

In various embodiments, waveguide coupling device 902 can receive a transmission from another waveguide coupling device, wherein the transmission has a plurality of subcarriers. Diplexer 906 can separate the transmission from other transmissions, for example by filtration, and direct the transmission to low-noise amplifier ("LNA") 908. A frequency mixer 928, with help from a local oscillator 912, can downshift the transmission (which is in the millimeter-wave band or around 38 GHz in some embodiments) to a lower frequency, whether it is a cellular band (~1.9 GHz) for a distributed antenna system, a native frequency, or other frequency for a backhaul system. An extractor 932 can extract the signal on the subcarrier that corresponds to the antenna or other output component 922 and direct the signal to the output component 922. For the signals that are not being extracted at this antenna location, extractor 932 can redirect them to another frequency mixer 936, where the signals are used to modulate a carrier wave generated by local oscillator 914. The carrier wave, with its subcarriers, is directed to a power amplifier ("PA") 916 and is retransmitted by waveguide coupling device 904 to another repeater system, via diplexer 920.

At the output device 922, a PA 924 can boost the signal for transmission to the mobile device. An LNA 926 can be used to amplify weak signals that are received from the mobile device and then send the signal to a multiplexer 934 which merges the signal with signals that have been received from waveguide coupling device 904. The output device 922 can be coupled to an antenna in a distributed antenna system or other antenna via, for example, a diplexer, duplexer or a transmit receive switch not specifically shown. The signals received from coupling device 904 have been split by diplexer 920, and then passed through LNA 918, and downshifted in frequency by frequency mixer 938. When the signals are combined by multiplexer 934, they are upshifted in frequency by frequency mixer 930, and then boosted by PA 910, and transmitted back to the launcher or on to another repeater by waveguide coupling device 902. In an example embodiment, the bidirectional repeater system 900 can be just a repeater without the antenna/output device 922. It will be appreciated that in some embodiments, a bidirectional repeater system 900 could also be implemented using two distinct and separate uni-directional repeaters. In an alternative embodiment, a bidirectional repeater system 900 could also be a booster or otherwise perform retransmissions without downshifting and upshifting. Indeed in example embodiment, the retransmissions can be based upon receiving a signal or guided-wave and performing some signal or guided-wave processing or reshaping, filtering, and/or amplification, prior to retransmission of the signal or guided-wave.

Figure 10:
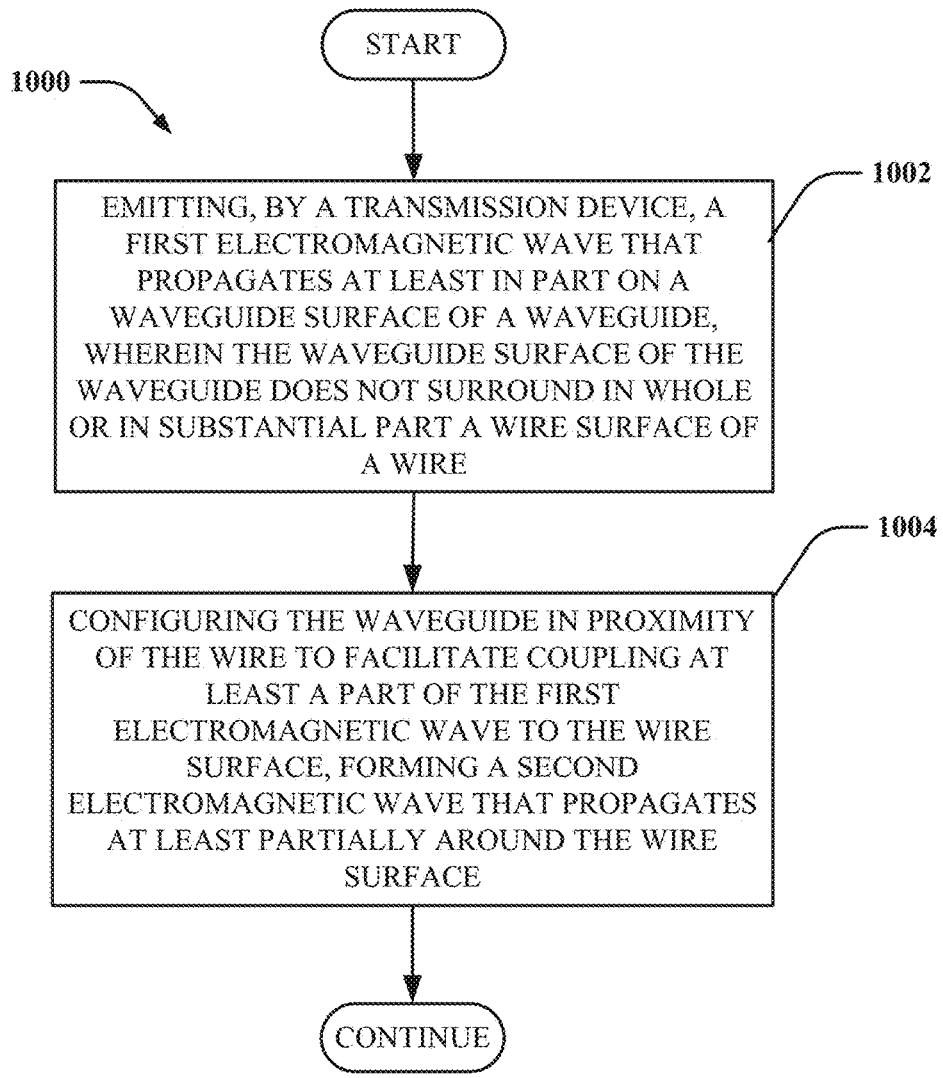
FIG. 10 illustrates a flow diagram of an example, non-limiting embodiment of a method for transmitting a transmission with a dielectric waveguide coupler as described herein.

FIG. 10 illustrates a process in connection with the aforementioned systems. The process in FIG. 10 can be implemented for example by systems 100, 200, 300, 400, 500, 600, 700, 800, and 900 illustrated in FIGS. 1-9 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 10 illustrates a flow diagram of an example, non-limiting embodiment of a method for transmitting a transmission with a dielectric waveguide coupler as described herein. Method 1000 can begin at 1002 where a first electromagnetic wave is emitted by a transmission device that propagates at least in part on a waveguide surface of a waveguide, wherein the waveguide surface of the waveguide does not surround in whole or in substantial part a wire surface of a wire. The transmission that is generated by a transmitter can be based on a signal received from a base station device, access point, network or a mobile device.

At 1004, based upon configuring the waveguide in proximity of the wire, the guided-wave then couples at least a part of the first electromagnetic wave to a wire surface, forming a second electromagnetic wave (e.g., a surface wave) that propagates at least partially around the wire surface, wherein the wire is in proximity to the waveguide. This can be done in response to positioning a portion of the dielectric waveguide (e.g., a tangent of a curve of the dielectric waveguide) near and parallel to the wire, wherein a wavelength of the electromagnetic wave is smaller than a circumference of the wire and the dielectric waveguide. The guided-wave, or surface wave, stays parallel to the wire even as the wire bends and flexes. Bends can increase transmission losses, which are also dependent on wire diameters, frequency, and materials. The coupling interface between the wire and the waveguide can also be configured to achieve the desired level of coupling, as described herein, which can include tapering an end of the waveguide to improve impedance matching between the waveguide and the wire.

The transmission that is emitted by the transmitter can exhibit one or more waveguide modes. The waveguide modes can be dependent on the shape and/or design of the waveguide. The propagation modes on the wire can be different than the waveguide modes due to the different characteristics of the waveguide and the wire. When the circumference of the wire is comparable in size to, or greater, than a wavelength of the transmission, the guided-wave exhibits multiple wave propagation modes. The guided-wave can therefore comprise more than one type of electric and magnetic field configuration. As the guided-wave (e.g., surface wave) propagates down the wire, the electrical and magnetic field configurations may remain substantially the same from end to end of the wire or vary as the transmission traverses the wave by rotation, dispersion, attenuation or other effects.

Figure 11:
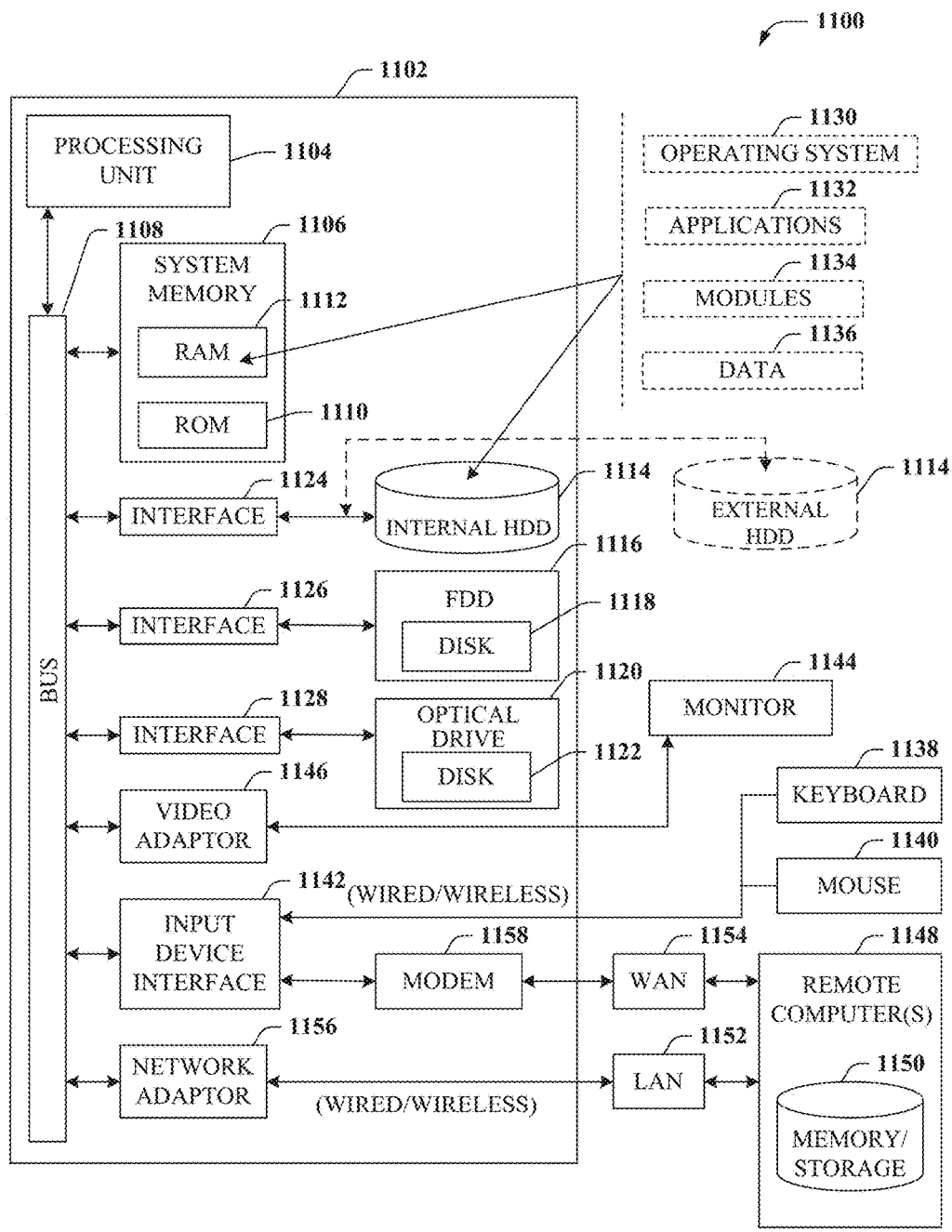
FIG. 11 is a block diagram of an example, non-limiting embodiment of a computing environment in accordance with various aspects described herein.

Referring now to FIG. 11, there is illustrated a block diagram of a computing environment in accordance with various aspects described herein. In order to provide additional context for various embodiments of the embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can be run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprise any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 11, the example environment 1100 for transmitting and receiving signals via base station (e.g., base station devices 104 and 508) and repeater devices (e.g., repeater devices 710, 806, and 900) comprises a computer 1102, the computer 1102 comprising a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems. Examples of application programs 1132 that can be implemented and otherwise executed by processing unit 1104 include the diversity selection determining performed by repeater device 806. Base station device 508 shown in FIG. 5, also has stored on memory many applications and programs that can be executed by processing unit 1104 in this exemplary computing environment 1100.

A user can enter commands and information into the computer 1102 through one or more wired/wireless input devices, e.g., a keyboard 1138 and a pointing device, such as a mouse 1140. Other input devices (not shown) can comprise a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. It will also be appreciated that in alternative embodiments, a monitor 1144 can also be any display device (e.g., another computer having a display, a smart phone, a tablet computer, etc.) for receiving display information associated with computer 1102 via any communication means, including via the Internet and cloud-based networks. In addition to the monitor 1144, a computer typically comprises other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also comprise a wireless AP disposed thereon for communicating with the wireless adapter 1156.

When used in a WAN networking environment, the computer 1102 can comprise a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 12:
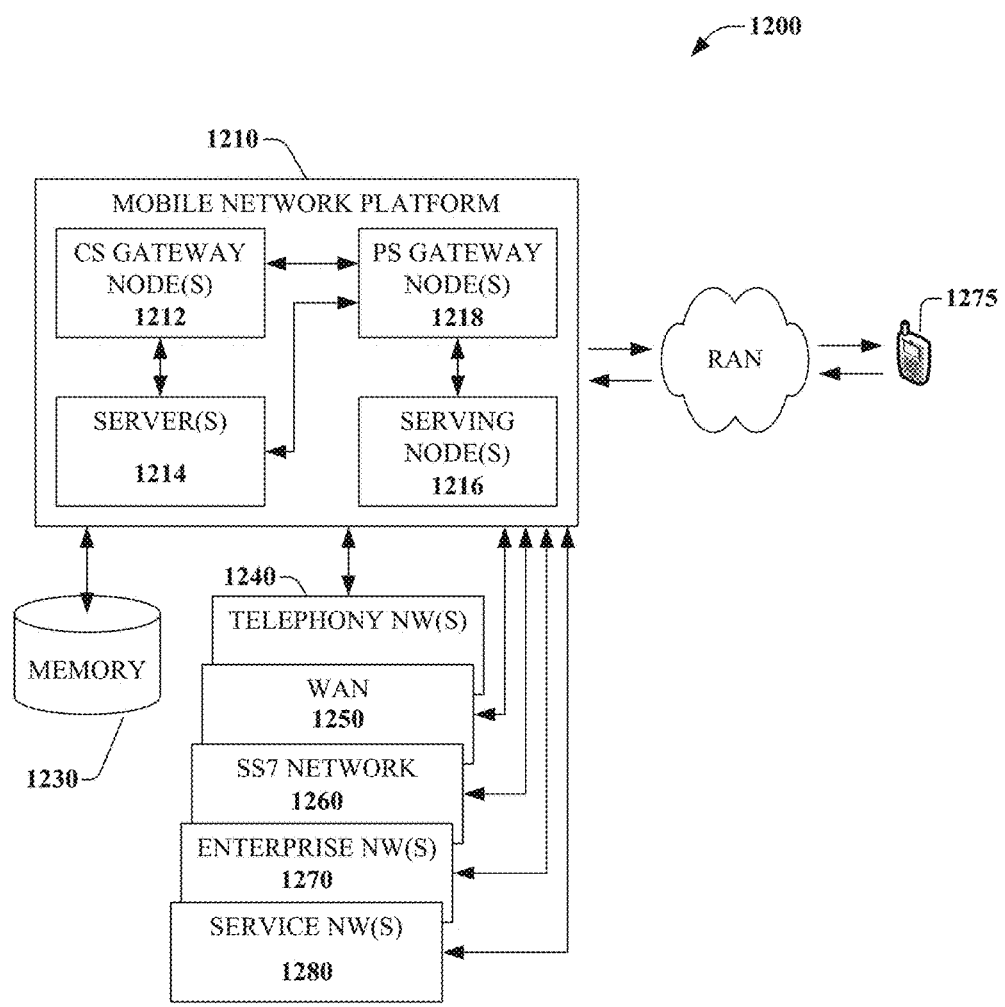
FIG. 12 is a block diagram of an example, non-limiting embodiment of a mobile network platform in accordance with various aspects described herein.

FIG. 12 presents an example embodiment 1200 of a mobile network platform 1210 that can implement and exploit one or more aspects of the disclosed subject matter described herein. In one or more embodiments, the mobile network platform 1210 can generate and receive signals transmitted and received by base stations (e.g., base station devices 104 and 508) and repeater devices (e.g., repeater devices 710, 806, and 900) associated with the disclosed subject matter. Generally, wireless network platform 1210 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1210 can be included in telecommunications carrier networks, and can be considered carrier-side components as discussed elsewhere herein. Mobile network platform 1210 comprises CS gateway node(s) 1212 which can interface CS traffic received from legacy networks like telephony network(s) 1240 (e.g., public switched telephone network (PSTN), or public land mobile network (PLMN)) or a signaling system #7 (SS7) network 1260. Circuit switched gateway node(s) 1212 can authorize and authenticate traffic (e.g., voice) arising from such networks. Additionally, CS gateway node(s) 1212 can access mobility, or roaming, data generated through SS7 network 1260; for instance, mobility data stored in a visited location register (VLR), which can reside in memory 1230. Moreover, CS gateway node(s) 1212 interfaces CS-based traffic and signaling and PS gateway node(s) 1218. As an example, in a 3GPP UMTS network, CS gateway node(s) 1212 can be realized at least in part in gateway GPRS support node(s) (GGSN). It should be appreciated that functionality and specific operation of CS gateway node(s) 1212, PS gateway node(s) 1218, and serving node(s) 1216, is provided and dictated by radio technology(ies) utilized by mobile network platform 1210 for telecommunication.

In addition to receiving and processing CS-switched traffic and signaling, PS gateway node(s) 1218 can authorize and authenticate PS-based data sessions with served mobile devices. Data sessions can comprise traffic, or content(s), exchanged with networks external to the wireless network platform 1210, like wide area network(s) (WANs) 1250, enterprise network(s) 1270, and service network(s) 1280, which can be embodied in local area network(s) (LANs), can also be interfaced with mobile network platform 1210 through PS gateway node(s) 1218. It is to be noted that WANs 1250 and enterprise network(s) 1270 can embody, at least in part, a service network(s) like IP multimedia subsystem (IMS). Based on radio technology layer(s) available in technology resource(s), packet-switched gateway node(s) 1218 can generate packet data protocol contexts when a data session is established; other data structures that facilitate routing of packetized data also can be generated. To that end, in an aspect, PS gateway node(s) 1218 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1200, wireless network platform 1210 also comprises serving node(s) 1216 that, based upon available radio technology layer(s) within technology resource(s), convey the various packetized flows of data streams received through PS gateway node(s) 1218. It is to be noted that for technology resource(s) that rely primarily on CS communication, server node(s) can deliver traffic without reliance on PS gateway node(s) 1218; for example, server node(s) can embody at least in part a mobile switching center. As an example, in a 3GPP UMTS network, serving node(s) 1216 can be embodied in serving GPRS support node(s) (SGSN).

For radio technologies that exploit packetized communication, server(s) 1214 in wireless network platform 1210 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 1210. Data streams (e.g., content(s) that are part of a voice call or data session) can be conveyed to PS gateway node(s) 1218 for authorization/authentication and initiation of a data session, and to serving node(s) 1216 for communication thereafter. In addition to application server, server(s) 1214 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 1210 to ensure network's operation and data integrity in addition to authorization and authentication procedures that CS gateway node(s) 1212 and PS gateway node(s) 1218 can enact. Moreover, provisioning server(s) can provision services from external network(s) like networks operated by a disparate service provider; for instance, WAN 1250 or Global Positioning System (GPS) network(s) (not shown). Provisioning server(s) can also provision coverage through networks associated to wireless network platform 1210 (e.g., deployed and operated by the same service provider), such as the distributed antennas networks shown in FIG. 1(*s*) that enhance wireless service coverage by providing more network coverage. Repeater devices such as those shown in FIGS. 7, 8, and 9 also improve network coverage in order to enhance subscriber service experience by way of UE 1275.

It is to be noted that server(s) 1214 can comprise one or more processors configured to confer at least in part the functionality of macro network platform 1210. To that end, the one or more processor can execute code instructions stored in memory 1230, for example. It is should be appreciated that server(s) 1214 can comprise a content manager, which operates in substantially the same manner as described hereinbefore.

In example embodiment 1200, memory 1230 can store information related to operation of wireless network platform 1210. Other operational information can comprise provisioning information of mobile devices served through wireless platform network 1210, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1230 can also store information from at least one of telephony network(s) 1240, WAN 1250, enterprise network(s) 1270, or SS7 network 1260. In an aspect, memory 1230 can be, for example, accessed as part of a data store component or as a remotely connected memory store.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 13A:
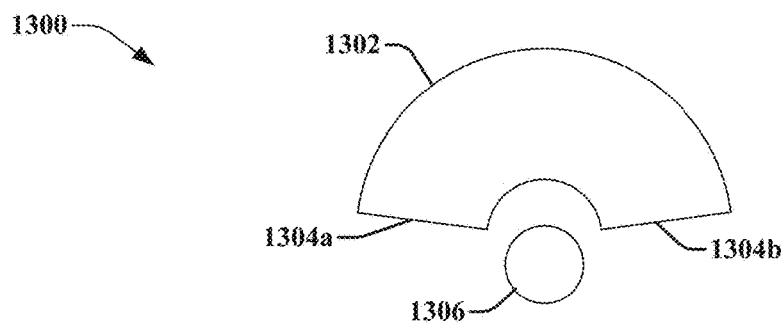
FIGS. 13a, 13b, and 13c are block diagrams illustrating example, non-limiting embodiments of a slotted waveguide coupler in accordance with various aspects described herein.
Figure 13B:
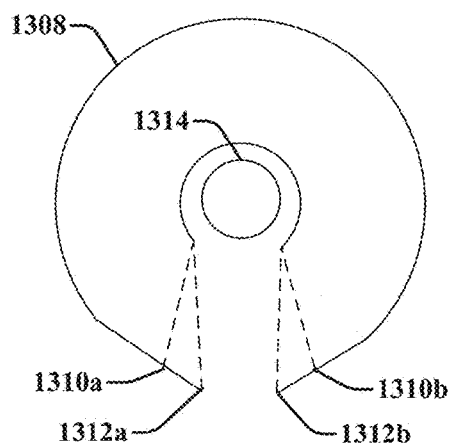
Figure 13C:
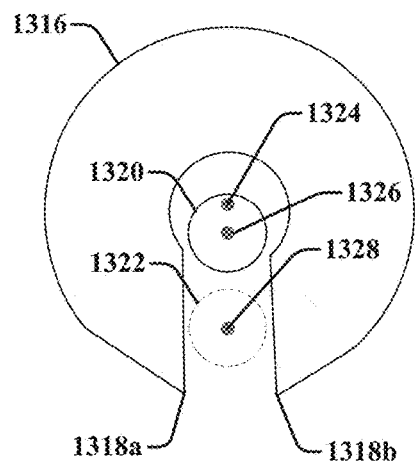

Turning now to FIGS. 13*a*, 13*b*, and 13*c*, illustrated are block diagrams of example, non-limiting embodiments of a slotted waveguide coupler system 1300 in accordance with various aspects described herein. In particular, cross sections of various waveguides are presented near the junction where the waveguide launches a guided-wave along a wire. In FIG. 13*a*, the waveguide coupler system comprises a wire 1306 that is positioned with respect to a waveguide 1302, such that the wire 1306 fits within or near a slot formed in the waveguide 1302 that runs longitudinally with respect to the wire 1306. The opposing ends 1304*a* and 1304*b* of the waveguide 1302, and the waveguide 1302 itself, surrounds less than 180 degrees of the wire surface of the wire 1306.

In FIG. 13*b* the waveguide coupler system comprises a wire 1314 that is positioned with respect to a waveguide 1308, such that the wire 1314 fits within or near a slot formed in the waveguide 1308 that runs longitudinally with respect to the wire 1314. The slot surfaces of the waveguide 1308 can be non-parallel, and two different exemplary embodiments are shown in FIG. 13*b*. In the first, slot surfaces 1310*a* and 1310*b* can be non-parallel and aim outwards, slightly wider than the width of the wire 1314. In the other embodiment, the slots surfaces 1312*a* and 1312*b* can still be non-parallel, but narrow to form a slot opening smaller than a width of the wire 1314. Any range of angles of the non-parallel slot surfaces are possible, of which these are two exemplary embodiments.

In FIG. 13*c*, the waveguide coupler system shows a wire 1320 that fits within a slot formed in waveguide 1316. The slot surfaces 1318*a* and 1318*b* in this exemplary embodiment can be parallel, but the axis 1326 of the wire 1320 is not aligned with the axis 1324 of the waveguide 1316. The waveguide 1316 and the wire 1320 are therefore not coaxially aligned. In another embodiment, shown, a possible position of the wire at 1322 also has an axis 1328 that is not aligned with the axis 1324 of the waveguide 1316.

It is to be appreciated that while three different embodiments showing a) waveguide surfaces that surround less than 180 degrees of the wire, b) non parallel slot surfaces, and c) coaxially unaligned wires and waveguide were shown separately in FIGS. 13*a*, 13*b*, and 13*c*, in various embodiments, diverse combinations of the listed features are possible.

Figure 14A:
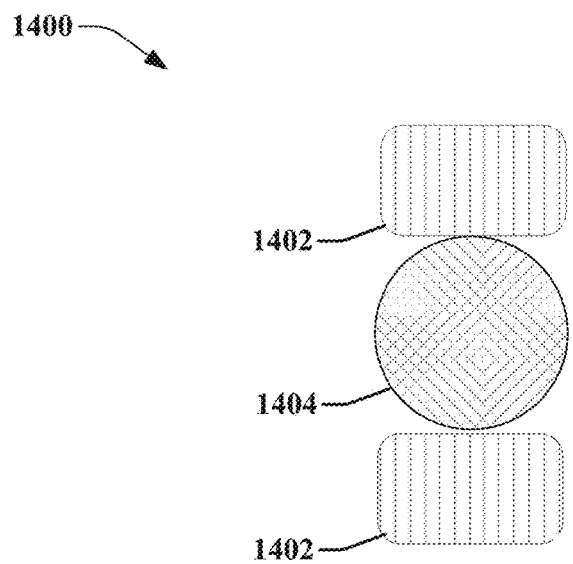
FIGS. 14a and 14b are a block diagrams illustrating an example, non-limiting embodiment of a waveguide coupling system in accordance with various aspects described herein.
Figure 14B:
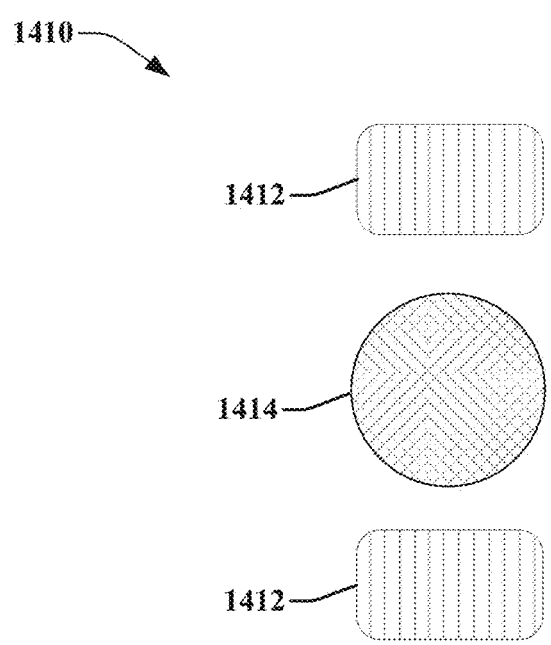

Turning now to FIG. 14, illustrated is an example, non-limiting embodiment of a waveguide coupling system 1400 in accordance with various aspects described herein. FIG. 14 depicts a cross sectional representation of the waveguide and wire embodiments shown in FIGS. 2, 3, 4, etc. As can be seen in 1400, the wire 1404 can be positioned directly next to and touching waveguide 1402. In other embodiments, as shown in waveguide coupling system 1410 in FIG. 14*b*, the wire 1414 can still be placed near, but not actually touching waveguide strip 1412. In both cases, electromagnetic waves traveling along the waveguides can induce other electromagnetic waves on to the wires and vice versa. Also, in both embodiments, the wires 1404 and 1414 are placed outside the cross-sectional area defined by the outer surfaces of waveguides 1402 and 1412.

For the purposes of this disclosure, a waveguide does not surround, in substantial part, a wire surface of a wire when the waveguide does not surround an axial region of the surface, when viewed in cross-section, of more than 180 degrees. For avoidance of doubt, a waveguide does not surround, in substantial part a surface of a wire when the waveguide surrounds an axial region of the surface, when viewed in cross-section, of 180 degrees or less.

It is to be appreciated that while FIGS. 14 and 14*b* show wires 1404 and 1414 having a circular shape and waveguides 1402 and 1412 having rectangular shapes, this is not meant to be limiting. In other embodiments, wires and waveguides can have a variety of shapes, sizes, and configurations. The shapes can include, but not be limited to: ovals or other ellipsoid shapes, octagons, quadrilaterals or other polygons with either sharp or rounded edges, or other shapes. Additionally, in some embodiments, the wires 1404 and 1414 can be stranded wires comprising smaller gauge wires, such as a helical strand, braid or other coupling of individual strands into a single wire. Any of wires and waveguides shown in the figures and described throughout this disclosure can include one or more of these embodiments.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. For example, artificial intelligence can be used to determine positions around a wire that dielectric waveguides 604 and 606 should be placed in order to maximize transfer efficiency. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence that can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component", "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

Figure 15:
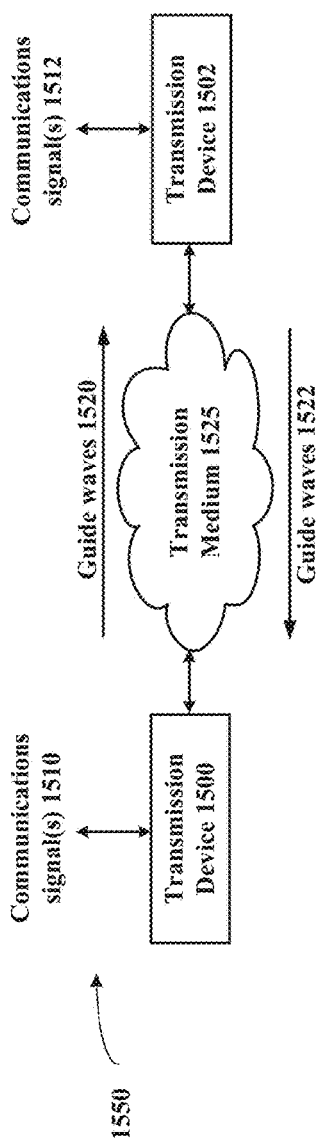
FIG. 15 is a block diagram illustrating an example, non-limiting embodiment of a guided-wave communication system in accordance with various aspects described herein.

Turning now to FIG. 15, a block diagram is shown illustrating an example, non-limiting embodiment of a guided-wave communication system 1550. In operation, a transmission device 1500 receives one or more communication signals 1510 from a communication network or other communications device that include data and generates guided-waves 1520 to convey the data via the transmission media 1525 to the transmission device 1502. The transmission device 1502 receives the guided-waves 1520 and converts them to communication signals 1512 that include the data for transmission to a communications network or other communications device. The communication network or networks can include a wireless communication network such as a cellular voice and data network, a wireless local area network, a satellite communications network, a personal area network or other wireless network. The communication network or networks can include a wired communication network such as a telephone network, an Ethernet network, a local area network, a wide area network such as the Internet, a broadband access network, a cable network, a fiber optic network, or other wired network. The communication devices can include a network edge device, bridge device or home gateway, a set-top box, broadband modem, telephone adapter, access point, base station, or other fixed communication device, a mobile communication device such as an automotive gateway, laptop computer, tablet, smartphone, cellular telephone, or other communication device.

In an example embodiment, the guided-wave communication system 1550 can operate in a bi-directional fashion where transmission device 1500 receives one or more communication signals 1512 from a communication network or device that includes other data and generates guided-waves 1522 to convey the other data via the transmission media 1525 to the transmission device 1500. In this mode of operation, the transmission device 1502 receives the guided-waves 1522 and converts them to communication signals 1510 that include the other data for transmission to a communications network or device.

The transmission medium 1525 can include a wire or other conductor or inner portion having at least one inner portion surrounded by a dielectric material, the dielectric material having an outer surface and a corresponding circumference. In an example embodiment, the transmission medium 1525 operates as a single-wire transmission line to guide the transmission of an electromagnetic wave. When the transmission medium 1525 is implemented as a single wire transmission system, it can include a wire. The wire can be insulated or uninsulated, and single-stranded or multi-stranded. In other embodiments, the transmission medium 1525 can contain conductors of other shapes or configurations including wire bundles, cables, rods, rails, pipes. In addition, the transmission medium 1525 can include non-conductors such as dielectric pipes, rods, rails, or other dielectric members; combinations of conductors and dielectric materials or other guided-wave transmission media. It should be noted that the transmission medium 1525 can otherwise include any of the transmission media previously discussed in conjunction with FIGS. 1-14.

According to an example embodiment, the guided-waves 1520 and 1522 can be contrasted with radio transmissions over free space/air or conventional propagation of electrical power or signals through the conductor of a wire. In particular, guided-waves 1520 and 1522 are surface waves and other electromagnetic waves that surround all or part of the surface of the transmission medium and propagate with low loss along the transmission medium from transmission device 1500 to transmission device 1502, and vice versa. The guided-waves 1520 and 1522 can have a field structure (e.g., an electromagnetic field structure) that lies primarily or substantially outside of the transmission medium 1525. In addition to the propagation of guided-waves 1520 and 1522, the transmission medium 1525 may optionally contain one or more wires that propagate electrical power or other communication signals in a conventional manner as a part of one or more electrical circuits.

Figure 16:
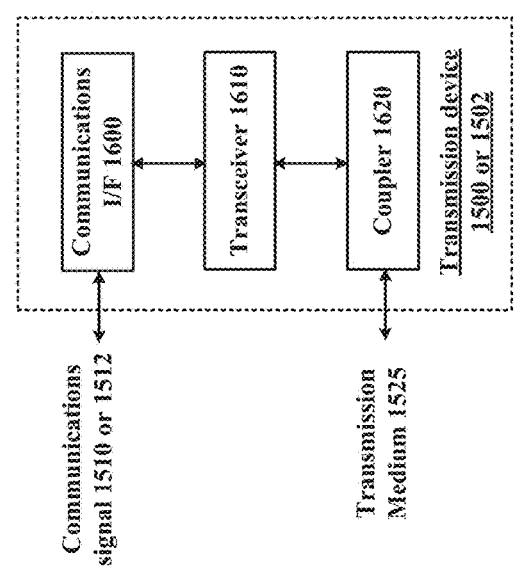
FIG. 16 is a block diagram illustrating an example, non-limiting embodiment of a transmission device in accordance with various aspects described herein.

Turning now to FIG. 16, a block diagram is shown illustrating an example, non-limiting embodiment of a transmission device 1500 or 1502. The transmission device 1500 or 1502 includes a communications interface (I/F) 1600, a transceiver 1610 and a coupler 1620.

In an example of operation, the communications interface 1600 receives a communication signal 1510 or 1512 that includes first data. In various embodiments, the communications interface 1600 can include a wireless interface for receiving a wireless communication signal in accordance with a wireless standard protocol such as LTE or other cellular voice and data protocol, an 802.11 protocol, WIMAX protocol, Ultra Wideband protocol, Bluetooth protocol, Zigbee protocol, a direct broadcast satellite (DBS) or other satellite communication protocol or other wireless protocol. In addition or in the alternative, the communications interface 1600 includes a wired interface that operates in accordance with an Ethernet protocol, universal serial bus (USB) protocol, a data over cable service interface specification (DOCSIS) protocol, a digital subscriber line (DSL) protocol, a Firewire (IEEE 1394) protocol, or other wired protocol. In additional to standards-based protocols, the communications interface 1600 can operate in conjunction with other wired or wireless protocol. In addition, the communications interface 1600 can optionally operate in conjunction with a protocol stack that includes multiple protocol layers.

In an example of operation, the transceiver 1610 generates a first electromagnetic wave based on the communication signal 1510 or 1512 to convey the first data. The first electromagnetic wave has at least one carrier frequency and at least one corresponding wavelength. In various embodiments, the transceiver 1610 is a microwave transceiver that operates at a carrier frequency with a corresponding wavelength that is less than the circumference of the transmission medium 1525. The carrier frequency can be within a millimeter-wave frequency band of 30 GHz-300 GHz or a lower frequency band of 3 GHz-30 GHz in the microwave frequency band. In one mode of operation, the transceiver 1610 merely upconverts the communications signal or signals 1510 or 1512 for transmission of the first electromagnetic signal in the microwave or millimeter-wave band. In another mode of operation, the communications interface 1600 either converts the communication signal 1510 or 1512 to a baseband or near baseband signal or extracts the first data from the communication signal 1510 or 1512 and the transceiver 1610 modulates the first data, the baseband or near baseband signal for transmission.

In an example of operation, the coupler 1620 couples the first electromagnetic wave to the transmission medium 1525. The coupler 1620 can be implemented via a dielectric waveguide coupler or any of the couplers and coupling devices described in conjunction with FIGS. 1-14. In an example embodiment, the transmission medium 1525 includes a wire or other inner element surrounded by a dielectric material having an outer surface. The dielectric material can include an insulating jacket, a dielectric coating or other dielectric on the outer surface of the transmission medium 1525. The inner portion can include a dielectric or other insulator, a conductor, air or other gas or void, or one or more conductors.

In an example of operation, the coupling of the first electromagnetic wave to the transmission medium 1525 forms a second electromagnetic wave that is guided to propagate along the outer surface of the dielectric material of the transmission medium via at least one guided-wave mode that includes an asymmetric mode and optionally one or more other modes including a fundamental (symmetric) mode or other asymmetric (non-fundamental) mode. The outer surface of the dielectric material can be the outer surface of an insulating jacket, dielectric coating, or other dielectric. In an example embodiment, the first electromagnetic wave generated by the transceiver 1610 is guided to propagate along the coupler via at least one guided-wave mode that includes a symmetric mode and wherein a junction between the coupler and the transmission medium induces the asymmetric mode of the second electromagnetic wave and optionally a symmetric mode of the second electromagnetic wave.

In an example embodiment, the transmission medium 1525 is a single wire transmission medium having an outer surface and a corresponding circumference and the coupler 1620 couples the first electromagnetic wave to the single wire transmission medium. In particular, the coupling of the first electromagnetic wave to the single wire transmission medium forms a second electromagnetic wave that is guided to propagate along the outer surface of the single wire transmission medium via at least one guided-wave mode that includes at least one asymmetric mode and optionally a symmetric mode and other asymmetric modes, wherein the carrier frequency in within a microwave or millimeter-wave frequency band and wherein the corresponding wavelength is less than the circumference of the single wire transmission medium. In one mode of operation, the first electromagnetic wave is guided to propagate along the coupler via at least one guided-wave mode that includes a symmetric mode and a junction between the coupler and the transmission medium induces both the asymmetric mode of the second electromagnetic wave and, when present, the symmetric mode of the second electromagnetic wave.

While the prior description has focused on the operation of the transceiver 1610 as a transmitter, the transceiver 1610 can also operate to receive electromagnetic waves that convey second data from the single wire transmission medium via the coupler 1620 and to generated communications signals 1510 or 1512, via communications interface 1600 that includes the second data. Consider embodiments where a third electromagnetic wave conveys second data that also propagates along the outer surface of the dielectric material of the transmission medium 1525. The coupler 1620 also couples the third electromagnetic wave from the transmission medium 1525 to form a fourth electromagnetic wave. The transceiver 1610 receives the fourth electromagnetic wave and generates a second communication signal that includes the second data. The communication interface 1600 sends the second communication signal to a communication network or a communications device.

Figure 17:
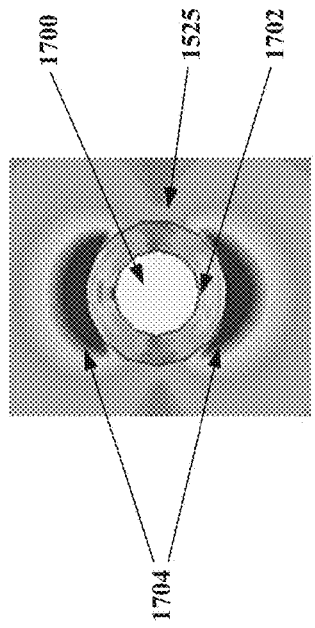
FIG. 17 is a diagram illustrating an example, non-limiting embodiment of an electromagnetic distribution in accordance with various aspects described herein.

Turning now to FIG. 17, a diagram is shown illustrating an example, non-limiting embodiment of an electromagnetic field distribution. In this embodiment, a transmission medium 1525 in air includes an inner conductor 1700 and an insulating jacket 1702 of dielectric material, is shown in cross section. The diagram includes different gray-scales that represent differing electromagnetic field strengths generated by the propagation of the guided-wave having an asymmetric mode. The guided-wave has a field structure that lies primarily or substantially outside of the transmission medium 1525 that serves to guide the wave. The regions inside the conductor 1700 have little or no field. Likewise regions inside the insulating jacket 1702 have low field strength. The majority of the electromagnetic field strength is distributed in the lobes 1704 at the outer surface of the insulating jacket 1702 and in close proximity thereof. The presence of an asymmetric guided-wave mode is shown by the high electromagnetic field strengths at the top and bottom of the outer surface of the insulating jacket 1702—as opposed to very small field strengths on the other sides of the insulating jacket 1702.

The example shown corresponds to a 38 GHz wave guided by a wire with a diameter of 1.1 cm and a dielectric insulation of thickness of 0.36 cm. Because the electromagnetic wave is guided by the transmission medium 1525 and the majority of the field strength is concentrated in the air outside of the insulating jacket 1702 within a limited distance of the outer surface, the guided-wave can propagate longitudinally down the transmission medium 1525 with very low loss. In the example shown, this "limited distance" corresponds to a distance from the outer surface that is less than half the largest cross sectional dimension of the transmission medium 1525. In this case, the largest cross sectional dimension of the wire corresponds to the overall diameter of 1.82 cm, however other this value can vary with the size and shape of the transmission medium 1525. For example, should the transmission medium be of rectangular shape with a height of 0.3 cm and a width of 0.4 cm, the largest cross sectional dimension would be the diagonal of 0.5 cm and the corresponding limited distance would be 0.25 cm.

In an example embodiment, this particular asymmetric mode of propagation is induced on the transmission medium 1525 by an electromagnetic wave having a frequency that falls within a limited range (such as +25%) of the lower cut-off frequency of the asymmetric mode. For embodiments as shown that include an inner conductor 1700 surrounded by a insulating jacket 1702, this cutoff frequency can vary based on the dimensions and properties of the insulating jacket 1702 and potentially the dimensions and properties of the inner conductor 1700 and can be determined experimentally to have a desired mode pattern. It should be noted however, that similar effects can be found for a hollow dielectric or insulator without an inner conductor. In this case, the cutoff frequency can vary based on the dimensions and properties of the hollow dielectric or insulator.

At frequencies lower than the lower cut-off frequency, the asymmetric mode is difficult to induce in the transmission medium 1525 and fails to propagate for all but trivial distances. As the frequency increases above the limited range of frequencies about the cut-off frequency, the asymmetric mode shifts more and more inward of the insulating jacket 1702. At frequencies much larger than the cut-off frequency, the field strength is no longer concentrated outside of the insulating jacket, but primarily inside of the insulating jacket 1702. While the transmission medium 1525 provides strong guidance to the electromagnetic wave and propagation is still possible, ranges are more limited by increased losses due to propagation within the insulating jacket 1702—as opposed to the surrounding air.

Figure 18:
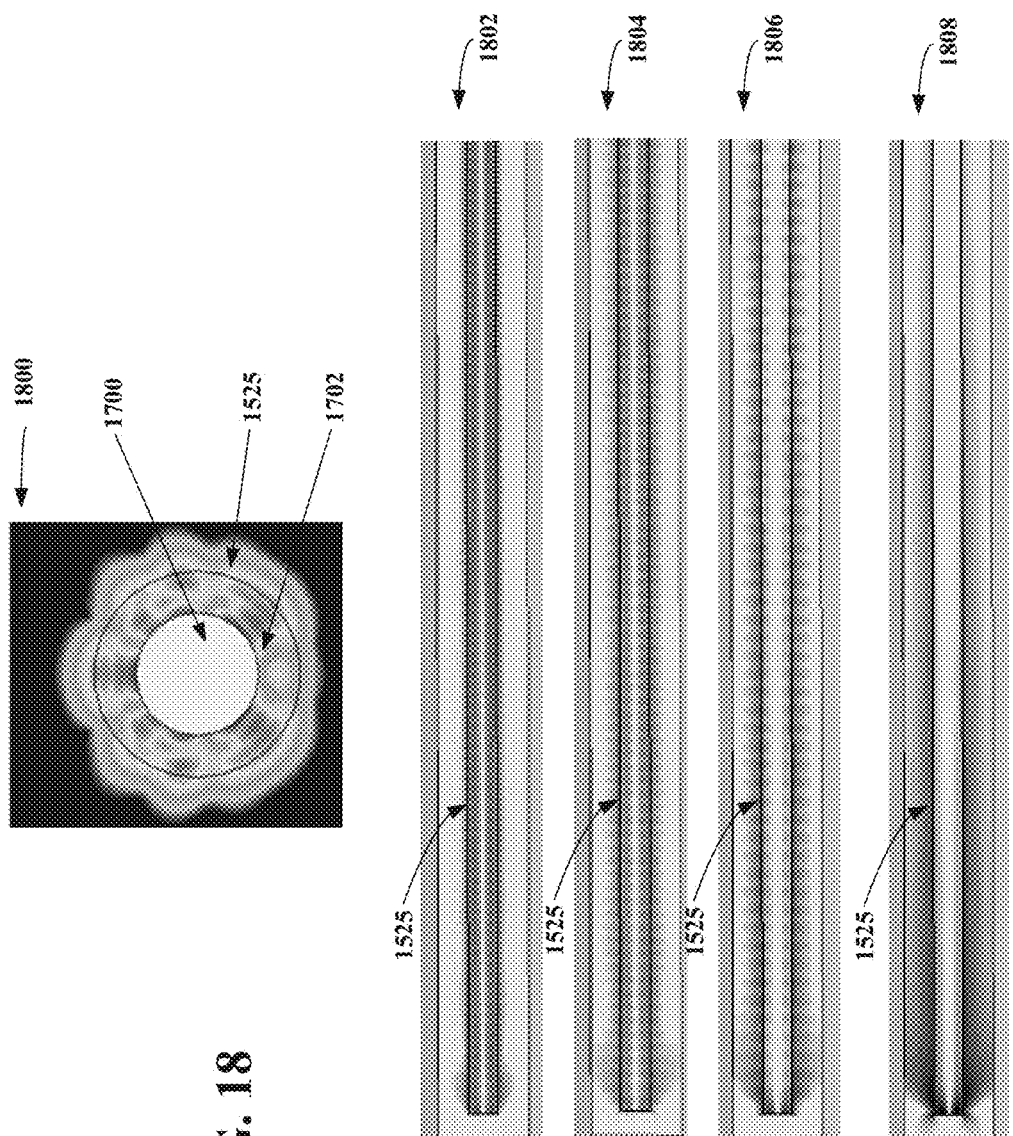
FIG. 18 is a diagram illustrating an example, non-limiting embodiment of an electromagnetic distribution in accordance with various aspects described herein.

Turning now to FIG. 18, a diagram is shown illustrating example, non-limiting embodiments of various electromagnetic field distributions. In particular, a cross section diagram 1800, similar to FIG. 17 is shown with common reference numerals used to refer to similar elements. The example shown in cross section 1800 corresponds to a 60 GHz wave guided by a wire with a diameter of 1.1 cm and a dielectric insulation of thickness of 0.36 cm. Because the frequency of the wave is above the limited range of the cut-off frequency, the asymmetric mode has shifted inward of the insulating jacket 1702. In particular, the field strength is concentrated primarily inside of the insulating jacket 1702. While the transmission medium 1525 provides strong guidance to the electromagnetic wave and propagation is still possible, ranges are more limited when compared with the embodiment of FIG. 17, by increased losses due to propagation within the insulating jacket 1702.

The diagrams 1802, 1804, 1806 and 1808 also present embodiments of a transmission medium 1525 in air that includes an inner conductor and an insulating jacket of dielectric material, shown in longitudinal cross section. These diagrams include different gray-scales that represent differing electromagnetic field strengths generated by the propagation of the guided-wave having an asymmetric mode at different frequencies. At frequencies lower than the lower cut-off frequency, represented by diagram 1808, the electric field is not tightly coupled to the surface of the transmission medium 1525. The asymmetric mode is difficult to induce in the transmission medium 1525 and fails to propagate for all but trivial distances. At frequencies within the limited range of the cutoff frequency, represented by diagram 1806, while some of the electric field strength is within the insulating jacket, the guided-wave has a field structure that lies primarily or substantially outside of the transmission medium 1525 that serves to guide the wave. As discussed in conjunction with FIG. 17, the regions inside the conductor 1700 have little or no field and propagation is supported over reasonable distance. As the frequency increases above the limited range of frequencies about the cut-off frequency, represented by diagram 1804, the asymmetric mode shifts more and more inward of the insulating jacket of transmission medium 1525 increasing propagation losses and reducing effect distances. At frequencies much larger than the cut-off frequency, represented by diagram 1802, the field strength is no longer concentrated outside of the insulating jacket, but primarily inside of the insulating jacket 1702. While the transmission medium 1525 provides strong guidance to the electromagnetic wave and propagation is still possible, ranges are more limited by increased losses due to propagation within the insulating jacket 1702—as opposed to the surrounding air.

Figure 19:
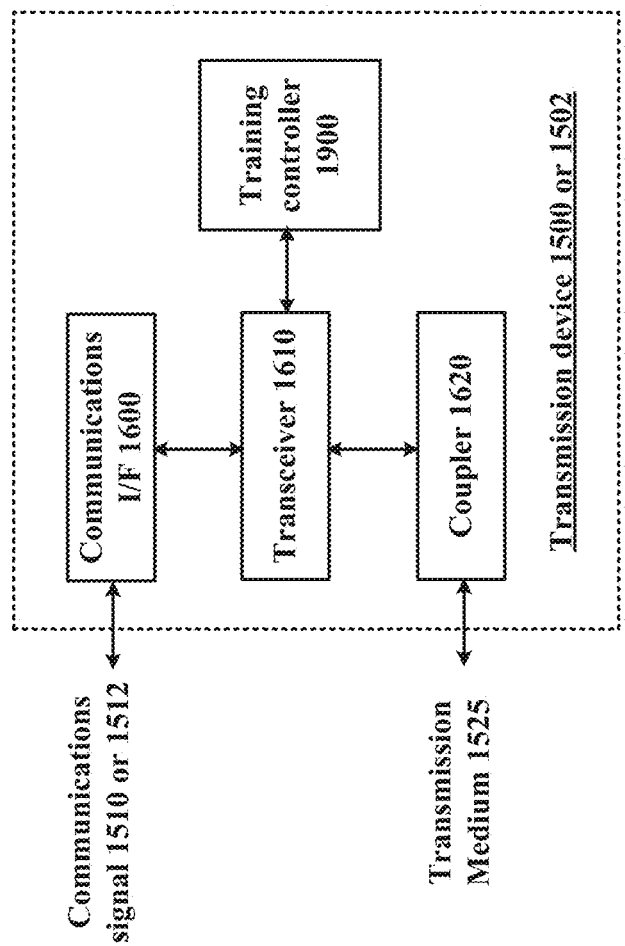
FIG. 19 is a block diagram illustrating an example, non-limiting embodiment of a transmission device in accordance with various aspects described herein.

Turning now to FIG. 19, a block diagram is shown illustrating an example, non-limiting embodiment of a transmission device. In particular, a diagram similar to FIG. 16 is presented with common reference numerals used to refer to similar elements. The transmission device 1500 or 1502 includes a communications interface 1600 that receives a communication signal 1510 or 1512 that includes data. The transceiver 1610 generates a first electromagnetic wave based on the communication signal 1510 or 1512 to convey the first data, the first electromagnetic wave having at least one carrier frequency. A coupler 1620 couples the first electromagnetic wave to the transmission medium 1525 having at least one inner portion surrounded by a dielectric material, the dielectric material having an outer surface and a corresponding circumference. The first electromagnetic wave is coupled to the transmission medium to form a second electromagnetic wave that is guided to propagate along the outer surface of the dielectric material via at least one guided-wave mode. The guided-wave mode includes an asymmetric mode having a lower cutoff frequency and the carrier frequency is selected to be within a limited range of the lower cutoff frequency.

The transmission device 1500 or 1502 includes an optional training controller 1900. In an example embodiment, the training controller 1900 is implemented by a standalone processor or a processor that is shared with one or more other components of the transmission device 1500 or 1502. The training controller 1900 selects the carrier frequency to be within the limited range of the lower cutoff frequency based on feedback data received by the transceiver 1610 from at least one remote transmission device coupled to receive the second electromagnetic wave.

In an example embodiment, a third electromagnetic wave transmitted by a remote transmission device 1500 or 1502 conveys second data that also propagates along the outer surface of the dielectric material of a transmission medium 1525. The second data can be generated to include the feedback data. In operation, the coupler 1620 also couples the third electromagnetic wave from the transmission medium 1525 to form a fourth electromagnetic wave and the transceiver receives the fourth electromagnetic wave and processes the fourth electromagnetic wave to extract the second data.

In an example embodiment, the training controller 1900 operates based on the feedback data to evaluate a plurality of candidate frequencies and to select the carrier frequency to be within the limited range of the lower cutoff frequency, as one of the plurality of candidate frequencies. For example, the candidate frequencies can be selected based on criteria such as: being in a microwave or millimeter-wave frequency band, having wavelengths greater than an outer circumference of the transmission medium 1525, being less than the mean collision frequency of electrons in a conductor that makes up a portion of the transmission medium 1525, based on experimental results that indicate the limited range of frequencies about the cutoff frequency for a particular transmission medium 1525 and a selected asymmetric mode, and/or based on experimental results or simulations.

Consider the following example: a transmission device 1500 begins operation under control of the training controller 1900 by sending a plurality of guided-waves as test signals such as ones or pilot waves at a corresponding plurality of candidate frequencies directed to a remote transmission device 1502 coupled to the transmission medium 1525. A transmission device 1500 can generate first electromagnetic waves that are coupled onto the transmission medium as second electromagnetic waves. While the guided-wave modes may differ, generally the carrier frequency or frequencies of the second electromagnetic waves are equal to the carrier frequency or frequencies of the first electromagnetic waves. In cases, however, where the coupling includes a nonlinearity due to a junction, a non-linear element of a coupler, or other non-linearity, the carrier frequencies of one or more guided-wave modes of the second electromagnetic waves can be at a harmonic frequency or frequencies, at the sum of two or more carrier frequencies, or at a difference of two or more carrier frequencies. In either case, the carrier frequency or frequencies of the electromagnetic waves launched on a transmission medium can be selected, based on knowledge of the linear or nonlinear effects of the coupling and further based on the selection of the carrier frequency or frequencies of the waves that are coupled to launch the waves on the transmission medium.

The guided-waves can include, in addition or in the alternative, test data at a corresponding plurality of candidate frequencies directed to a remote transmission device 1502 coupled to the transmission medium 1525. The test data can indicate the particular candidate frequency of the signal. In an embodiment, the training controller 1900 at the remote transmission device 1502 receives the test signals and/or test data from any of the guided-waves that were properly received and determines the best candidate frequency, a set of acceptable candidate frequencies, or a rank ordering of candidate frequencies. This candidate frequency or frequencies is generated by the training controller 1900 based on one or more optimizing criteria such as received signal strength, bit error rate, packet error rate, signal to noise ratio, a carrier frequency with reduced or lowest propagation loss, a carrier frequency that is detected, based on an analysis of any of the previous criteria, to be within a limited range of cutoff of a non-fundamental mode or other optimizing criteria can be generated by the transceiver 1610 of the remote transmission device 1502. The training controller 1900 generates feedback data that indicates the candidate frequency or frequencies and sends the feedback data to the transceiver 1610 for transmission to the transmission device 1500. The transmission device 1500 and 1502 can then communicate data with one another utilizing the indicated carrier frequency or frequencies.

In other embodiments, the electromagnetic waves that contain the test signals and/or test data are reflected back, repeated back or otherwise looped back by the remote transmission device 1502 to the transmission device 1502 for reception and analysis by the training controller 1900 of the transmission device 1502 that initiated these waves. For example, the transmission device 1502 can send a signal to the remote transmission device 1502 to initiate a test mode where a physical reflector is switched on the line, a termination impedance is changed to cause reflections, a loop back circuits is switched on to couple electromagnetic waves back to the source transmission device 1502, and/or a repeater mode is enabled to amplify and retransmit the electromagnetic waves back to the source transmission device 1502. The training controller 1900 at the source transmission device 1502 receives the test signals and/or test data from any of the guided-waves that were properly received and determines the best candidate frequency, a set of acceptable candidate frequencies, or a rank ordering of candidate frequencies. This candidate frequency or frequencies is generated by the training controller 1900 based on one or more optimizing criteria such as received signal strength, bit error rate, packet error rate, signal to noise ratio or other optimizing criteria can be generated by the transceiver 1610 of the remote transmission device 1502.

While the procedure above has been described in a start-up or initialization mode of operation, each transmission device 1500 or 1502 can send test signals or otherwise evaluate candidate frequencies at other times as well. In an example embodiment, the communication protocol between the transmission devices 1500 and 1502 can include a periodic test mode where either full testing or more limited testing of a subset of candidate frequencies are tested and evaluated. In other modes of operation, the re-entry into such a test mode can be triggered by a degradation of performance due to a disturbance, weather conditions, etc. In an example embodiment, the receiver bandwidth of the transceiver 1610 is either sufficiently wide to include all candidate frequencies or can be selectively adjusted by the training controller 1900 to a training mode where the receiver bandwidth of the transceiver 1610 is sufficiently wide to include all candidate frequencies.

While the guided-wave above has been described as propagating on the outer surface of an outer dielectric surface of the transmission medium 1525, other outer surfaces of a transmission medium 1525 including the outer surface of a bare wire could likewise be employed. Further, while the training controller 1900 has been described above as selecting a candidate frequency to be within a limited range of the lower cut-off frequency of an asymmetric mode, the training controller 1900 could be used to establish a candidate frequency that optimizes, substantially optimizes or pareto optimizes the propagation along a transmission medium 1525 based on one or more performance criteria such as throughput, packet error rate, signal strength, signal to noise ratio, signal to noise and interference ratio, channel separation in a multi-channel system, and/or other performance criteria—with or without an asymmetric mode and with or without regard to whether the candidate frequency falls within a limited range of the lower cutoff frequency of any particular mode.

Figure 20A:
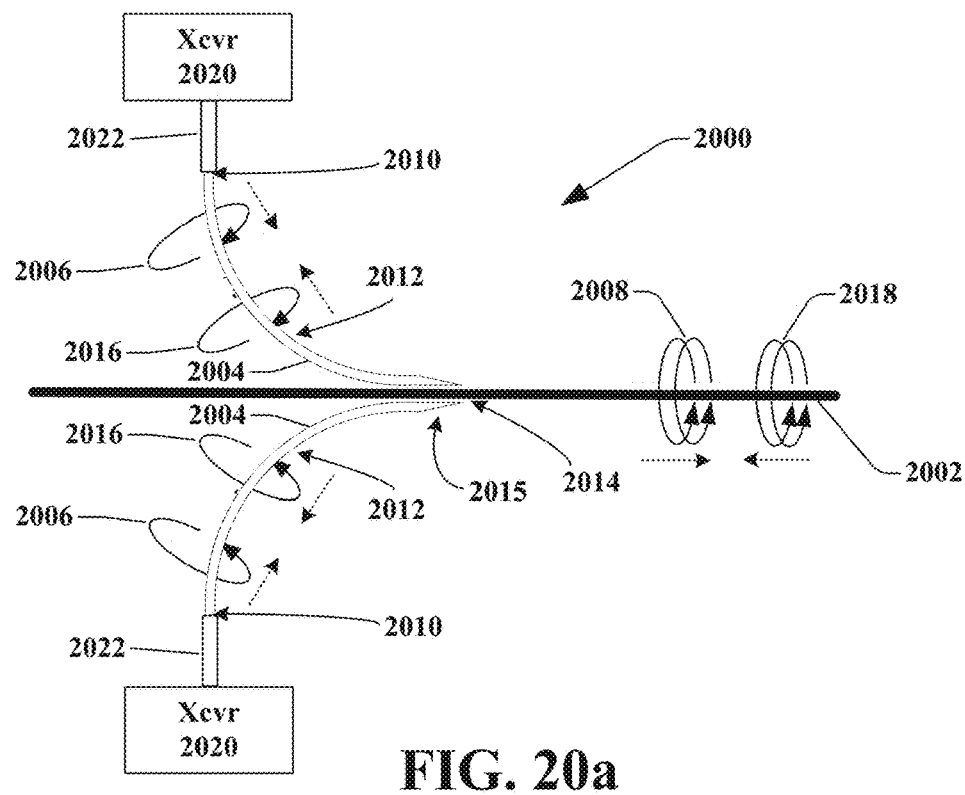
FIG. 20a is a block diagram of an example, non-limiting embodiment of a transmission device and FIG. 20b provides example, non-limiting embodiments of various coupler shapes in accordance with various aspects described herein.
Figure 20B:
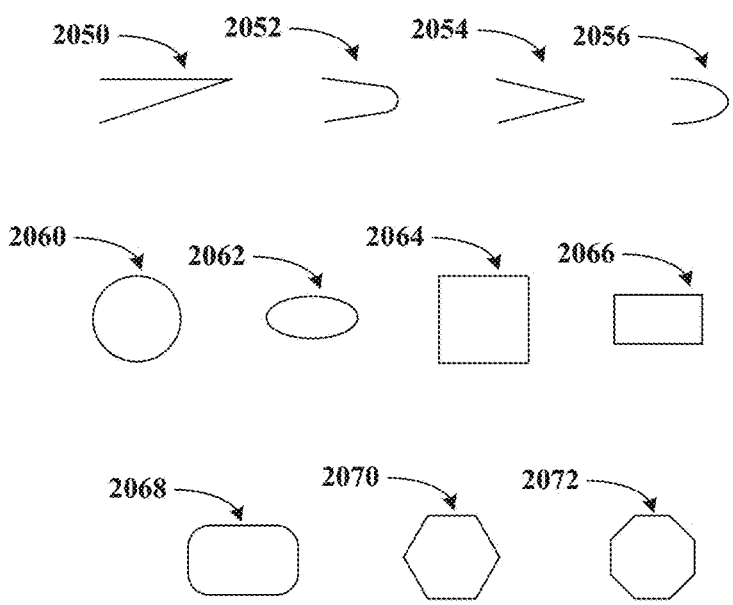

FIG. 20*a* is a block diagram of an example, non-limiting embodiment of a transmission device and FIG. 20*b* provides example, non-limiting embodiments of various coupler shapes in accordance with various aspects described herein. In particular, a transmission device 2000 is shown that includes a plurality of transceivers (Xcvr) 2020, each having a transmitting device (or transmitter) and/or a receiving device (receiver) that is coupled to a corresponding waveguide 2022 and coupler 2004. The plurality of couplers 2004 can be referred to collectively as a "coupling module". Each coupler 2004 of such a coupling module includes a receiving portion 2010 that receives an electromagnetic wave 2006 conveying first data from a transmitting device of transceiver 2020 via waveguide 2022. A guiding portion 2012 of the coupler 2004 guides a first electromagnetic wave 2006 to a junction 2014 for coupling the electromagnetic wave 2006 to a transmission medium 2002. In the embodiment shown, the junction 2014 includes an air gap for illustrative purposes, however other configurations are possible both with, and without an air gap. The guiding portion 2012 includes a coupling end 2015 that terminates at the junction 2014 that is shown with a particular tapered shape; however other shapes and configurations are likewise possible. The coupling end 2015 of the coupler 2004 can, for example, have a tapered, rounded or beveled shape (2050, 2052, 2054 or 2056) or a more complex, multidimensional shape. In particular, the number of planes that intersect the coupling device to create the taper, bevel or rounding can be two or greater, so that the resultant shape is more complex than a simple angular cut along a single plane.

In operation, tapering, rounding or beveling the coupling end 2015 can reduce or substantially eliminate reflections of electromagnetic waves back along the guiding portions, while also enhancing the coupling (e.g., a coupling efficiency) of these electromagnetic waves, to and from the transmission medium 2002. Furthermore, the receiving portion 2010 can have a receiving end that is also tapered, rounded or beveled to enhance the coupling to and from the waveguide 2022 of the transceiver 2020. This receiving end, while not specifically shown, can be recessed within the waveguide 2022. The cross section of the guiding portion 2012, the waveguide 2022, the receiving portion 2010, and the coupling end 2015 can each be any of the shapes 2060, 2062, 2064, 2066, 2068, 2070 or 2070.

Each electromagnetic wave 2006 propagates via at least one first guided-wave mode. The coupling of the electromagnetic waves 2006 to the transmission medium 2002 via one or more of the junctions 2014 forms a plurality of electromagnetic waves 2008 that are guided to propagate along the outer surface of the transmission medium 2002 via at least one second guided-wave mode that can differ from the first guided-wave mode. The transmission medium 2002 can be a single wire transmission medium or other transmission medium that supports the propagation of the electromagnetic waves 2008 along the outer surface of the transmission medium 2002 to convey the first data. It will be appreciated that the single wire transmission medium described herein can be comprised of multiple strands or wire segments that are bundled or braided together without departing from example embodiments.

In various embodiments, the electromagnetic waves 2006 propagate along a coupler 2004 via one or more first guided-wave modes that can include either exclusively or substantially exclusively a symmetrical (fundamental) mode, however other modes can optionally be included in addition or in the alternative. In accordance with these embodiments, the second guided-wave mode of the electromagnetic waves 2008 can, if supported by the characteristics of the transmission medium 2002, include at least one asymmetric (non-fundamental) mode that is not included in the guided-wave modes of the electromagnetic waves 2006 that propagate along each coupler 2004. For example, an insulated wire transmission medium can support at least one asymmetric (non-fundamental) mode in one embodiment. In operation, the junctions 2014 induce the electromagnetic waves 2008 on transmission medium 2002 to optionally include a symmetric (fundamental) mode, but also one or more asymmetric (non-fundamental) modes not included in the guided-wave modes of the electromagnetic wave 2006 that propagate along the coupler 2004.

More generally, consider the one or more first guided-wave modes to be defined by the set of modes S1 where:

$$S1=(m11,m12,m13,\ldots)$$

And where the individual modes m11, m12, m13, . . . can each be either a symmetrical (or fundamental) mode or an asymmetrical (or non-fundamental) mode that propagate more than a trivial distance, i.e. that propagate along the length of the guiding portion 2012 of a coupler 2004 from the receiving end 2010 to the other end 2015. In an embodiment, the guided-wave mode or modes of the electromagnetic wave 2006 includes a field distribution that, at the junction 2014, has a great degree of overlap with the transmission medium 2002 so as to couple a substantial portion or the most electromagnetic energy to the transmission medium. In addition to reducing reflections, the tapering, rounding and/or beveling of the coupling end 2015 can also promote such an effect (e.g., high coupling efficiency or energy transfer). As the cross sectional area of the coupler decreases along the coupling end 2105, the size of the field distribution can increase, encompassing more field strength at or around the transmission medium 2002 at the junction 2014. In one example, the field distribution induced by the coupler 2004 at the junction 2014 has a shape that approximates one or more propagation modes of the transmission medium itself, increasing the amount of electromagnetic energy that is converted to the propagating modes of the transmission medium.

Also consider the one or more second guided-wave modes to be defined by the set of modes S2 where:

$$S2=(m21,m22,m23,\ldots)$$

And, the individual modes m21, m22, m23, . . . can each be either a symmetrical (or fundamental) mode or an asymmetrical (or non-fundamental) mode that propagate along the length of the transmission medium 2002 more than a trivial distance, i.e. that propagate sufficiently to reach a remote transmission device coupled at a different location on the transmission medium 2002.

In various embodiments, that condition that at least one first guided-wave mode is different from at least one second guided-wave mode implies that S1 S2. In particular, S1 may be a proper subset of S2, S2 may be a proper subset of S1, or the intersection between S1 and S2 may be the null set.

In addition to operating as a transmitter, the transmission device 2000 can operate as or include a receiver as well. In this mode of operation, a plurality of electromagnetic waves 2018 conveys second data that also propagates along the outer surface of the transmission medium 2002, but in the opposite direction of the electromagnetic waves 2008. Each junction 2014 couples one of the electromagnetic waves 2018 from the transmission medium 2002 to form an electromagnetic wave 2016 that is guided to a receiver of the corresponding transceiver 2020 by the guiding portion 2012.

In various embodiments, the first data conveyed by the plurality of second electromagnetic waves 2008 includes a plurality of data streams that differ from one another and wherein the each of the plurality of first electromagnetic waves 2006 conveys one of the plurality of data streams. More generally, the transceivers 2020 operate to convey either the same data stream or different data streams via time division multiplexing, or some other form of multiplexing, such as frequency division multiplexing, or mode division multiplexing. In this fashion, the transceivers 2020 can be used in conjunction with a MIMO transmission system to send and receive full duplex data via axial diversity, cyclic delay diversity, spatial coding, space time block coding, space frequency block coding, hybrid space time/frequency block coding, single stream multi-coupler spatial mapping or other transmission/reception scheme.

While the transmission device 2000 is shown with two transceivers 2020 and two couplers 2004 arranged at the top and bottom of the transmission medium 2002, other configurations can include three or more transceivers and corresponding couplers. For example, a transmission device 2000 with four transceivers 2020 and four couplers 2004 can be arranged angularly around the outer surface of a cylindrical transmission medium at equidistant orientations of 0, $\pi/2$, $\pi$, and $3\pi/4$. Considering a further example, a transmission device 2000 with n transceivers 2020 can include n couplers 2004 arranged angularly around the outer surface of a cylindrical transmission medium at angles $2\pi/n$ apart. It should be noted however that unequal angular displacements between couplers can also be used.

Figure 21:
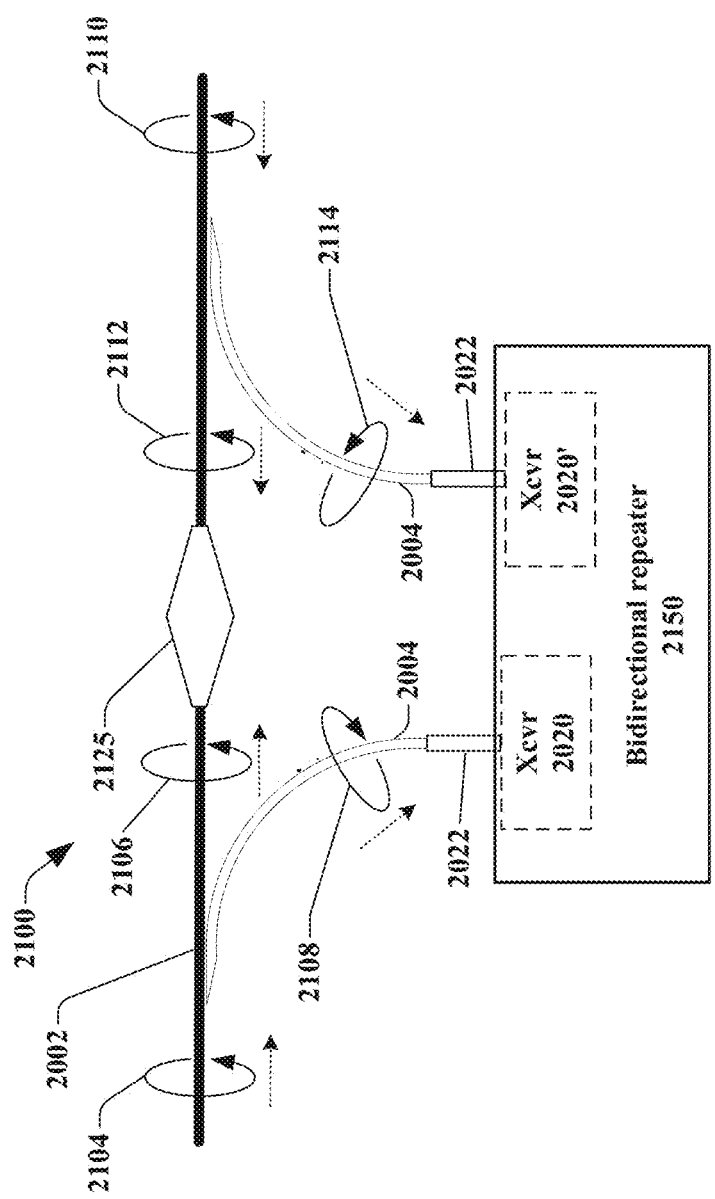
FIG. 21 is a block diagram of an example, non-limiting embodiment of a transmission device in accordance with various aspects described herein.

FIG. 21 is a block diagram of an example, non-limiting embodiment of a transmission device in accordance with various aspects described herein. In particular, a transmission device 2100 is shown that can be implemented as part of a bidirectional repeater 2150, such as all or part of repeater device 710 presented in conjunction with FIG. 7 or other repeater that includes two similar transceivers, 2020 and 2020'. Similar elements from FIG. 20 are represented by common reference numerals. In addition, the transmission device 2100 includes a shield 2125. In an embodiment, the shield 2125 (which can include a dampener in an embodiment) is constructed of absorbing or dampening material and surrounds the transmission medium 2002. In one direction of communication, when an electromagnetic wave 2104 is coupled to coupler 2004 to generate electromagnetic wave 2108, a portion may continue along transmission medium 2002 as electromagnetic wave 2106. The shield 2125 substantially or entirely absorbs the electromagnetic wave 2106 so that it will not continue to propagate, mitigating interference with the operation of the transceiver 2020' on the other side of the shield 2125. To continue on with the flow of this communication, data or signals from the electromagnetic wave 2108 as received by the transceiver 2020 are coupled to transceiver 2020' and relaunched in the same direction on the transmission medium 2002.

The shield 2125 may perform similar functions for communications in the opposite direction. When an electromagnetic wave 2110 is coupled to a coupler 2004 to generate electromagnetic wave 2114, a portion continues along transmission medium 2002 as electromagnetic wave 2112. The shield 2125 substantially or entirely absorbs the electromagnetic wave 2112 so that it will not continue to propagate, mitigating interference with the operation of the transceiver 2020 on the other side of the shield 2125, while reinforcing and enhancing the inherent directionality of the coupler 2004. As shown, the shield 2125 is tapered, rounded or beveled on both sides to minimize reflections and/or to provide impedance matching, however other designs are likewise possible.

Figure 22A:
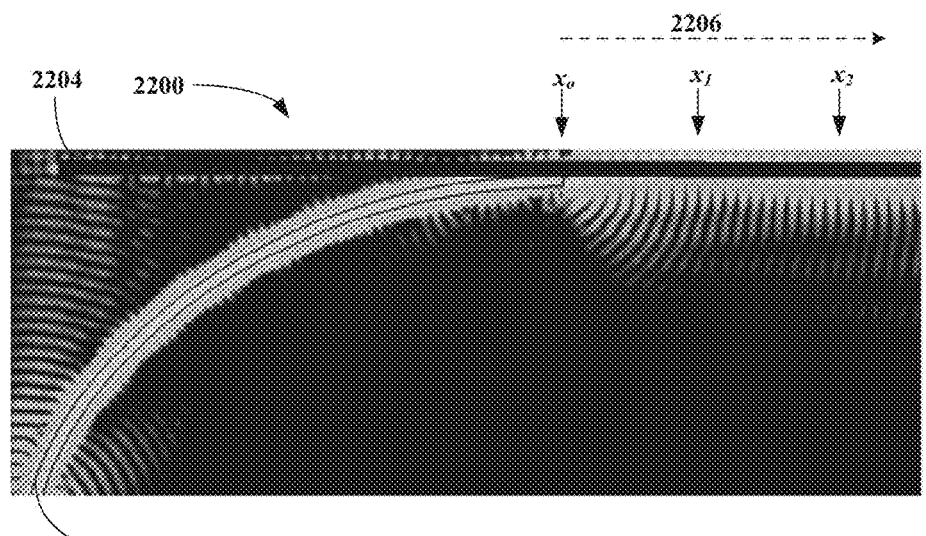
FIGS. 22a and 22b are a diagrams illustrating example, non-limiting embodiments of an electromagnetic distribution in accordance with various aspects described herein.

FIG. 22a is a diagram illustrating an example, non-limiting embodiment of an electromagnetic distribution in accordance with various aspects described herein. In particular, an electromagnetic distribution 2200 is presented in two dimensions for a transmission device that includes coupler 2202, such as any of the dielectric waveguide couplers previously described. The coupler 2202 couples an electromagnetic wave for propagation along an outer surface of a transmission medium 2204, such as a single wire transmission medium.

The coupler 2202 guides the electromagnetic wave to a junction at $x_0$ via a symmetrical guided-wave mode. As shown, the majority of the energy of the electromagnetic wave that propagates along the coupler 2202 is contained within the coupler 2202. The junction at $x_0$ couples the electromagnetic wave to a transmission medium at an azimuthal angle corresponding to the bottom of the transmission medium 2204. This coupling induces an electromagnetic wave that is guided to propagate along the outer surface of the transmission medium via at least one guided-wave mode. The majority of the energy of the electromagnetic wave that propagates along the transmission medium 2204 is outside, but in close proximity to the outer surface of the transmission medium 2204. In the example shown, the junction at $x_0$ forms an electromagnetic wave that propagates via both a symmetrical mode and at least one asymmetrical surface mode, such as the first order mode presented in conjunction with FIG. 17, that skims the surface of the transmission medium 2204.

The combination of symmetrical and asymmetrical propagation mode(s) of the electromagnetic wave that propagates along the surface of the transmission medium 2204 forms an envelope that varies as a function of angular deviation from the azimuthal angle that defines the orientation of the coupler 2202 to the transmission medium 2204 as well as a function of the longitudinal displacement from the junction at $x_0$. Consider the electromagnetic wave to be represented by the function $W(\Delta\theta, \Delta x, t)$, where $\Delta\theta$ represents the angular deviation from the azimuthal angle that defines the orientation of the coupler 2202 to the transmission medium 2204, $\Delta x$ represents function of the longitudinal displacement from the junction at $x_0$, and t represents time. The envelope of the electromagnetic wave W can be represented by $A(\Delta\theta, \Delta x)$, where, for $0 \leq t \leq \infty$, $$A(\Delta\theta, \Delta x) = \text{Max}(W(\Delta\theta, \Delta x, t))$$

Therefore, while the electromagnetic wave W varies as a function of time as a wave propagates along the length ($\Delta x$) of the transmission medium, the envelope A is the maximum amplitude of the electromagnetic wave for any time (t). Like a standing wave, the envelope A is a relatively time-stationary function of the longitudinal displacement along a transmission medium. While the envelope may vary based on slowly changing parameters of the transmission medium such as temperature or other environmental conditions, the envelope generally does not otherwise vary as a function of time. Unlike a standing wave however, the wavelength of the envelope function is not the same as the wavelength of the electromagnetic wave. In particular, the wavelength of the envelope function is much greater than the wavelength of the underlying electromagnetic wave. In the example shown, the wavelength of the underlying electromagnetic wave $\lambda_c \approx 0.8$ cm while the envelope function of the envelope function is more than 10 times greater. Further, unlike a traditional standing wave the envelope A also varies as a function of $\Delta\theta$, the angular deviation from the azimuthal angle that defines the orientation of the coupler 2202 to the transmission medium 2204.

In the example shown, the coupler 2202 induces an electromagnetic wave on the transmission medium 2204—at a first surface (the bottom) of the transmission medium 2204. At the junction at $x_0$, the electromagnetic wave is concentrated at the bottom of the transmission medium with a much smaller level of radiation on a second surface opposite the first side (the top) of the transmission medium 2004. The envelope of the electromagnetic wave at the first surface (bottom) of the transmission medium 2204 decreases along the transmission medium in the direction of propagation 2206, until it reaches a minimum at $x_1$. Considering instead, the second surface (top) of the transmission medium 2204, the envelope of the electromagnetic wave increases along the transmission medium in the direction of propagation 2206, until it reaches a maximum at $x_1$. In this fashion, the envelope roughly follows a serpentine pattern, oscillating between minima and maxima and concentration along the first surface (top) and second surface(bottom) of the transmission medium 2204, as the electromagnetic wave propagates along the direction of propagation 2206. It will be appreciated that the first and second surfaces could be swapped in another embodiment based upon a positioning of the coupler 2202 with respect to the transmission medium 2204. For example, in an embodiment, the first surface can be on a same surface where the coupler 2202 meets the transmission medium.

The value $\Delta\theta=0$ corresponds to no angular deviation from the azimuthal angle that defines the orientation of the coupler 2202 to the transmission medium 2204, —i.e. the first surface (bottom) of the transmission medium 2204. The opposite surface, at the top of the transmission medium 2204, corresponds to $\Delta\theta=\pi$, an angular deviation of $\pi$ radians. In the embodiment shown, for $\Delta\theta=0$ the envelope has local maxima at $x_0$ and $x_2$ and a local minimum at $x_1$. Conversely, for $\Delta\theta=\pi$, the envelope has local minima at $x_0$ and $x_2$ and a local maximum at $x_1$.

Figure 22B:
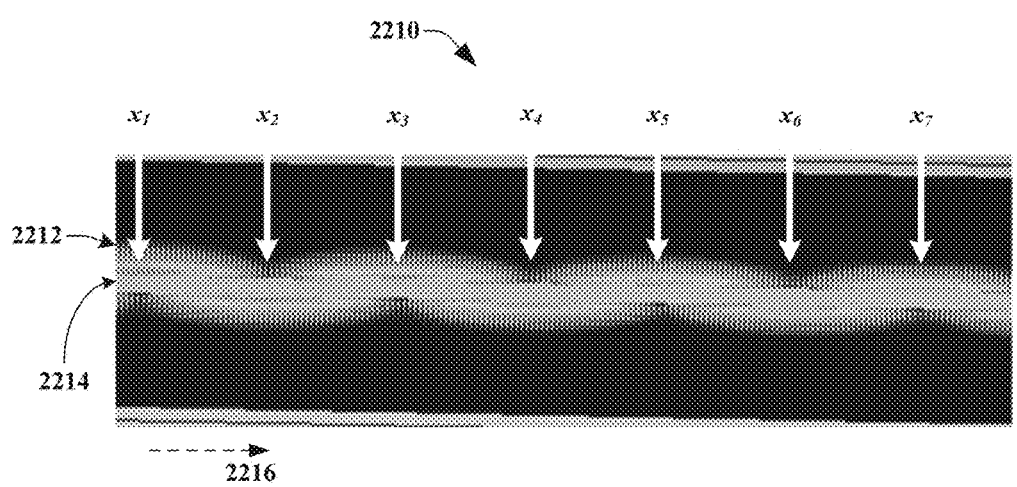

FIG. 22b is a diagram illustrating an example, non-limiting embodiment of an electromagnetic distribution in accordance with various aspects described herein. In particular, an electromagnetic distribution 2210 is presented in two dimensions for a transmission device that includes any of the couplers previously described. The electromagnetic wave 2212 propagates along an outer surface of a transmission medium 2214, such as a single wire transmission medium or other transmission medium previously discussed.

The majority of the energy of the electromagnetic wave 2212 that propagates along the transmission medium 2214 is outside of, but in close proximity to the outer surface of the transmission medium 2214. The combination of symmetrical and asymmetrical propagation mode(s) of the electromagnetic wave 2214 forms an envelope that varies as a function of axial orientation as well as a function of the longitudinal displacement along the transmission medium 2214. The envelope of the electromagnetic wave 2212 roughly follows a serpentine pattern, oscillating between minima and maxima and concentration along the top and bottom of the transmission medium 2214, as the electromagnetic wave 2212 propagates along the direction of propagation 2216.

Consider an azimuthal orientation $\theta=0$ that corresponds to the bottom of the transmission medium 2214. The opposite surface, at the top of the transmission medium 2904, corresponds to $\theta=7$, an azimuthal orientation of $\pi$ radians. In the embodiment shown, for $\theta=0$ the envelope has local maxima at ($x_1$, $x_3$, $x_5$, $x_7$) and a local minima at ($x_2$, $x_4$, $x_6$). Conversely, for $\theta=7$, the envelope has local minima at ($x_1$, $x_3$, $x_5$, $x_7$) and a local maxima at ($x_2$, $x_4$, $x_6$).

Figure 23:
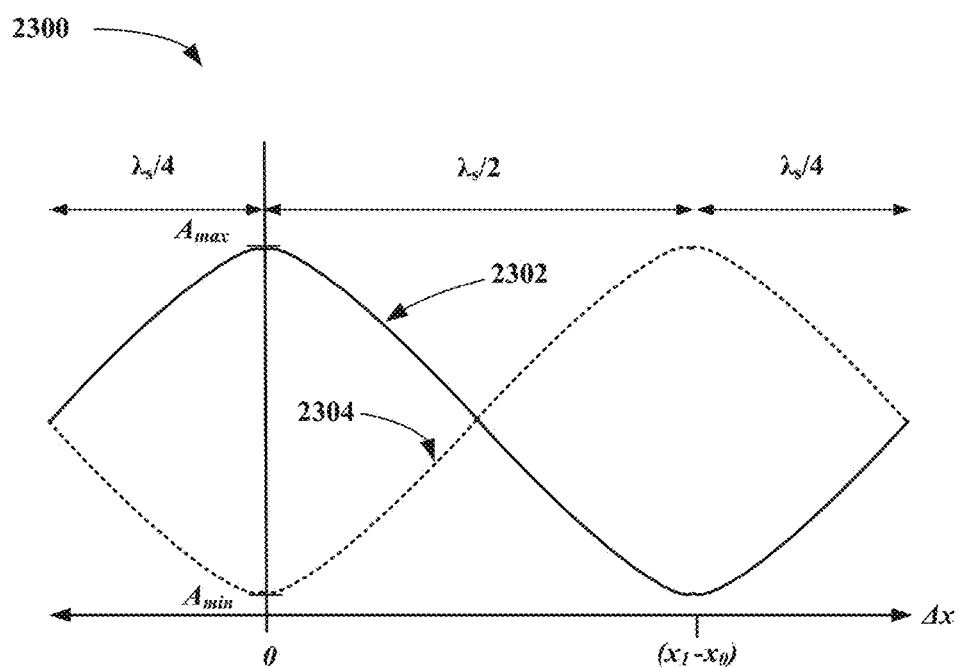
FIG. 23 is a diagram illustrating an example, non-limiting embodiment of a functions in accordance with various aspects described herein.

FIG. 23 is a diagram illustrating an example, non-limiting embodiment of a function in accordance with various aspects described herein. In particular, the graph 2300 presents approximations of the envelope A for two different fixed angular deviations $\Delta\theta$. As shown, the envelope A is a periodic function that varies between a maximum value $A_{max}$ and a minimum value $A_{min}$.

The function 2302 presents an approximation of the envelope A for a fixed angular deviation $\Delta\theta=0$. In this case, $$A(0,\Delta x)=((A_{max}-A_{min})D(\Delta x)\cos(2\pi\Delta x/\lambda_s))+A_{min}$$

Where $D(\Delta x)$ is a monotonically decreasing function that has a value of $$D(0)=1$$

that represents the gradual decay in amplitude of the electromagnetic wave W as it propagates along the length of the transmission medium and where $\lambda_s$ represents the wavelength of the envelope. In the example shown:

$$\lambda_s=2(x_1-x_0)$$

In this example, for $\Delta\theta=0$ the envelope has local maxima at:

$$\Delta x=0,\lambda_s,2\lambda_s \ldots$$

Or more generally at, $$\Delta x=N\lambda_s$$

where N is an integer. Further, for $\Delta\theta=0$ the envelope has local minima at:

$$\Delta x=\lambda_s/2,3\lambda_s/2 \ldots$$

Or more generally at, $$\Delta x=(2N+1)\lambda_s/2$$

The function 2304 presents an approximation of the envelope A for a fixed angular deviation $\Delta\theta=\pi$. In this case, $$A(\pi,\Delta x)=((A_{max}-A_{min})D(\Delta x)\cos(2\pi\Delta x/\lambda_s+\pi)+A_{min}$$

In this example, for $\Delta\theta=\pi$ the envelope has local minima at:

$$\Delta x=0,\pi,2\lambda_s \ldots$$

Or more generally at, $$\Delta x=N\lambda_s$$

where N is an integer. Further, for $\Delta\theta=0$ the envelope has local maxima at:

$$\Delta x=\lambda_s/2,3\lambda_s/2 \ldots$$

Or more generally at, $$\Delta x=(2N+1)\lambda_s/2$$

While the functions 2302 and 2304 present approximations of the envelope A at the top and bottom of the transmission medium, in an embodiment, at least one guided-wave mode of the electromagnetic wave W rotates angularly as the wave propagates along the length of the transmission medium. In this case, the envelope A can be approximated as follows:

$$A(\Delta\theta,\Delta x)=((A_{max}-A_{min})D(\Delta x)\cos(2\pi\Delta\theta/\lambda_s+\Delta\theta))+A_{min}$$

or $$A(\Delta\theta,\Delta x)=((A_{max}-\lambda_{min})D(\Delta x)\cos(-2\pi\Delta x/\lambda_s+\Delta\theta))+A_{min}$$

depending on whether the axial rotation is clockwise or counterclockwise.

Note that, in concert with the example presented above, for $\Delta\theta=\pi$ the envelope has local minima at:

$$\Delta x=N\lambda_s$$

And for $\Delta\theta=0$ the envelope has local maxima at:

$$\Delta x=(2N+1)\lambda_s/2$$

Considering fixed values of $\Delta x$, for $\Delta x=0$, the envelope has a local minimum at:

$$\Delta\theta=\pi$$

And a local maximum at:

$$\Delta\theta=0$$

For $\Delta x=\lambda_s/2$, the envelope has a local maximum at:

$$\Delta\theta=\pi$$

And a local minimum at:

$$\Delta\theta=0$$

Using the approximations above, the local minima and maxima can be calculated for other axial deviations as well. Considering the case where $\Delta\theta=\pi/2$, and clockwise rotation, the envelope has local maxima at:

$$\Delta x=\lambda_s/4,5\lambda_s/4 \ldots$$

And local minima at:

$$\Delta x=3\lambda_s/4,7\lambda_s/4 \ldots$$

Considering the case where $\Delta\theta=-\pi/2$, and counterclockwise rotation, the envelope has local maxima at:

$$\Delta x=\lambda_s/4,5\lambda_s/4 \ldots$$

And local minima at:

$$\Delta x=3\lambda_s/4,7\lambda_s/4 \ldots$$

Approximations of the envelope A can be useful in designing the placement of multiple couplers in the transmission medium to support simultaneous communications via multiple electromagnetic waves W via axial or spatial diversity. For example, placing one coupler at an axial deviation and/or longitudinal displacement from another coupler that corresponds to a local minimum of the envelope increases the isolation between the electromagnetic waves and reduces the amount of interference between these couplers. Further, placing a receiving coupler at an axial deviation and/or longitudinal displacement from a transmitting coupler at a corresponding local maximum can increase the signal gain and data throughput for an electromagnetic wave that is transmitted from the transmitting coupler to the receiving coupler. Further examples of such configurations including various optional functions and features will be explored in conjunction with FIGS. 24-34 that follow.

Figure 24:
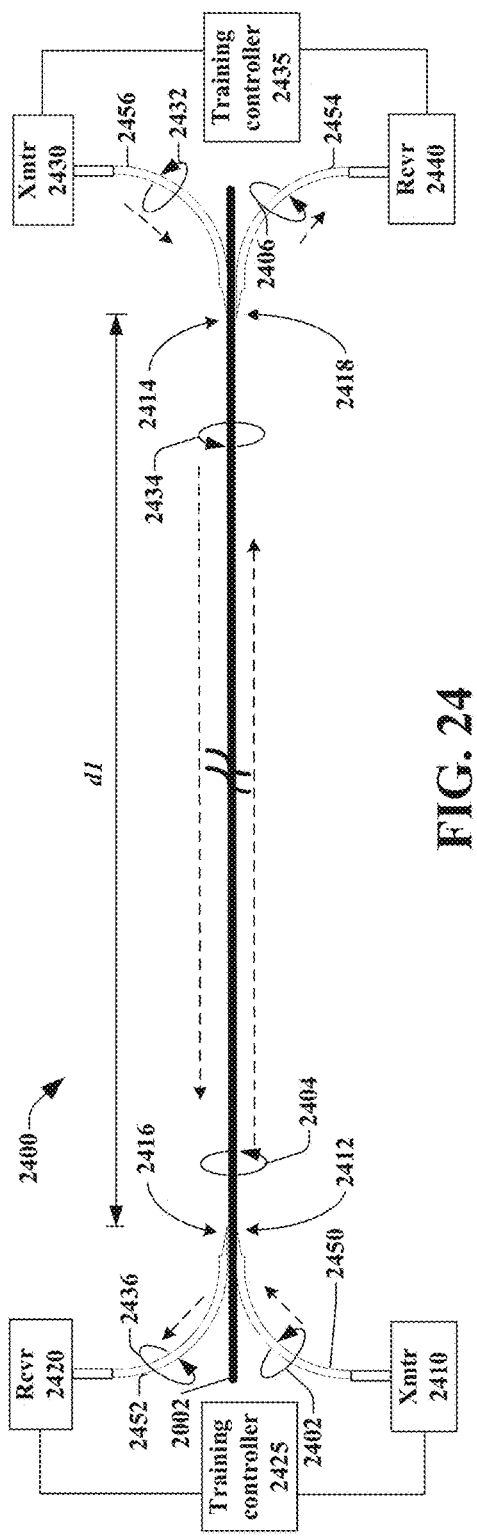
FIG. 24 is a block diagram of an example, non-limiting embodiment of a transmission system in accordance with various aspects described herein.

FIG. 24 is a block diagram of an example, non-limiting embodiment of a transmission system in accordance with various aspects described herein. The transmission system 2400 is presented that includes two transmission devices that are spaced a distance apart along the transmission medium 2002. In this system the transmitter 2410 generates an electromagnetic wave 2402 conveying first data. A coupler 2450 guides the electromagnetic wave 2402 to a junction 2412 that couples the electromagnetic wave 2402 to the transmission medium 2002 at a first azimuthal angle to form an electromagnetic wave 2404 that is guided to propagate along the outer surface of the transmission medium 2002 via one or more guided-wave modes. The electromagnetic wave 2404 has an envelope that varies as a function of angular deviation $\Delta\theta$ from the first azimuthal angle and the longitudinal displacement $\Delta x$ from the junction 2412. The function has a local minimum at an angular deviation $\Delta\theta=\theta_1$ from the first azimuthal angle and an angular displacement $\Delta x = x_1$ from the junction 2412. The coupler 2454 at junction 2418 forms an electromagnetic wave 2406 from the electromagnetic wave 2404 and guides the electromagnetic wave 2454 to receiver 2440 to receive the first data.

A remote transmitter 2430 generates an electromagnetic wave 2432 conveying second data that is coupled onto the transmission medium 2002 via coupler 2456 at a junction at 2414 as an electromagnetic wave 2434. The electromagnetic wave 2434 propagates along the outer surface of the transmission medium 2002 in a direction opposite to the electromagnetic wave 2404. The coupler 2452 couples the electromagnetic wave 2434 from the transmission medium 2002 at junction 2416 to form an electromagnetic wave 2436 that is guided to the receiver 2420 that receives the second data. The coupler 2452 at the junction 2416 corresponds to an angular deviation $\Delta\theta=\theta_1$ from the first azimuthal angle and a longitudinal displacement $\Delta x = x_1$ from the junction 2412. As shown, $\theta_1 = \pi$ and $\Delta x = 0$, placing the coupler 2452 at a local minimum of the envelope of the electromagnetic wave 2404. This placement of coupler 2452 at the junction 2416 helps reduce bleed through of the electromagnetic wave 2404 to the receiver 2420. A similar effect occurs between transmitter 2430 and receiver 2440.

In various embodiments, the couplers of the receiver/transmitter pair 2410/2440 are oriented at the same axial orientation and the longitudinal displacement d1 between the junctions 2412 and 2418 is selected so that the receiving coupler 2454 is placed at a local maximum of the envelope. Considering further the examples presented in conjunction with FIG. 23, $$d1 = N\lambda_s$$

If the electromagnetic wave 2432 is transmitted at the same carrier frequency as the electromagnetic wave 2402, each electromagnetic wave has the same wavelength and a similar effect occurs between junctions 2414 and 2416.

Each of the two transmission devices of system 2400 includes a training controller 2425 that operates similar to training controller 1900. In this embodiment, however, the training controller 2425 selects at least one carrier frequency of the electromagnetic wave 2402 generated by transmitter 2410 based on feedback data received by the receiver 2420 via the electromagnetic wave 2436. The training controller 2435 generates this feedback data based on the reception of the electromagnetic wave 2406 by receiver 2440 and transmits the feedback data via the electromagnetic wave 2432 generated by transmitter 2430. The training controllers can operate reciprocally to establish the carrier frequency of the electromagnetic wave 2434. In the alternative, the training controllers 2425 and 2435 can operate in a cooperative fashion to select a single carrier frequency that not only promotes propagation of the electromagnetic waves 2404 and 2434 along the transmission medium 2002, but that further increases the envelope of the desired electromagnetic wave at the receiving coupler while reducing transmitter bleed through for each transmission device.

While each coupler (2450, 2452, 2454 or 2456) is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

Further, while the operation of the transmission system 2400 has been described in terms of aligning minima or maxima of the envelope to enhance transmission and reduce interference between devices, the same principles can be applied to reducing interference between different waves that share the same transmission medium. In pertinent part, the envelope of the wave can be adjusted, and/or the angular or longitudinal position of the specific transmitters and receivers can be adjusted to align one or more contemporaneous waves that share the transmission medium for beneficial effect.

In various embodiments, a waveguide system, such as one or more components of the transmission system 2400 determines a first transmission envelope of a first asymmetric electromagnetic wave, wherein the first transmission envelope has a first wavelength that reduces signal interference between the first asymmetric electromagnetic wave and a second asymmetric electromagnetic wave having a second transmission envelope at a second wavelength. This determination can be made by training controller 2425, via other components of the waveguide system or via initial design and set-up of the system. The determination can include determining an angular displacement between a first portion of a signal of the first asymmetric electromagnetic wave and a second portion of a signal of the second asymmetric electromagnetic wave—e.g. between points of interest (minima or maxima) of the envelopes of the two signals.

The waveguide system transmits the first asymmetric electromagnetic wave on an outer surface of a transmission medium according to the first transmission envelope at a same time the second asymmetric electromagnetic wave is propagating on the outer surface of the transmission medium. This waveguide system can adjust the transmitting of the first asymmetric electromagnetic wave according to the angular displacement. By, for example adjusting an operating frequency of asymmetric electromagnetic waves transmitted by the waveguide system or a location of a coupler of the waveguide system with respect to the transmission medium.

Figure 25:
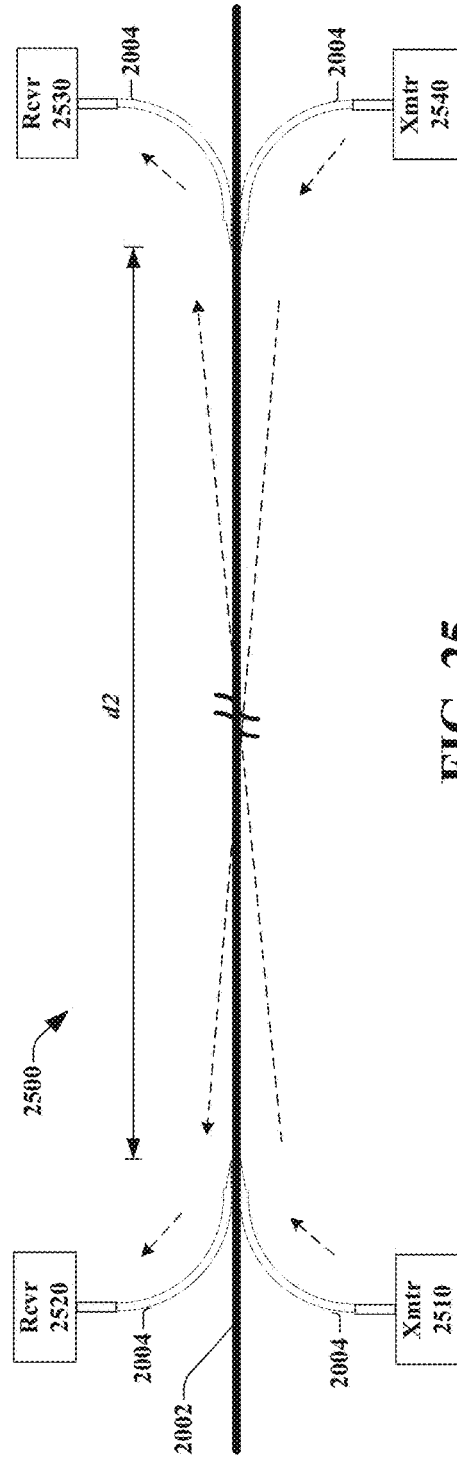
FIG. 25 is a block diagram of an example, non-limiting embodiment of a transmission system in accordance with various aspects described herein.

FIG. 25 is a block diagram of an example, non-limiting embodiment of a transmission system in accordance with various aspects described herein. This system 2500 operates in a similar fashion to the transmission system 2400. Transmitter 2510 and receiver 2520 are part of one transmission device that communicates with a remote transmission device that includes transmitter 2540 and receiver 2530. In operation, transmitter 2520 sends an electromagnetic wave that conveys data to receiver 2530 and transmitter 2540 sends another electromagnetic wave that conveys data to receiver 2520. These two electromagnetic waves traverse the transmission medium 2002 in opposite directions.

The transmitter and receiver pair of each transmission device are coupled at opposite axial orientations but at the same spatial displacement. As such, the transmitter 2510 and receiver 2520 are coupled at the same location (e.g., substantially the same longitudinal position), but on opposite sides of the transmission medium 2002. Likewise, the transmitter 2540 and receiver 2530 are coupled at the same location (e.g., substantially the same longitudinal position), but on opposite sides of the transmission medium 2002—a distance d2 from the coupling point of the other transmission device.

In this embodiment however, the transmitter/receiver pairs that communicate with one another are oriented at different axial deviations. In particular, the couplers of the receiver/transmitter pair 2510/2530 are oriented at different (opposite) axial orientations and the longitudinal displacement d2 between the junctions is selected so that the receiving coupler is still placed at a local maximum of the envelope. Considering further the examples presented in conjunction with FIG. 23, $$d2=N\lambda_s+\lambda_s/2$$

If the transmitter/receiver pair 2540/2520 employs the same carrier frequency, a similar effect occurs for transmission in the opposite direction along transmission medium.

While not specifically shown, each transmission device could include a training controller, such as training controller 2425 or 2435 to adjust the carrier frequency of the electromagnetic waves so that the placement of each receiving coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 26 is a block diagram of an example, non-limiting embodiment of a transmission system in accordance with various aspects described herein. This system 2600 operates in a similar fashion to the transmission system 2400. Transmitter 2410 and receiver 2420 are part of one transmission device that communicates with a remote transmission device that includes transmitter 2430 and receiver 2440. In operation, transmitter 2410 sends an electromagnetic wave that conveys data to receiver 2440 and transmitter 2430 sends another electromagnetic wave that conveys data to receiver 2420. These two electromagnetic waves traverse the transmission medium 2002 in opposite directions.

The transmitter and receiver within each transmission device are coupled to the transmission medium 2002 at opposite axial orientations but at different spatial deviations d3. In this case, the value of d3 is selected to correspond to a local minimum in the envelope for Δθ=π. Considering further the examples presented in conjunction with FIG. 23, $$d3=N\lambda_s$$

In this case, the transmitter/receiver pairs that communicate with one another are oriented at the same axial orientations at either the top or bottom of the transmission medium. In particular, the couplers of the receiver/transmitter pair 2420/2430 are oriented at the same axial orientation at the top of the transmission medium 2002 and the longitudinal displacement d1 between the junctions is selected so that the receiving coupler is still placed at a local maximum of the envelope. In this case, $$d1=N\lambda_s$$

If the transmitter/receiver pair 2410/2440 employs the same carrier frequency, a similar effect occurs for transmission in the opposite direction along the transmission medium.

While not specifically shown, each transmission device could include a training controller, such as training controller 2425 or 2435 to adjust the carrier frequency of the electromagnetic waves so that the placement of each receiver coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 27 is a block diagram of an example, non-limiting embodiment of a transmission system in accordance with various aspects described herein. This system 2700 operates in a similar fashion to the transmission system 2400. Transmitter 2510 and receiver 2520 are part of one transmission device that communicates with a remote transmission device that includes transmitter 2540 and receiver 2530. In operation, transmitter 2510 sends an electromagnetic wave that conveys data to receiver 2530 and transmitter 2540 sends another electromagnetic wave that conveys data to receiver 2520. These two electromagnetic waves traverse the transmission medium 2002 in opposite directions.

The transmitter and receiver within each transmission device are coupled to the transmission medium 2002 at opposite axial orientations but at different spatial deviations d3. In this case, the value of d3 is selected to correspond to a local minimum in the envelope for Δθ=π. Considering further the examples presented in conjunction with FIG. 23, $$d3=N\lambda_s$$

In this embodiment, the transmitter/receiver pairs that communicate with one another are also oriented at different axial deviations. In particular, the couplers of the receiver/transmitter pair 2510/2530 are oriented at different (opposite) axial orientations and the longitudinal displacement d2 between the junctions is selected so that the receiving coupler is still placed at a local maximum of the envelope. Considering further the examples presented in conjunction with FIG. 23, $$d2=N\lambda_s+\lambda_s/2$$

If the transmitter/receiver pair 2540/2520 employs the same carrier frequency, a similar effect occurs for transmission in the opposite direction along the transmission medium.

While not specifically shown, each transmission device could include a training controller, such as training controller 2425 or 2435 to adjust the carrier frequency of the electromagnetic waves so that the placement of each receiver coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

While FIGS. 24-27 have presented examples where two electromagnetic waves in opposite directions share the same transmission medium, FIGS. 28-31 present similar configurations that support simultaneous transport of electromagnetic waves in the same direction.

FIG. 28 is a block diagram of an example, non-limiting embodiment of a transmission system in accordance with various aspects described herein. This system 2800 operates in a similar fashion to the transmission system 2400. Transmitters 2810 and 2830 are part of one transmission device that communicates with a remote transmission device that includes receivers 2820 and 2840. In operation, transmitter 2810 sends an electromagnetic wave that conveys data to receiver 2840 and transmitter 2830 sends another electromagnetic wave that conveys data to receiver 2820. These two electromagnetic waves traverse the transmission medium 2002 in the same direction.

The transmitter and receiver pair of each transmission device are coupled at opposite axial orientations but at the same spatial displacement. As such, the transmitters 2810 and 2830 are coupled at the same location (e.g., substantially the same longitudinal position), but on opposite sides of the transmission medium 2002. Likewise, the receivers 2820 and 2840 are coupled at the same location (e.g., substantially the same longitudinal position), but on opposite sides of the transmission medium 2002—a distance d1 from the coupling point of the other transmission device.

In this case, the transmitter/receiver pairs that communicate with one another are oriented at the same axial orientations at either the top or bottom of the transmission medium. In particular, the couplers of the receiver/transmitter pair 2830/2820 are oriented at the same axial orientation at the top of the transmission medium 2002 and the longitudinal displacement d1 between the junctions is selected so that the receiving coupler is still placed at a local maximum of the envelope. In this case, $$d1 = N\lambda_s$$

If the transmitter/receiver pair 2810/2840 employs the same carrier frequency, a similar effect occurs for transmission in the same direction along the transmission medium.

While not specifically shown, each transmission device could include a training controller, such as training controller 2425 or 2435 to adjust the carrier frequency of the electromagnetic waves so that the placement of each receiving coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 29 is a block diagram of an example, non-limiting embodiment of a transmission system in accordance with various aspects described herein. This system 2900 operates in a similar fashion to the transmission system 2400. Transmitters 2910 and 2940 are part of one transmission device that communicates with a remote transmission device that includes receivers 2920 and 2930. In operation, transmitter 2910 sends an electromagnetic wave that conveys data to receiver 2930 and transmitter 2940 sends another electromagnetic wave that conveys data to receiver 2920. These two electromagnetic waves traverse the transmission medium 2002 in the same direction.

The transmitter and receiver pair of each transmission device are coupled at opposite axial orientations but at the same spatial displacement. As such, the transmitters 2910 and 2940 are coupled at the same location, but on opposite sides of the transmission medium 2002. Likewise, the receivers 2920 and 2930 are coupled at the same location, but on opposite sides of the transmission medium 2002—a distance d2 from the coupling point of the other transmission device.

In this embodiment however, the transmitter/receiver pairs that communicate with one another are oriented at different axial deviations. In particular, the couplers of the receiver/transmitter pair 2910/2930 are oriented at different (opposite) axial orientations and the longitudinal displacement d2 between the junctions is selected so that the receiving coupler is still placed at a local maximum of the envelope. Considering further the examples presented in conjunction with FIG. 23, $$d2 = N\lambda_s + \lambda_s/2$$

If the transmitter/receiver pair 2940/2920 employs the same carrier frequency, a similar effect occurs for transmission in the same direction along the transmission medium.

While not specifically shown, each transmission device could include a training controller, such as training controller 2425 or 2435 to adjust the carrier frequency of the electromagnetic waves so that the placement of each receiving coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 30 is a block diagram of an example, non-limiting embodiment of a transmission system in accordance with various aspects described herein. This system 3000 operates in a similar fashion to the transmission system 2400. Transmitters 2810 and 2830 are part of one transmission device that communicates with a remote transmission device that includes receivers 2820 and 2840. In operation, transmitter 2810 sends an electromagnetic wave that conveys data to receiver 2840 and transmitter 2830 sends another electromagnetic wave that conveys data to receiver 2820. These two electromagnetic waves traverse the transmission medium 2002 in the same direction.

The transmitter and receiver within each transmission device are coupled to the transmission medium 2002 at opposite axial orientations but at different spatial deviations d3. In this case, the value of d3 is selected to correspond to a local minimum in the envelope for $\Delta\theta = \pi$. Considering further the examples presented in conjunction with FIG. 23, $$d3 = N\lambda_s$$

In this case, the transmitter/receiver pairs that communicate with one another are oriented at the same axial orientations at either the top or bottom of the transmission medium. In particular, the couplers of the receiver/transmitter pair 2820/2830 are oriented at the same axial orientation at the top of the transmission medium 2002 and the longitudinal displacement d1 between the junctions is selected so that the receiving coupler is still placed at a local maximum of the envelope. In this case, $$d1 = N\lambda_s$$

If the transmitter/receiver pair 2810/2840 employs the same carrier frequency, a similar effect occurs for transmission in the same direction along the transmission medium.

While not specifically shown, each transmission device could include a training controller, such as training controller 2425 or 2435 to adjust the carrier frequency of the electromagnetic waves so that the placement of each receiver coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 31 is a block diagram of an example, non-limiting embodiment of a transmission system in accordance with various aspects described herein. This system 3100 operates in a similar fashion to the transmission system 2400. Transmitters 2910 and 2940 are part of one transmission device that communicates with a remote transmission device that includes receivers 2920 and 2930. In operation, transmitter 2910 sends an electromagnetic wave that conveys data to receiver 2930 and transmitter 2940 sends another electromagnetic wave that conveys data to receiver 2920. These two electromagnetic waves traverse the transmission medium 2002 in the same direction.

The transmitter and receiver within each transmission device are coupled to the transmission medium 2002 at opposite axial orientations but at different spatial deviations d3. In this case, the value of d3 is selected to correspond to a local minimum in the envelope for $\Delta\theta=\pi$. Considering further the examples presented in conjunction with FIG. 23, $$d3 = N\lambda_s$$

In this embodiment, the transmitter/receiver pairs that communicate with one another are also oriented at different axial deviations. In particular, the couplers of the receiver/transmitter pair 2910/2930 are oriented at different (opposite) axial orientations and the longitudinal displacement d2 between the junctions is selected so that the receiving coupler is still placed at a local maximum of the envelope. Considering further the examples presented in conjunction with FIG. 23, $$d2 = N\lambda_s + \lambda_s/2$$

If the transmitter/receiver pair 2940/2920 employs the same carrier frequency, a similar effect occurs for transmission in the same direction along the transmission medium.

While not specifically shown, each transmission device could include a training controller, such as training controller 2425 or 2435 to adjust the carrier frequency of the electromagnetic waves so that the placement of each receiver coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

While FIGS. 24-31 have presented examples where transmitters and receivers, or more generally, transceivers of a transmission device are coupled to a transmission device at different axial orientations to support simultaneous transmission and reception of electromagnetic waves, FIGS. 32-34 present similar configurations that support simultaneous transport of electromagnetic waves via transmission devices where transmitters, receivers or transceivers are coupled in axial alignment.

FIG. 32 is a block diagram of an example, non-limiting embodiment of a transmission system in accordance with various aspects described herein. This system 3200 operates in a similar fashion to the transmission system 2400. The transmitter 2410 and receiver 2420 within the transmission device are coupled to the transmission medium 2002 at the same axial orientations but at different a spatial deviation d4. In this case, the value of d4 is selected to correspond to a local minimum in the envelope for $\Delta\theta=0$. Considering further the examples presented in conjunction with FIG. 23, $$d4 = N\lambda_s + \lambda_s/2$$

For the case $N=0$, $$d4 = N\lambda_s + \lambda_s/2$$

While not specifically shown, the transmission device could include a training controller, such as training controller 2425 or 2435 to adjust the carrier frequency of the electromagnetic waves so that the placement of the receiver coupler corresponds as closely as possible to a local maximum of the envelope. While each coupler 2004 is shown as engaging in unidirectional communication via either a transmitter or receiver, more generally, each coupler can be coupled to a transceiver that includes both a transmitter and receiver for engaging in bidirectional communications in a manner similar to the transmission device described in conjunction with FIG. 20.

FIG. 33 is a block diagram of an example, non-limiting embodiment of a transmission system in accordance with various aspects described herein. This system 3300 operates in a similar fashion to the transmission system 2400. The transmitters 2410 within the transmission device are coupled to the transmission medium 2002 at the same axial orientations but at different a spatial deviation d4. In this case, the value of d4 is selected to correspond to a local minimum in the envelope for $\Delta\theta=0$. Considering further the examples presented in conjunction with FIG. 23, $$d4 = N\lambda_s + \lambda_s/2$$

For the case $N=0$, $$d4 = N\lambda_s + \lambda_s/2$$

While not specifically shown, the transmission device could include a training controller, such as training controller 2425 or 2435 to adjust the carrier frequency of the electromagnetic waves so that the placement of the receiver coupler corresponds as closely as possible to a local maximum of the envelope. While each coupler 2004 is shown as engaging in unidirectional communication via a transmitter, more generally, each coupler can be coupled to a transceiver that includes both a transmitter and receiver for engaging in bidirectional communications in a manner similar to the transmission device described in conjunction with FIG. 20.

FIG. 34 is a block diagram of an example, non-limiting embodiment of a transmission system in accordance with various aspects described herein. This system 3400 operates in a similar fashion to the transmission system 2400. The receivers 2420 within the transmission device are coupled to the transmission medium 2002 at the same axial orientations but at different a spatial deviation d4. In this case, the value of d4 is selected to correspond to a local minimum in the envelope for $\Delta\theta=0$. Considering further the examples presented in conjunction with FIG. 23, $$d4 = N\lambda_s + \lambda_s/2$$

For the case $N=0$, $$d4 = N\lambda_s + \lambda_s/2$$

While not specifically shown, the transmission device could include a training controller, such as training controller 2425 or 2435 to adjust the carrier frequency of the electromagnetic waves so that the placement of the receiver coupler corresponds as closely as possible to a local maximum of the envelope. While each coupler 2004 is shown as engaging in unidirectional communication via either a receiver, more generally, each coupler can be coupled to a transceiver that includes both a transmitter and receiver for engaging in bidirectional communications in a manner similar to the transmission device described in conjunction with FIG. 20.

While the examples presented in conjunction with FIGS. 24-34 have focused on transmission devices and communication systems with axial deviations of $\Delta\theta=0$ or $\Delta\theta=\pi$, other deviations $\Delta\theta$ are possible. As discussed in conjunction with FIG. 23, electromagnetic waves may propagate with envelopes having local maxima and minima that support other axial deviations Δθ at corresponding longitudinal displacements Δx. Considering the example where the envelope can be approximated by:

$$A(\Delta\theta, \Delta x) = ((A_{max} - A_{min})D(\Delta x)\cos(2\pi\Delta x/\lambda_s + \Delta\theta)) + A_{min}$$

and Δθ=π/2, the envelope has local maxima at:

$$\Delta x = \lambda_s/4, 5\lambda_s/4 \ldots$$

And local minima at:

$$\Delta x = 3\lambda_s/4, 7\lambda_s/4 \ldots$$

Two transceivers of the same transmission device can be placed with Δθ=π/2 and Δx=3λ$_s$/4 and a similar remote transmission device can be placed at a distance of $$d = (4N+1)\lambda_s/4$$

Other examples with other axial deviations and/or a greater number of transceivers are likewise possible.

Figure 35:
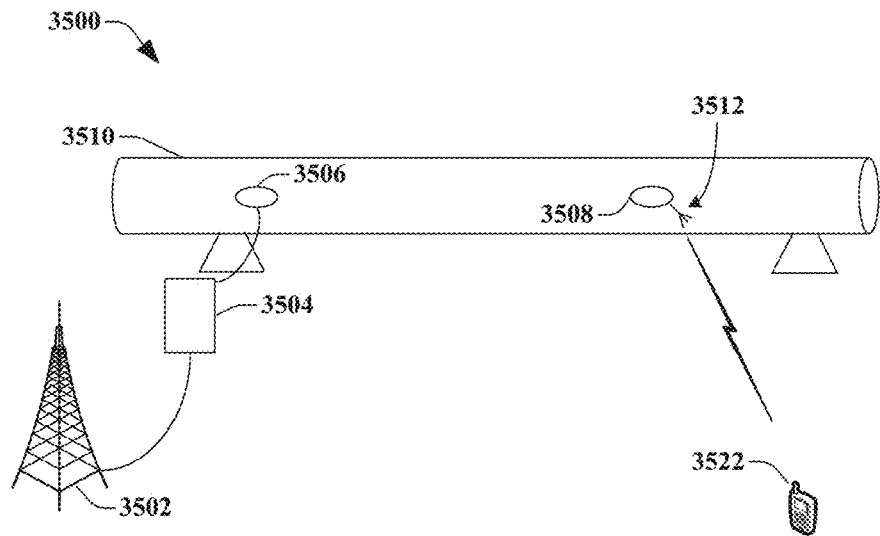
FIG. 35 is a block diagram illustrating an example, non-limiting embodiment of a guided-wave communications system in accordance with various aspects described herein.

FIG. 35 is a block diagram illustrating an example, non-limiting embodiment of a guided-wave communications system in accordance with various aspects described herein. Guided-wave communication system 3500 can be a distributed antenna system that includes one or more base station devices (e.g., base station device 3504) that are communicably coupled to a macrocell site 3502 or other network connection. Base station device 3504 can be connected by a wired (e.g., fiber and/or cable) connection as shown, or by a wireless (e.g., microwave wireless) connection to macrocell site 3502. Macrocells such as macrocell site 3502 can have dedicated connections to the mobile network and base station device 3504 can share and/or otherwise use macrocell site 3502's connection. Base station device 3504 can be mounted on, or attached to, a pipeline 3510. The pipeline 3510 can be a national infrastructure pipeline such as a natural gas pipeline or oil pipeline used for energy distribution, a carbon dioxide pipeline used for carbon capture, reuse or storage, or other pipe or pipeline system. In pertinent part, the pipeline 3510 serves as the transmission medium—taking the place of a wire or single wire transmission medium. As such, electromagnetic waves propagate along the outer surface as surface waves or other guided-waves, as previously described in conjunction with FIGS. 1-34.

Base station device 3504 can facilitate connectivity to a mobile network for mobile device 3522. Antennas 3512 mounted on a transmission device 3508 or pipeline 3510, can receive signals from base station device 3504 and transmit those signals to mobile device 3522 over a much wider area than if the antenna 3512 was located at or near base station device 3504.

In this example, the transmission device 3506 transmits data from base station device 3504 to antenna 3512 used to communicate with a mobile device 3522. To transmit the signal, transmit device 3506 upconverts the signal (e.g., via frequency mixing) from base station device 3504 or otherwise converts the signal from the base station device 3504 to a millimeter-wave band signal having at least one carrier frequency in the millimeter wave frequency band. The transmission device 3506 launches a millimeter-wave band electromagnetic wave that propagates as a guided-wave (e.g., surface wave or other electromagnetic wave) that travels along the outer surface of the pipeline 3510.

Another transmission device 3508 receives the guided-wave (and optionally can amplify it as needed or desired or operate as a digital repeater to receive it and regenerate it) and can send it forward as a guided-wave transmission (e.g., surface wave or other electromagnetic wave) on the pipeline 3510 to another transmission device that is further along the pipeline 3510. The transmission device 3508 can also extract a signal from the millimeter-wave band guided-wave and shift it down in frequency or otherwise convert it to its original cellular band frequency (e.g., 1.9 GHz or other defined cellular frequency) or another cellular (or non-cellular) band frequency. The antenna 3512 can transmit (e.g., wirelessly transmit) the downshifted signal to mobile device 3522.

Transmissions from mobile device 3522 can also be received by antenna 3512. The transmission device 3508 can upshift or otherwise convert the cellular band signals to millimeter-wave band and transmit the signals as guided-wave transmissions (e.g., surface wave or other electromagnetic wave) over the pipeline 3510 via transmission device 3506 to base station device 3504.

In an example embodiment, system 3500 can employ diversity paths based on different axial orientations, different frequencies or different guided-wave modes of propagation. The selection between different diverse paths can be based on measurements of the signal-to-noise ratio, or based on determined weather/environmental conditions (e.g., moisture detectors, weather forecasts, etc.). The use of diverse paths within system 3500 can enable alternate routing capabilities, load balancing, increased load handling, concurrent bi-directional or synchronous communications, spread spectrum communications, etc.

It is noted that the use of the transmission devices 3506 and 3508 in FIG. 35 are by way of example only, and that in other embodiments, other uses are possible. For instance, transmission devices 3506 and 3508 can be used in a backhaul communication system, providing network connectivity between base station device 3504 and other base station devices. Transmission devices 3506 and 3508 can be used in many circumstances where it is desirable to transmit guided-wave communications over a transmission medium.

It is further noted, that while base station device 3504 and macrocell site 3502 are illustrated in an example embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as a 802.11 protocol, WIMAX protocol, UltraWideband protocol, Bluetooth protocol, Zigbee protocol or other wireless protocol.

Figure 36:
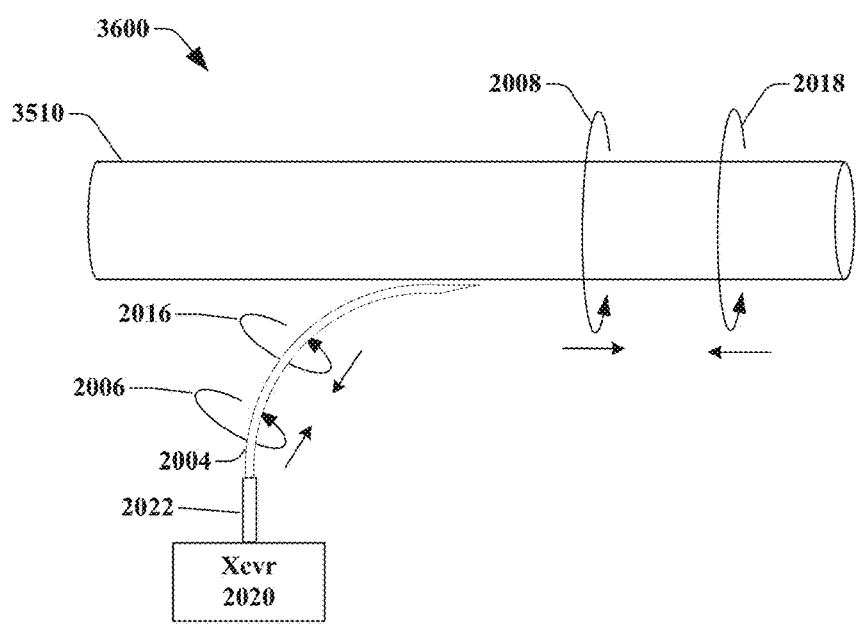
FIG. 36 is a block diagram of an example, non-limiting embodiment of a transmission device in accordance with various aspects described herein.

FIG. 36 is a block diagram of an example, non-limiting embodiment of a transmission device in accordance with various aspects described herein. In particular, a transmission device 3600 is shown that includes a transceiver 2020, having a transmitting device (or transmitter) and/or a receiving device (receiver) that is coupled to a corresponding waveguide 2022 and coupler 2004 as previously described in conjunction with FIG. 20. More generally however, this coupler 2004 can be implemented by any of the other couplers presented herein with the wire or single wire transmission medium being replaced in the system by the pipeline 3510. The coupler 2004 of such a coupling module includes a receiving portion 2010 that receives an electromagnetic wave 2006 conveying first data from a transmitting device of transceiver 2020.

In operation, the electromagnetic wave 2006 propagates via at least one first guided-wave mode. The coupling of the electromagnetic wave 2006 to the pipeline 3510 forms an electromagnetic wave 2008 that is guided to propagate along the outer surface of the pipeline 3510 via at least one second guided-wave mode that may differ from the at least one first guided-wave mode. The pipeline 3510 supports the propagation of the second electromagnetic waves 2008 along the outer surface of the pipeline 3510 to convey the first data.

In various embodiments, the electromagnetic wave 2006 propagates along the coupler 2004, via one or more first guided-wave modes that can include either exclusively or substantially exclusively a symmetrical (fundamental) mode, however other modes can optionally be included in addition or in the alternative. In accordance with these embodiments, the at least one second guided-wave mode includes at least one asymmetric mode that is not included in the guided-wave modes of the electromagnetic wave 2006 that propagate along the coupler 2004.

In addition to operating as a transmitter, the transmission device 3600 can operate as a receiver as well. In this mode of operation, an electromagnetic wave 2018 conveys second data that also propagates along the outer surface of the pipeline 3510, but in the opposite direction of the electromagnetic wave 2008. The coupler 2004 couples the electromagnetic wave 2018 from the pipeline 3510 to form an electromagnetic wave 2016 that is guided to a receiver of the corresponding transceiver 2020 by waveguide 2022.

In one or more embodiments, the transceiver 2020 generates the electromagnetic wave 2006 based on a communication signal to convey data. The electromagnetic wave 2006 was at least one carrier frequency and at least one corresponding wavelength. The coupler 2004 couples the electromagnetic wave 2006 to the outer surface of the pipeline 3510. The coupling of the electromagnetic wave 2006 to the pipeline 3510 forms a second electromagnetic wave that is guided to propagate along the outer surface of the pipeline 3510 via at least one guided-wave mode that includes an asymmetric mode, wherein the at least one carrier frequency is within a millimeter wave frequency band and wherein the at least one corresponding wavelength is less than the circumference of pipeline 3510.

In one or more embodiments, the transceiver 2020 generates the electromagnetic wave 2006 based on a communication signal to convey first data. The coupler 2004 couples the electromagnetic wave 2006 to the outer surface of the pipeline 3510, wherein the pipeline is surrounded by a dielectric coating, substance or other material. The coupling of the electromagnetic wave 2006 to the outer surface of the pipeline 3510 forms an electromagnetic wave 2008 that is guided to propagate along the outer surface of the dielectric material via at least one guided-wave mode that includes an asymmetric mode having a lower cutoff frequency, and wherein the at least one carrier frequency of the electromagnetic wave 2006 is selected to be within a limited range of the lower cutoff frequency.

In one or more embodiments, the transceiver 2020 generates the electromagnetic wave 2006 based on a communication signal to convey first data. The coupler 2004 couples the electromagnetic wave 2006 to the outer surface of the pipeline 3510. The coupling of the electromagnetic wave 2006 to the outer surface of the pipeline 3510 forms an electromagnetic wave 2008 that is guided to propagate along the outer surface of the pipeline 3510 via at least one guided-wave mode that includes an asymmetric mode having a lower cutoff frequency, and wherein the at least one carrier frequency of the electromagnetic wave 2006 is selected to be within a limited range of the lower cutoff frequency.

In one or more embodiments, the coupler includes a receiving portion that receives the electromagnetic wave 2006 conveying first data from the transceiver 2020. A guiding portion guides the electromagnetic wave 2006 to a junction for coupling the electromagnetic wave 2006 to the pipeline 3510. The electromagnetic wave 2006 propagates via at least one first guided-wave mode. The coupling of the electromagnetic wave 2006 to the pipeline 3510 causes the electromagnetic wave 2008 that is guided to propagate along the outer surface of the pipeline 3510 via at least one second guided-wave mode that differs from the at least one first guided-wave mode.

While not expressly shown, in one or more embodiments, the coupler 2004 is part of a coupling module includes a plurality of receiving portions that receive a corresponding plurality of electromagnetic waves 2006 conveying first data. A plurality of guiding portions guide the plurality of electromagnetic waves 2006 to a corresponding plurality of junctions for coupling the plurality of electromagnetic waves 2006 to the pipeline 3510. The plurality of electromagnetic waves 2006 propagate via at least one first guided-wave mode and the coupling of the plurality of electromagnetic waves 2006 to the pipeline 3510 forms a plurality of electromagnetic waves 2008 that are guided to propagate along the outer surface of the pipeline via at least one second guided-wave mode that differs from the at least one first guided-wave mode.

While not specifically shown, in one or more embodiments, the coupler 2004 is part of a coupling module with at least one other coupler. The coupler 2004 guides the electromagnetic wave 2006 to a first junction to form the electromagnetic wave 2008 that is guided to propagate along the outer surface of the pipeline 3510 via one or more guided-wave modes. This mode or modes have an envelope that varies as a function of angular deviation from the orientation of the transmitting coupler and/or longitudinal displacement from the function of the transmitting coupler. A second coupler, not expressly shown, guides another electromagnetic wave from a second junction coupling this other electromagnetic wave from the pipeline 3510. The second junction is arranged in angular deviation and/or longitudinal displacement to correspond to a local minimum of the envelope.

Figure 37:
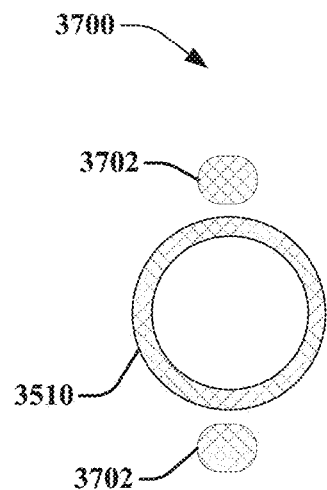
FIG. 37 is a block diagram illustrating an example, non-limiting embodiment of a waveguide coupling system in accordance with various aspects described herein.

FIG. 37 is a block diagram illustrating an example, non-limiting embodiment of a waveguide coupling system in accordance with various aspects described herein. In particular, a cross sectional representation 3700 of the pipeline 3510 is depicted near the junction where two couplers 3702 launch and/or receive electromagnetic waves from the surface of the pipeline 3510. Each coupler 3702 can be implemented via a coupler 2004 presented in FIG. 36 or via other coupler design presented herein. As is shown, the couplers 3702 are angularly aligned with an angular deviation of π radians and are positioned directly next to, but leaving an air gap from the surface of the pipeline 3510. In other embodiments, the couplers 3702 may be touching the surface of the pipeline 3510.

It is to be appreciated that while FIG. 37 shows pipeline 3510 having a circular shape and couplers 3702 having rounded rectangular shapes, this is not meant to be limiting. In other embodiments, wires and waveguides can have a variety of shapes, sizes, and configurations. The shapes can include, but should not be limited to: ovals or other ellipsoid shapes, octagons, quadrilaterals or other polygons with either sharp or rounded edges, or other shapes. Further, while two couplers are shown, a transmission device can include a single coupler or two or more couplers arranged at different axial orientations and/or spatial displacements as previously discussed in conjunction with other transmission media.

Figure 38:
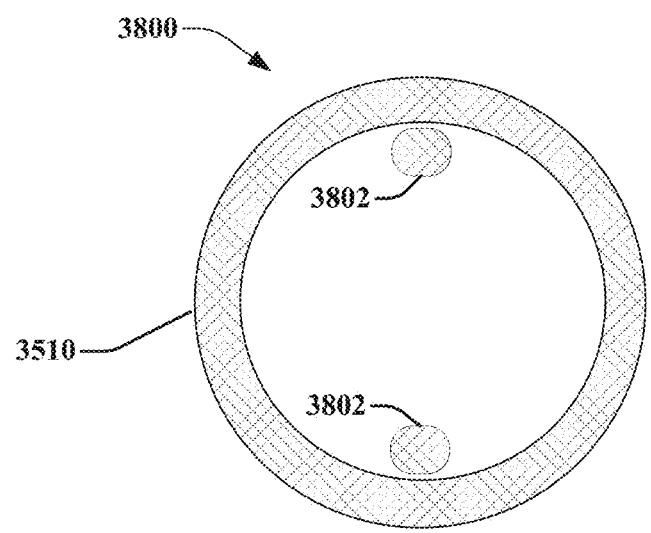
FIG. 38 is a block diagram illustrating an example, non-limiting embodiment of a waveguide coupling system in accordance with various aspects described herein.

FIG. 38 is a block diagram illustrating an example, non-limiting embodiment of a waveguide coupling system in accordance with various aspects described herein. In particular, a cross sectional representation 3800 of the pipeline 3510, such as a natural gas or carbon dioxide pipeline or other pipeline is depicted that operates similarly to the embodiments of FIGS. 35-37, but with the transmission devices 3506 and 3508 operating inside the pipeline 3510 instead of on the outer surface. In this case, two couplers 3802 launch and/or receive electromagnetic waves from the inner surface of the pipeline 3510. It should be noted that waves launched inside the pipeline may start out appearing to be surface waves, but they can evolve into conventional symmetrical, fundamental waveguide modes that fill the interior space (e.g., the entire space or simply a portion thereof) of the pipe. Each coupler 3802 can be implemented via a coupler 2004 presented in FIG. 36 or via other coupler designs presented herein. It should be noted that the design of the couplers 3802 can be streamlined to minimize disruptions in the flow of the product through the pipeline. As is shown, the couplers 3802 and can be positioned directly next to, but leaving an air gap from the surface of the pipeline 3510. In other embodiments, the couplers 3802 may be touching the inner surface of the pipeline 3510.

It is to be appreciated that while FIG. 38 shows pipeline 3510 having a circular shape and couplers 3802 having rounded rectangular shapes, this is not meant to be limiting. In other embodiments, wires and waveguides can have a variety of shapes, sizes, and configurations. The shapes can include, but should not be limited to: ovals or other ellipsoid shapes, octagons, quadrilaterals or other polygons with either sharp or rounded edges, or other shapes. Further, while two couplers are shown, a transmission device can include a single coupler or two or more couplers arranged at different axial orientations and/or spatial displacements as previously discussed in conjunction with other transmission media.

Figure 39:
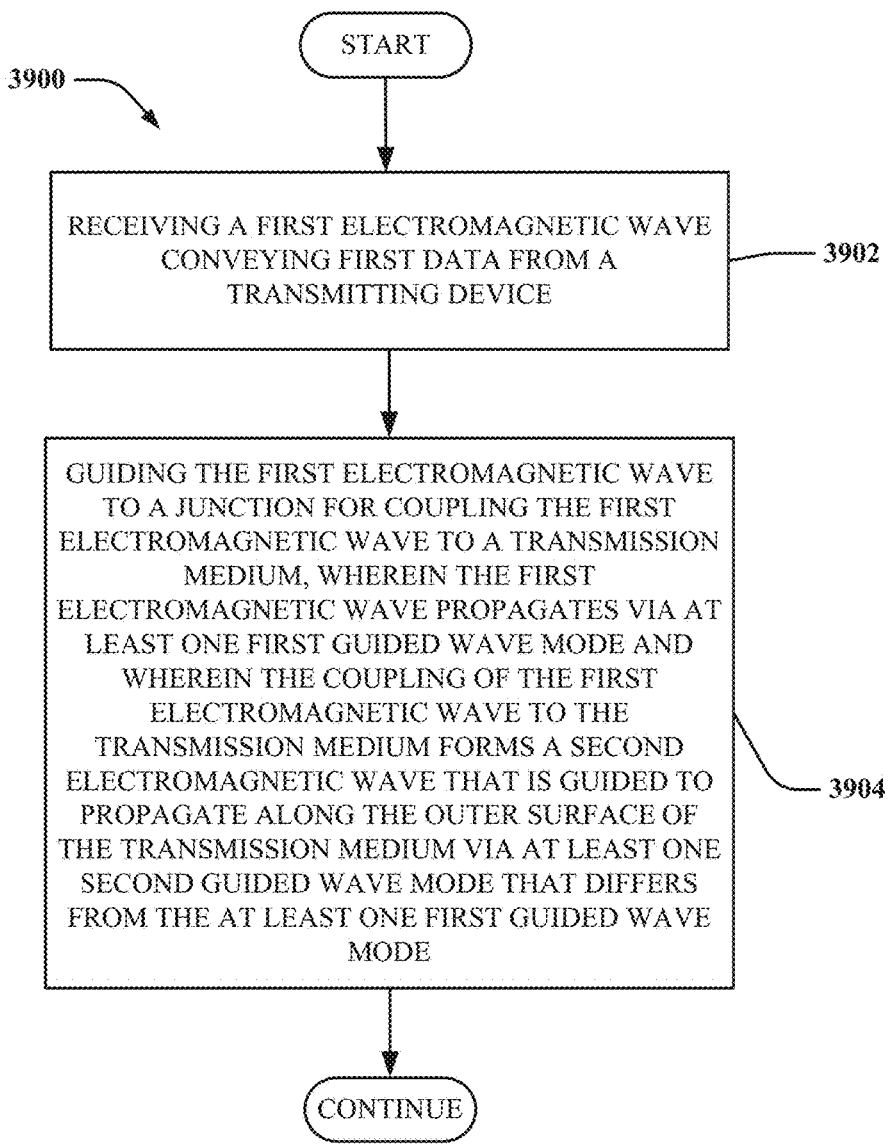
FIG. 39 illustrates a flow diagram of an example, non-limiting embodiment of a method of transmission as described herein.

Turning now to FIG. 39, a flow diagram is shown illustrating an example, non-limiting embodiment of a method of transmission 3900. The method can be used in conjunction with one or more functions and features described in conjunction with FIGS. 1-38. Step 3902 includes receiving a first electromagnetic wave conveying first data from a transmitting device. Step 3904 includes guiding the first electromagnetic wave to a junction for coupling the first electromagnetic wave to a transmission medium, wherein the first electromagnetic wave propagates via at least one first guided-wave mode and wherein the coupling of the first electromagnetic wave to the transmission medium forms a second electromagnetic wave that is guided to propagate along the outer surface of the transmission medium via at least one second guided-wave mode that differs from the at least one first guided-wave mode.

In various embodiments, the at least one second guided-wave mode includes an asymmetric mode not included in the at least one first guided-wave mode. The at least one first guided-wave mode can include a symmetric mode and the junction can induce the second electromagnetic wave such that the at least one second guided-wave mode includes an asymmetric mode. The at least one first guided-wave mode can include a symmetric mode and the junction can induce the second electromagnetic wave such that the at least one second guided-wave mode includes both an asymmetric mode and a symmetric mode.

In various embodiments, a third electromagnetic wave conveying second data can also propagate along the outer surface of the transmission medium. The junction can include an air gap. The junction can couple the third electromagnetic wave from the transmission medium to form a fourth electromagnetic wave that is guided to a receiver.

Figure 40:
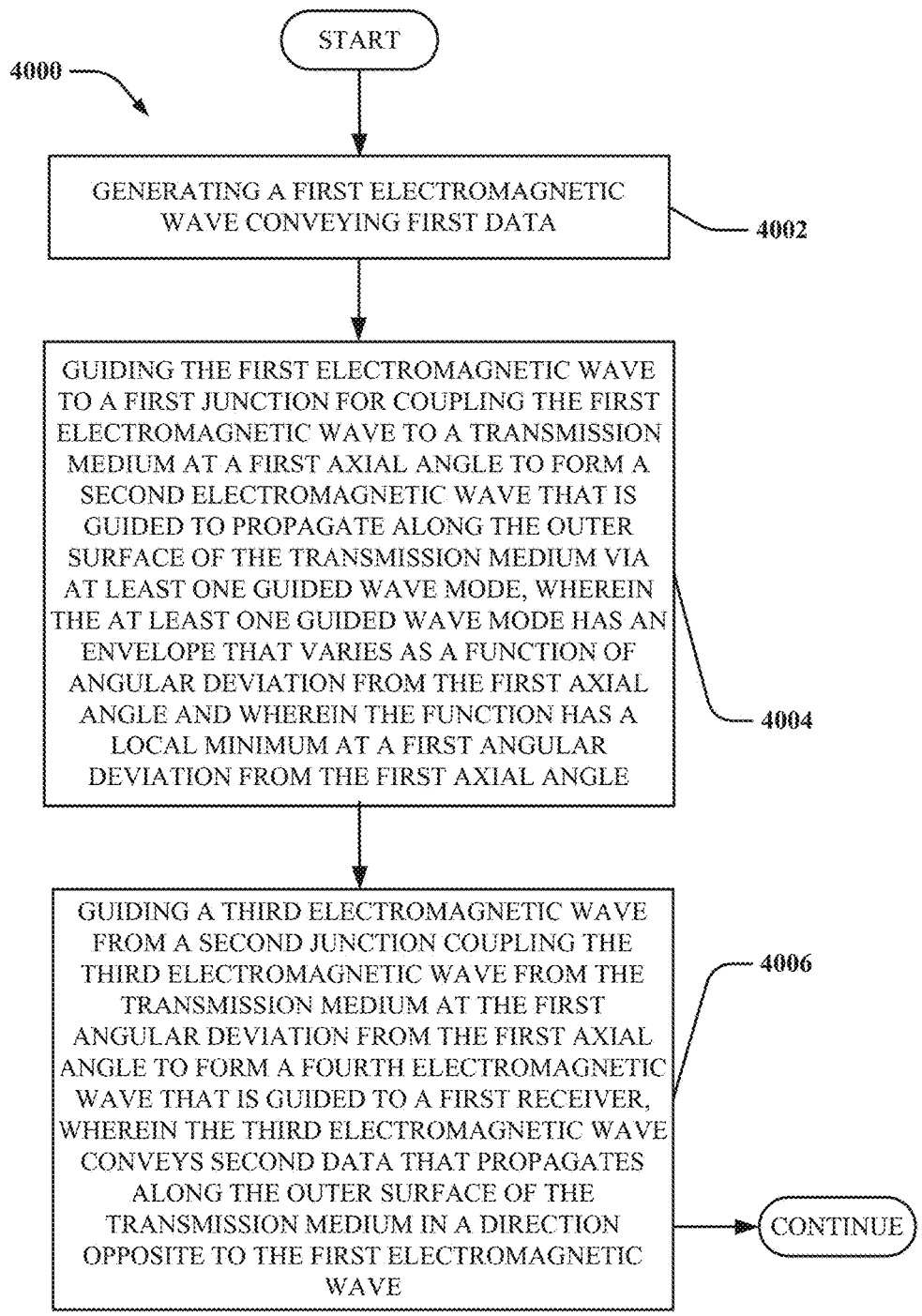
FIG. 40 illustrates a flow diagram of an example, non-limiting embodiment of a method of transmission as described herein.

Turning now to FIG. 40, a flow diagram is shown illustrating an example, non-limiting embodiment of a method of transmission 4000. The method can be used in conjunction with one or more functions and features described in conjunction with FIGS. 1-39. Step 4002 includes generating a first electromagnetic wave conveying first data from a transmitting device. Step 4004 includes guiding the first electromagnetic wave to a first junction for coupling the first electromagnetic wave to a transmission medium at a first azimuthal angle to form a second electromagnetic wave that is guided to propagate along the outer surface of the transmission medium via at least one guided-wave mode, wherein the second electromagnetic wave has an envelope that varies as a function of angular deviation from the first azimuthal angle and wherein the function has a local minimum at a first angular deviation from the first azimuthal angle. Step 4006 includes guiding a third electromagnetic wave from a second junction coupling the third electromagnetic wave from the transmission medium at the first angular deviation from the first azimuthal angle to form a fourth electromagnetic wave that is guided to a first receiver, wherein the third electromagnetic wave conveys second data that propagates along the outer surface of the transmission medium in a direction opposite to the first electromagnetic wave.

In various embodiments, the envelope of the second electromagnetic wave, for the first angular deviation from the first azimuthal angle, varies as a function of longitudinal deviation from the first junction and the local minimum at the first angular deviation occurs at a first longitudinal displacement from the first junction. The envelope of the second electromagnetic wave, for the first angular deviation from the first azimuthal angle, can vary as a sinusoidal function of longitudinal deviation from the first junction.

The sinusoidal function has a corresponding envelope wavelength, and the transmitter can transmit the first data to at least one remote transmission device having a third coupler that receives the second electromagnetic wave via a third junction that is remotely displaced at a second longitudinal displacement from the first junction. The second longitudinal displacement can be substantially an integer number of envelope wavelengths. The first receiver can receive the second data from at least one remote transmission device having a third coupler that forms the third electromagnetic wave via a third junction that is remotely displaced at a second longitudinal displacement from the second junction.

The method can also include the step of selecting at least one carrier frequency of the first electromagnetic wave based on feedback data received by the receiver from at least one remote transmission device coupled to receive the second electromagnetic wave.

As used herein, the term "millimeter-wave" refers to electromagnetic waves that fall within the "millimeter-wave frequency band" of 30 GHz to 300 GHz. The term "microwave" refers to electromagnetic waves that fall within the "microwave frequency band" of 300 MHz to 300 GHz.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A transmission device comprising:
a first coupler oriented at an azimuthal angle to a transmission medium, wherein the first coupler is configured to form a first electromagnetic wave that is guided along an outer surface of the transmission medium via at least one guided-wave mode, wherein the first electromagnetic wave has an envelope that varies as a function of angular deviation from the first azimuthal angle, wherein the function of angular deviation has a local minimum at a first angular deviation from the first azimuthal angle, and wherein a second electromagnetic wave propagates along the outer surface of the transmission medium in a direction opposite to the first electromagnetic wave; and
a second coupler that receives the second electromagnetic wave from the transmission medium for transmission to a receiver, wherein the second coupler is oriented at the first angular deviation from the first azimuthal angle.

2. The transmission device of claim 1, wherein the function of angular deviation has the local minimum at the first angular deviation from the azimuthal angle at a first longitudinal displacement along the transmission medium.

3. The transmission device of claim 2, wherein the envelope of the first electromagnetic wave, for the first angular deviation from the first azimuthal angle, varies as a function of longitudinal deviation along the transmission medium from the first coupler and the local minimum at the first angular deviation occurs at the first longitudinal displacement along the transmission medium from the first coupler.

4. The transmission device of claim 3, wherein the envelope of the first electromagnetic wave, for the first angular deviation from the first azimuthal angle, varies as a sinusoidal function of longitudinal deviation along the transmission medium from the first coupler.

5. The transmission device of claim 4, wherein the sinusoidal function of longitudinal deviation has a corresponding envelope wavelength, wherein at least one remote transmission device having a third coupler receives the first electromagnetic wave at a second longitudinal displacement along the transmission medium from the first coupler device, and wherein the second longitudinal displacement is substantially an integer number of envelope wavelengths.

6. The transmission device of claim 1, further comprising:
a training controller configured to select at least one carrier frequency of the first electromagnetic wave based on feedback data received from at least one remote transmission device via the second electromagnetic wave.

7. The transmission device of claim 1, further comprising:
a training controller configured to generate feedback data based on a reception of the second electromagnetic wave;
wherein the feedback data is included in first data conveyed by the first electromagnetic wave.

8. The transmission device of claim 1, wherein the first coupler and the second coupler are spaced a longitudinal distance apart along the transmission medium.

9. The transmission device of claim 1, wherein the first coupler and the second coupler are spaced at a shared longitudinal placement along the transmission medium.

10. A transmission device comprising:
means for generating a first electromagnetic wave conveying first data; and
first means for guiding the first electromagnetic wave to a first junction for coupling the first electromagnetic wave to a transmission medium to form a second electromagnetic wave that propagates along an outer surface of the transmission medium via at least one guided-wave mode, wherein the second electromagnetic wave has an envelope that varies as a function of longitudinal displacement from the first junction, wherein the function of longitudinal displacement has a local minimum at a first longitudinal displacement from the first junction, and wherein a third electromagnetic wave propagates along the outer surface of the transmission medium in a direction opposite to the first electromagnetic wave; and second means for guiding the third electromagnetic wave from a second junction coupling the third electromagnetic wave from the transmission medium at the first longitudinal displacement from the first junction to form a fourth electromagnetic wave that is guided to a first receiver.

11. The transmission device of claim 10, wherein the envelope of the second electromagnetic wave, for the first longitudinal displacement from the first junction, also varies as a function of an angular deviation from the first junction and the local minimum at the first longitudinal displacement from the first junction occurs at the angular deviation from the first junction.

12. The transmission device of claim 11, wherein the first means and the second means are spaced a longitudinal distance apart along the transmission medium.

13. The transmission device of claim 11, wherein the envelope of the second electromagnetic wave, for the angular deviation from the first junction, varies as a sinusoidal function of the longitudinal displacement from the first junction.

14. The transmission device of claim 13, wherein the sinusoidal function of the longitudinal displacement has a corresponding envelope wavelength, wherein the means for generating transmits the first data to at least one remote transmission device having a coupler that receives the second electromagnetic wave via a third junction that is remotely displaced at a second longitudinal displacement from the first junction, and wherein the second longitudinal displacement is substantially an integer number of envelope wavelengths.

15. The transmission device of claim 13, wherein the sinusoidal function of the longitudinal displacement has a corresponding envelope wavelength, wherein the first receiver receives the second data from at least one remote transmission device having a coupler that forms the third electromagnetic wave via a third junction that is remotely displaced at a second longitudinal displacement from the second junction, and wherein the second longitudinal displacement is substantially an integer number of envelope wavelengths.

16. The transmission device of claim 10, further comprising:
a training controller, coupled to the means for generating and the first receiver, that selects at least one carrier frequency of the first electromagnetic wave based on feedback data received by the first receiver from at least one remote transmission device coupled to receive the second electromagnetic wave.

17. The transmission device of claim 10, further comprising:
a training controller, coupled to the means for generating and the first receiver, that generates feedback data based on a reception of the fourth electromagnetic wave;
wherein the feedback data is included in the first data transmitted by the means for guiding to at least one remote transmission device coupled to receive the second electromagnetic wave.

18. A method comprising:
generating a first electromagnetic wave on a transmission medium that is guided to propagate along an outer surface of the transmission medium via at least one guided-wave mode, wherein the first electromagnetic wave has an envelope that varies as a first function of angular deviation from an azimuthal angle and wherein the first function of angular deviation has a first local minimum at an angular deviation from the azimuthal angle; and
receiving a second electromagnetic wave that propagates along the outer surface of the transmission medium in a direction opposite to the first electromagnetic wave, wherein the second electromagnetic wave has an envelope that varies as a second function of angular deviation from the azimuthal angle and wherein the second function of angular deviation has a second local maximum at the angular deviation from the azimuthal angle.

19. The method of claim 18, wherein the envelope of the first electromagnetic wave, for the angular deviation from the azimuthal angle, varies as a third function of longitudinal displacement along the transmission medium and the second local minimum at the angular deviation occurs at a longitudinal displacement along the transmission medium.

20. The method of claim 18, wherein the envelope of the first electromagnetic wave, for the angular deviation from the azimuthal angle, varies as a sinusoidal function of a longitudinal displacement along the transmission medium.

* * * * *